(12) United States Patent
Ikeda et al.

(10) Patent No.: US 8,933,910 B2
(45) Date of Patent: Jan. 13, 2015

(54) INFORMATION INPUT APPARATUS, INFORMATION INPUT METHOD, AND PROGRAM

(75) Inventors: Yoichi Ikeda, Osaka (JP); Masaki Yamauchi, Osaka (JP); Yoshihiro Kojima, Hyogo (JP); Tomonari Takahashi, Osaka (JP); Kumi Harada, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 225 days.

(21) Appl. No.: 13/521,886

(22) PCT Filed: Jun. 10, 2011

(86) PCT No.: PCT/JP2011/003287
§ 371 (c)(1),
(2), (4) Date: Jul. 12, 2012

(87) PCT Pub. No.: WO2011/158475
PCT Pub. Date: Dec. 22, 2011

(65) Prior Publication Data
US 2012/0293456 A1 Nov. 22, 2012

(30) Foreign Application Priority Data

Jun. 16, 2010 (JP) .................................. 2010-137771

(51) Int. Cl.
*G06F 3/045* (2006.01)
*G06F 3/0488* (2013.01)
(Continued)

(52) U.S. Cl.
CPC ............ *G06F 1/169* (2013.01); *G06F 3/04886* (2013.01); *H04N 21/42224* (2013.01);
(Continued)

(58) Field of Classification Search
CPC ..... G06F 3/016; G06F 3/0416; G06F 3/0485; G06F 3/04883; G06F 3/04886; G06F 2203/0339; G06F 2203/04809

USPC ................ 345/90, 156–184, 684; 178/18.03; 715/2, 765; 341/176; 349/12
See application file for complete search history.

(56) References Cited

U.S. PATENT DOCUMENTS 4,686,332 A * 8/1987 Greanias et al. .............. 345/173
5,798,758 A * 8/1998 Harada et al. ................. 715/863
(Continued)

FOREIGN PATENT DOCUMENTS

JP    2003-248549    9/2003
JP    2006-209647    8/2006
(Continued)

OTHER PUBLICATIONS

International Search Report issued Sep. 13, 2011 in International (PCT) Application No. PCT/JP2011/003287.
(Continued)

*Primary Examiner* — Prabodh M Dharia
(74) *Attorney, Agent, or Firm* — Wenderoth, Lind & Ponack, L.L.P.

(57) ABSTRACT

An information input apparatus includes: a touch pad; a touch information detecting unit which detects touch information that is information resulting from an operator contacting the touch sensor with a finger; a touch operation start position detecting unit which detects, using the touch information, a touch operation start position that is a start position of a touch operation performed by the operator; a touch operation recognition condition storage unit which stores a plurality of touch operation recognition conditions each for recognizing one of types of touch operation, in association with each of touch operation start positions; and a touch recognizing unit, which recognizes the touch operation, using the touch operation recognition conditions stored in association with the touch operation start position detected by the touch operation start position detecting unit, to determine a type of the touch operation.

17 Claims, 76 Drawing Sheets

(51) Int. Cl.
*H04N 21/422* (2011.01)
*G06F 3/041* (2006.01)
*G06F 1/16* (2006.01)
*G06F 3/0485* (2013.01)

(52) U.S. Cl.
CPC ........... *G06F 3/0416* (2013.01); *G06F 1/1626* (2013.01); *G06F 3/0485* (2013.01); *G06F 3/04883* (2013.01); *G06F 2203/0339* (2013.01)
USPC ........................................................ 345/174

(56) References Cited

U.S. PATENT DOCUMENTS

| | | | |
|---|---|---|---|
| 5,943,052 | A | 8/1999 | Allen et al. |
| 7,057,606 | B2 | 6/2006 | Numano |
| 7,614,008 | B2 | 11/2009 | Ording |
| 7,656,394 | B2 | 2/2010 | Westerman et al. |
| 7,755,744 | B1 * | 7/2010 | Leberer ........................ 356/5.1 |
| 7,840,912 | B2 | 11/2010 | Elias et al. |
| 7,856,605 | B2 | 12/2010 | Ording et al. |
| 7,978,182 | B2 | 7/2011 | Ording et al. |
| 7,995,041 | B2 * | 8/2011 | Chang ........................ 345/173 |
| 8,217,913 | B2 * | 7/2012 | Hotelling et al. ............. 345/173 |
| 8,768,286 | B2 * | 7/2014 | Naboulsi ...................... 455/345 |
| 2003/0160756 | A1 | 8/2003 | Numano |
| 2004/0102858 | A1 * | 5/2004 | Kesil et al. ...................... 700/11 |
| 2006/0022956 | A1 | 2/2006 | Lengeling et al. |
| 2006/0026521 | A1 | 2/2006 | Hotelling et al. |
| 2006/0026536 | A1 | 2/2006 | Hotelling et al. |
| 2006/0053387 | A1 | 3/2006 | Ording |
| 2006/0238519 | A1 | 10/2006 | Westerman et al. |
| 2006/0238520 | A1 | 10/2006 | Westerman et al. |
| 2007/0057790 | A1 * | 3/2007 | Alden et al. ............... 340/572.1 |
| 2007/0174788 | A1 | 7/2007 | Ording |
| 2007/0177803 | A1 | 8/2007 | Elias et al. |
| 2007/0177804 | A1 | 8/2007 | Elias et al. |
| 2008/0036743 | A1 | 2/2008 | Westerman et al. |
| 2008/0163130 | A1 | 7/2008 | Westerman |
| 2008/0165145 | A1 | 7/2008 | Herz et al. |
| 2008/0165160 | A1 | 7/2008 | Kocienda et al. |
| 2008/0204426 | A1 | 8/2008 | Hotelling et al. |
| 2008/0211775 | A1 | 9/2008 | Hotelling et al. |
| 2008/0211778 | A1 | 9/2008 | Ording et al. |
| 2008/0211783 | A1 | 9/2008 | Hotelling et al. |
| 2008/0211784 | A1 | 9/2008 | Hotelling et al. |
| 2008/0211785 | A1 | 9/2008 | Hotelling et al. |
| 2008/0231610 | A1 | 9/2008 | Hotelling et al. |
| 2008/0259040 | A1 | 10/2008 | Ording et al. |
| 2009/0002217 | A1 * | 1/2009 | Kryze et al. .................. 341/176 |
| 2009/0058830 | A1 | 3/2009 | Herz et al. |
| 2010/0194699 | A1 * | 8/2010 | Chang ........................... 345/173 |
| 2011/0163968 | A1 * | 7/2011 | Hogan ........................... 345/173 |
| 2011/0242138 | A1 * | 10/2011 | Tribble ......................... 345/663 |
| 2011/0275418 | A1 | 11/2011 | Forstall et al. |
| 2011/0298727 | A1 * | 12/2011 | Yousefpor et al. ............ 345/173 |
| 2011/0304550 | A1 * | 12/2011 | Jolliff et al. .................... 345/168 |
| 2012/0256835 | A1 * | 10/2012 | Musick et al. ................. 345/161 |
| 2012/0262406 | A1 * | 10/2012 | Hotelling et al. ............. 345/173 |

FOREIGN PATENT DOCUMENTS

| | | |
|---|---|---|
| JP | 2009-525538 | 7/2009 |
| JP | 2010-517197 | 5/2010 |
| WO | 2006/020305 | 2/2006 |
| WO | 2007/089766 | 8/2007 |
| WO | 2008/085783 | 7/2008 |
| WO | 2008/085784 | 7/2008 |
| WO | 2008/094791 | 8/2008 |

OTHER PUBLICATIONS

Reply (First) and its English translation in International (PCT) Application No. PCT/JP2011/003287, Sep. 13, 2011.

* cited by examiner

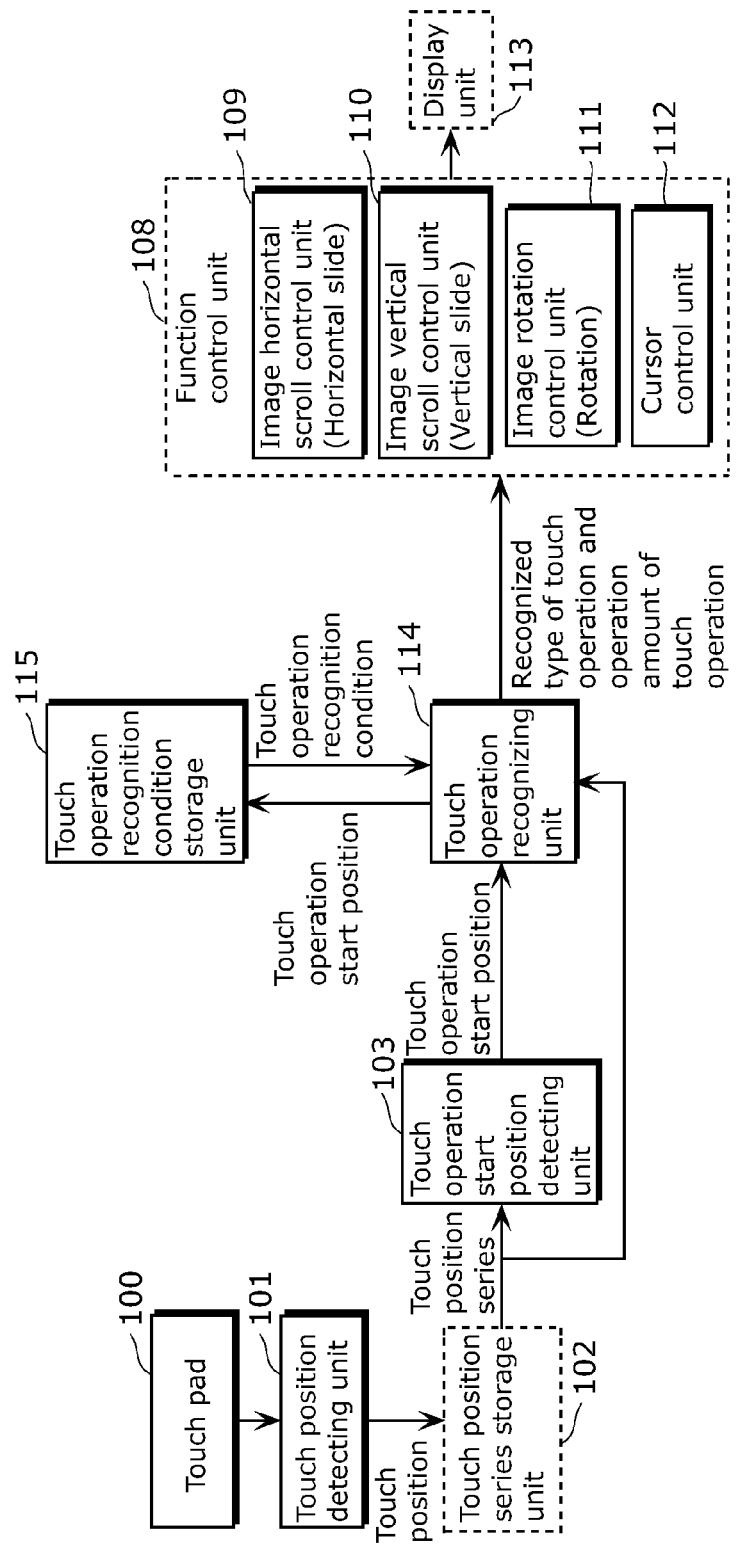

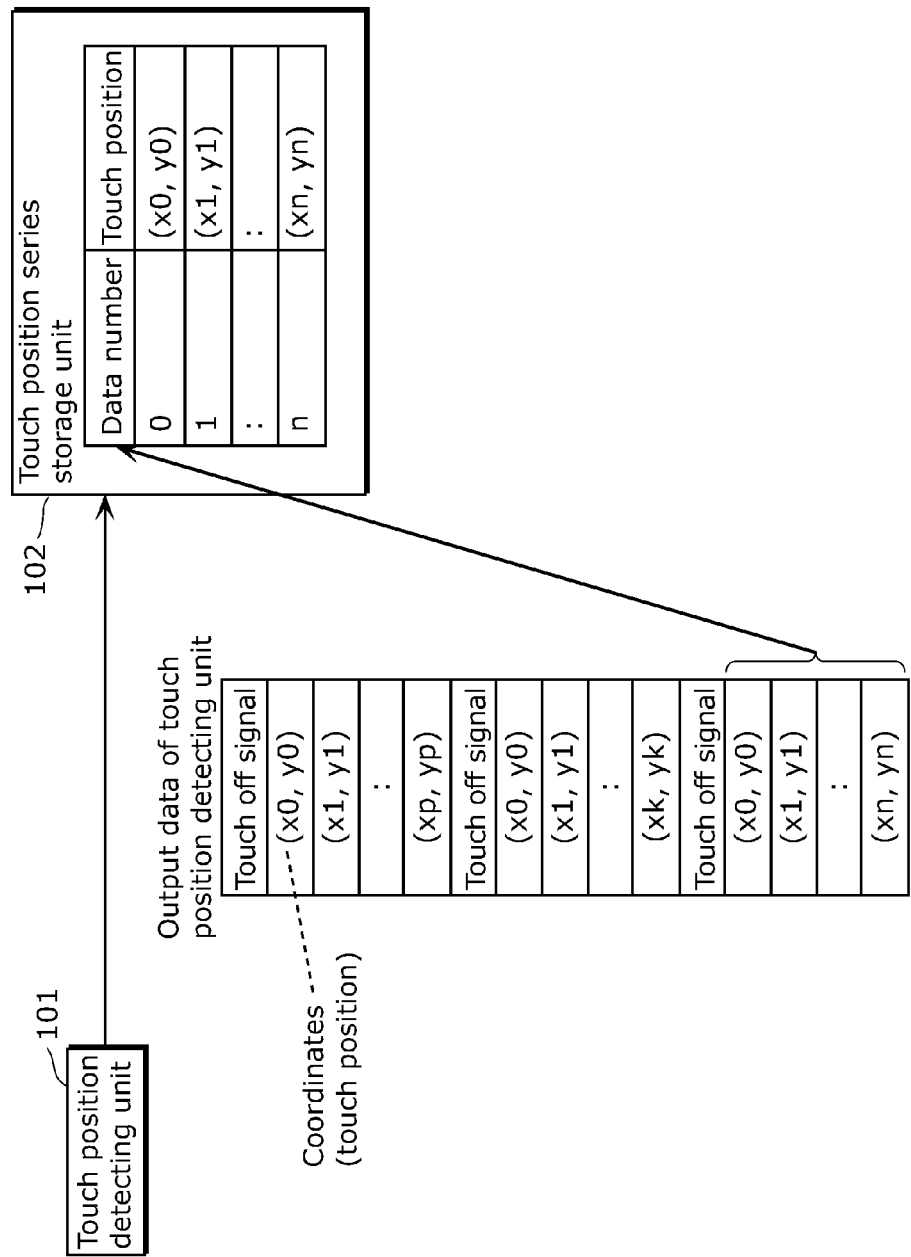

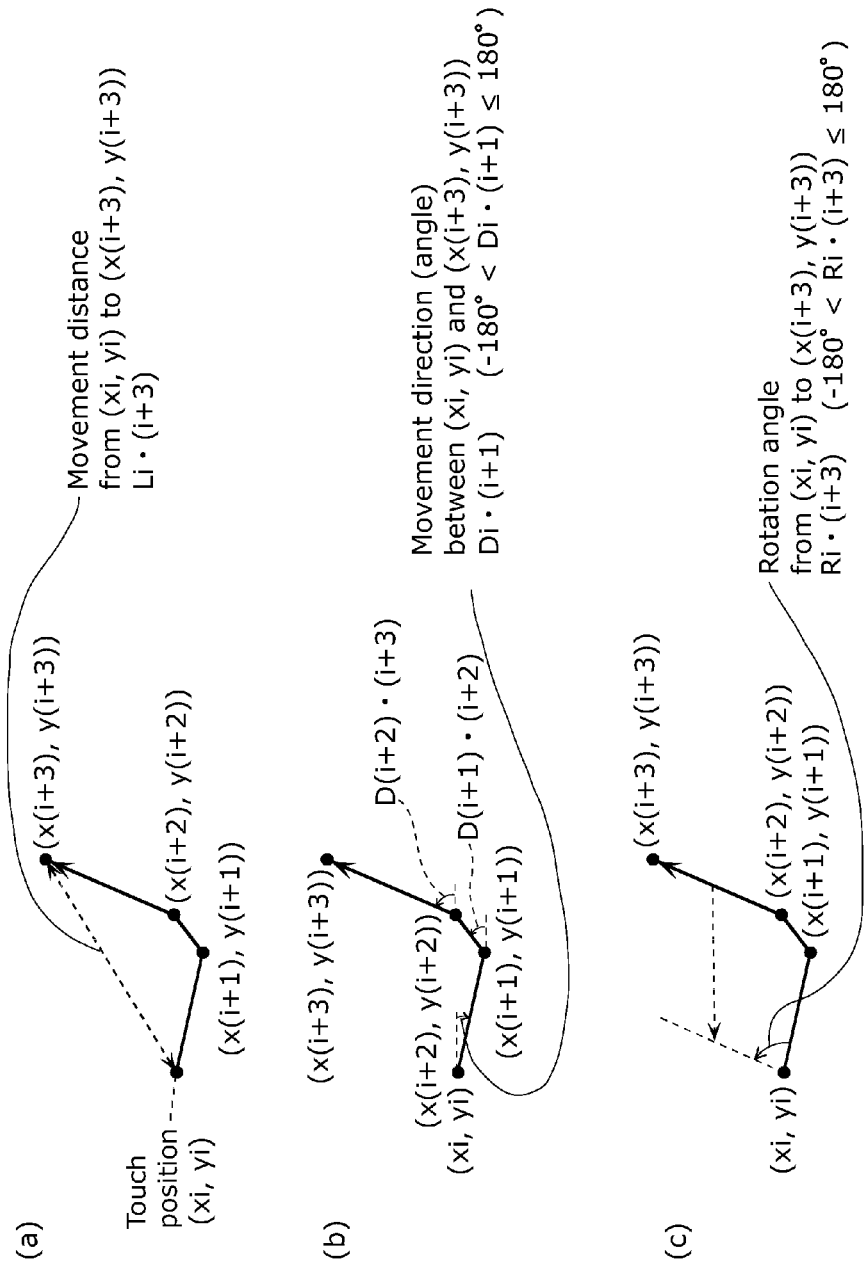

FIG. 6

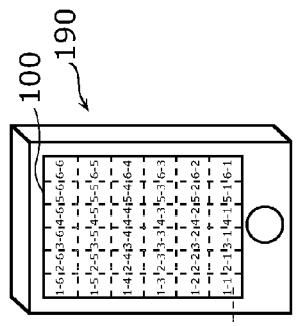

| Touch operation recognition condition storage unit | | | | | | | |
|---|---|---|---|---|---|---|---|
| | Vertical slide | | Horizontal slide | | Rotation | | |
| Subregion | Conditional expression | Threshold value | Conditional expression | Threshold value | Conditional expression | Threshold value | |
| 1-1 | Lsn ≥ Lvs and \| \| D(i-1)·i \|-90° \| < Dvs [i = s + any one of 1 to n] | {1-1}: Lvs {1-1}: Dvs | Lsn ≥ Lhs and \| D(i-1)·i \| < Dhs (at time of rightward slide) 180° - \| D(i-1)·i \| < Dhs (at time of leftward slide) [i = s + any one of 1 to n] | {1-1}: Lhs {1-1}: Dhs | Lsn ≥ Lr and \| dD(i-2)·i \| < dDr, [i = s + any one of 2 to n] and \| Rsn \| ≥ Rr | {1-1}: Lr {1-1}: dDr {1-1}: Rr | |
| 1-2 | Lsn ≥ Lvs and \| \| D(i-1)·i \|-90° \| < Dvs [i = s + any one of 1 to n] | {1-2}: Lvs {1-2}: Dvs | Lsn ≥ Lhs and \| D(i-1)·i \| < Dhs (at time of rightward slide) 180° - \| D(i-1)·i \| < Dhs (at time of leftward slide) [i = s + any one of 1 to n] | {1-2}: Lhs {1-2}: Dhs | Lsn ≥ Lr and \| dD(i-2)·i \| < dDr, [i = s + any one of 2 to n] and \| Rsn \| ≥ Rr | {1-2}: Lr {1-2}: dDr {1-2}: Rr | |
| ⋮ | ⋮ | | ⋮ | | ⋮ | | |
| 6-6 | Lsn ≥ Lvs and \| \| D(i-1)·i \|-90° \| < Dvs [i = s + any one of 1 to n] | {6-6}: Lvs {6-6}: Dvs | Lsn ≥ Lhs and \| D(i-1)·i \| < Dhs (at time of rightward slide) 180° - \| D(i-1)·i \| < Dhs (at time of leftward slide) [i = s + any one of 1 to n] | {6-6}: Lhs {6-6}: Dhs | Lsn ≥ Lr and \| dD(i-2)·i \| < dDr, [i = s + any one of 2 to n] and \| Rsn \| ≥ Rr | {6-6}: Lr {6-6}: dDr {6-6}: Rr | |

| | Vertical slide operation | Horizontal slide operation | Rotation operation |
|---|---|---|---|
| Recognition condition | L1·2 ≥ 40 mm<br>\|\|D1·2\|−90°\| < 30° | L1·2 ≥ 40 mm<br>\|D1·2\| < 25° (at time of rightward slide)<br>180° − \|D1·2\| < 25°<br>(at time of leftward slide) | L1·2 ≥ 25 mm<br>\|R1·2\| ≥ 200° |
| Recognition result | — Unrecognized | No<br>Not horizontal slide operation | — Unrecognized |

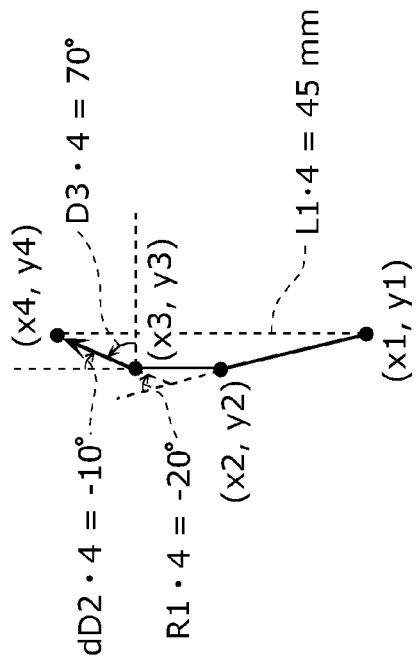

| | Vertical slide operation | Horizontal slide operation | Rotation operation |
|---|---|---|---|
| Recognition condition | L1·2 ≥ 30 mm<br>\|\|D1·2\|-90°\| < 30° | L1·2 ≥ 15 mm<br>\|D1·2\| < 30° (at time of rightward slide)<br>180° - \|D1·2\| < 30° (at time of leftward slide) | L1·2 ≥ 25 mm<br>\|R1·2\| ≥ 200° |
| Recognition result | No<br>Not vertical slide operation | —<br>Unrecognized | —<br>Unrecognized |

(x1, y1)
(x2, y2)
L1·2 = 14 mm
D1·2 = -100°
*R1·2 = 0°

| | Vertical slide operation | Horizontal slide operation | Rotation operation |
|---|---|---|---|
| Recognition condition | L1·2 ≥ 40 mm<br>\|\|D1·2\|-90°\| < 45° | L1·2 ≥ 40 mm<br>\|D1·2\| < 45° (at time of rightward slide)<br>180° - \|D1·2\| < 45° (at time of leftward slide) | L1·2 ≥ 25 mm<br>\|R1·2\| ≥ 180° |
| Recognition result | Unrecognized | No<br>Not horizontal slide operation | Unrecognized |

| | Vertical slide operation | Horizontal slide operation | Rotation operation |
|---|---|---|---|
| Recognition condition | L1·3 ≥ 40 mm<br>\|\|D2·3\|-90°\| < 45° | | L1·3 ≥ 25 mm<br>\|dD1·3\| < 45°<br>\|R1·3\| ≥ 180° |
| Recognition result | —<br>Unrecognized | No<br>Not horizontal slide operation | —<br>Unrecognized |

| | Vertical slide operation | Horizontal slide operation | Rotation operation |
|---|---|---|---|
| Recognition condition | L1·4 ≥ 40 mm <br> \|\|D3·4\|-90°\| < 45° | | L1·4 ≥ 25 mm <br> \|dD2·4\| < 45° <br> \|R1·4\| ≥ 180° |
| Recognition result | No <br> Not vertical slide operation | No <br> Not horizontal slide operation | — <br> Unrecognized |

| Recognition condition | Vertical slide operation | Horizontal slide operation | Rotation operation |
|---|---|---|---|
| | | | L1·5 ≥ 25 mm<br>\|dD3·5\| < 45°<br>\|R1·5\| ≥ 180° |
| Recognition result | No<br>Not vertical slide operation | No<br>Not horizontal slide operation | —<br>Unrecognized |

| Recognition condition | Vertical slide operation | Horizontal slide operation | Rotation operation |
|---|---|---|---|
|  |  |  | L1·7 ≥ 25 mm<br>\| dD5·7 \| < 45°<br>\| R1·7 \| ≥ 180° |
| Recognition result | No<br>Not vertical slide operation | No<br>Not horizontal slide operation | Yes<br>Rotation operation confirmed |

FIG. 16

| Touch position | Vertical slide operation | Horizontal slide operation | Rotation operation |
|---|---|---|---|
| $(xs, ys)$ ↓ $(x(s+1), y(s+1))$ | $90-Dvs < Ds \cdot (s+1) < 90+Dvs$ (at time of upward slide) $-90-Dvs < Ds \cdot (s+1) < -90+Dvs$ (at time of downward slide) | $-Dhs < Ds \cdot (s+1) < Dhs$ (at time of rightward slide) $180-Dhs < Ds \cdot (s+1) \leq 180$ $-180 < Ds \cdot (s+1) < -180+Dhs$ (at time of leftward slide) | $-dDr < dD(s-1) \cdot s < dDr$ |
| $(x(s+1), y(s+1))$ ↓ $(x(s+2), y(s+2))$ | $90-Dvs < D(s+1) \cdot (s+2) < 90+Dvs$ (at time of upward slide) $-90-Dvs < D(s+1) \cdot (s+2) < -90+Dvs$ (at time of downward slide) | $-Dhs < D(s+1) \cdot (s+2) < Dhs$ (at time of rightward slide) $180-Dhs < D(s+1) \cdot (s+2) \leq 180$ $-180 < D(s+1) \cdot (s+2) < -180+Dhs$ (at time of leftward slide) | $-dDr < dD(s-1) \cdot s < dDr$ |
| $(x(s+2), y(s+2))$ ↓ $(x(s+3), y(s+3))$ | $90-Dvs < D(s+2) \cdot (s+3) < 90+Dvs$ (at time of upward slide) $-90-Dvs < D(s+2) \cdot (s+3) < -90+Dvs$ (at time of downward slide) | $-Dhs < D(s+2) \cdot (s+3) < Dhs$ (at time of rightward slide) $180-Dhs < D(s+2) \cdot (s+3) \leq 180$ $-180 < D(s+2) \cdot (s+3) < -180+Dhs$ (at time of leftward slide) | $-dDr < dD(s-1) \cdot s < dDr$ |

FIG. 20

| Touch position | Vertical slide operation | Horizontal slide operation | Rotation operation |
|---|---|---|---|
| (xs, ys) ↓ (x(s+1), y(s+1)) | Dvs x 4 | Dhs x 4 | dDr x 2 |
| (x(s+1), y(s+1)) ↓ (x(s+2), y(s+2)) | Dvs x 2 | Dhs x 2 | dDr x 2 |
| (x(s+2), y(s+2)) ↓ (x(s+3), y(s+3)) | Dvs x 2 | Dhs x 2 | dDr x 2 |
| | → Dvs x 8 | → Dhs x 8 | → dDr x 6 |

Sum of direction ranges
= degree of ease of input

FIG. 23

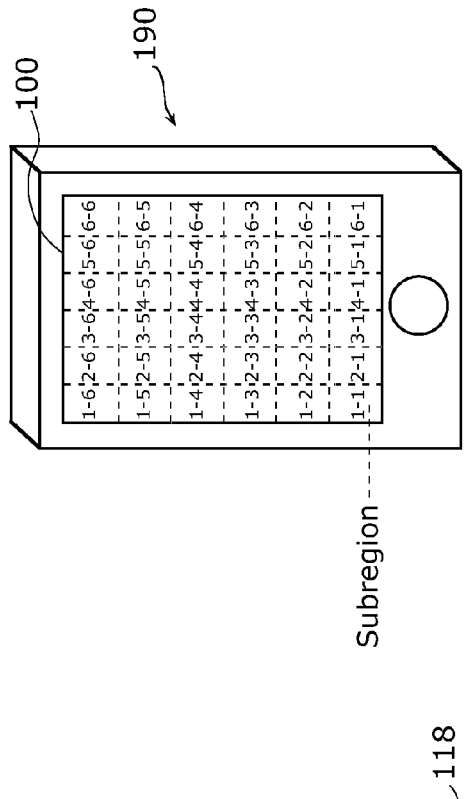

| Touch operation end determination condition storage unit | | | | | | |
|---|---|---|---|---|---|---|
| Subregion | Vertical slide | | Horizontal slide | | Rotation | |
| | Conditional expression | Threshold value | Conditional expression | Threshold value | Conditional expression | Threshold value |
| 1-1 | $\lvert D(i-1)\cdot i \rvert \leq Dvse$ or $\lvert D(i-1)\cdot i \rvert \leq Dvse$ $[i = s + \text{any one of 1 to n}]$ | (1-1): Dvse | $\lvert D(i-1)\cdot i \rvert -90° \rvert \leq Dhse$ $[i = s + \text{any one of 1 to n}]$ | (1-1): Dhse | $\lvert dD(i-2)\cdot i \rvert \geq dDre$, $[i = s + \text{any one of 2 to n}]$ | (1-1): dDre |
| 1-2 | $\lvert D(i-1)\cdot i \rvert \leq Dvse$ or $\lvert D(i-1)\cdot i \rvert \leq Dvse$ $[i = s + \text{any one of 1 to n}]$ | (1-2): Dvse | $\lvert D(i-1)\cdot i \rvert -90° \rvert \leq Dhse$ $[i = s + \text{any one of 1 to n}]$ | (1-2): Dhse | $\lvert dD(i-2)\cdot i \rvert \geq dDre$, $[i = s + \text{any one of 2 to n}]$ | (1-2): dDre |
| .. | .. | .. | .. | .. | .. | .. |
| 6-6 | $\lvert D(i-1)\cdot i \rvert \leq Dvse$ or $\lvert D(i-1)\cdot i \rvert \leq Dvse$ $[i = s + \text{any one of 1 to n}]$ | (6-6): Dvse | $\lvert D(i-1)\cdot i \rvert -90° \rvert \leq Dhse$ $[i = s + \text{any one of 1 to n}]$ | (6-6): Dhse | $\lvert dD(i-2)\cdot i \rvert \geq dDre$, $[i = s + \text{any one of 2 to n}]$ | (6-6): dDre |

FIG. 26

Touch operation recognition condition storage unit — 115

| Subregion | Vertical slide | | Horizontal slide | | Rotation | |
|---|---|---|---|---|---|---|
| | Conditional expression | Threshold value | Conditional expression | Threshold value | Conditional expression | Threshold value |
| .. | .. | .. | .. | .. | .. | .. |
| 2-1 | $Lsn \geq Lvs$ and $\|\|D(i-1)\cdot i\| - 90°\| < Dvs$ [i = s + any one of 1 to n] | (2-1):Lvs = 30 mm (2-1):Dvs = 30° | $Lsn \geq Lhs$ and $\|D(i-1)\cdot i\| < Dhs$ (at time of rightward slide), $180° - \|D(i-1)\cdot i\| < Dhs$ (at time of leftward slide), [i = s + any one of 1 to n] | (2-1):Lhs = 15 mm (2-1):Dhs = 30° | $Lsn \geq Lr$ and $\|dD(i-2)\cdot i\| < dDr$, [i = s + any one of 2 to n] and $\|Rsn\| \geq Rr$ | (2-1):Lr = 25 mm (2-1):dDr = 60° (2-1):Rr = 200° |
| .. | .. | .. | .. | .. | .. | .. |

$Lsn \geq 30$ mm and $\|\|D(i-1)\cdot i\| - 90°\| < 30°$ [i = s + any one of 1 to n]

$Lsn \geq 15$ mm and $\|D(i-1)\cdot i\| < 30°$ (at time of rightward slide), $180° - \|D(i-1)\cdot i\| < 30°$ (at time of leftward slide), [i = s + any one of 1 to n]

$Lsn \geq 25$ mm and $\|dD(i-2)\cdot i\| < 60°$ [i = s + any one of 2 to n] and $\|Rsn\| \geq 200°$

Gesture operation end determination condition storage unit — 118

| Subregion | Vertical slide | | Horizontal slide | | Rotation | |
|---|---|---|---|---|---|---|
| | Conditional expression | Threshold value | Conditional expression | Threshold value | Conditional expression | Threshold value |
| .. | .. | .. | .. | .. | .. | .. |
| 2-1 | $\|D(i-1)\cdot i\| \leq Dvse$ or $180° - \|D(i-1)\cdot i\| \leq Dvse$ [i = s + any one of 1 to n] | (1-1): Dvse = 40° | $\|\|D(i-1)\cdot i\| - 90°\| \leq Dhse$ [i = s + any one of 1 to n] | (2-1): Dhse = 50° | $\|dD(i-2)\cdot i\| \geq dDre$, [i = s + any one of 2 to n] | (2-1): dDre = 60° |
| .. | .. | .. | .. | .. | .. | .. |

$\|\|D(i-1)\cdot i\| - 90°\| \leq 50°$ [i = s + any one of 1 to n]

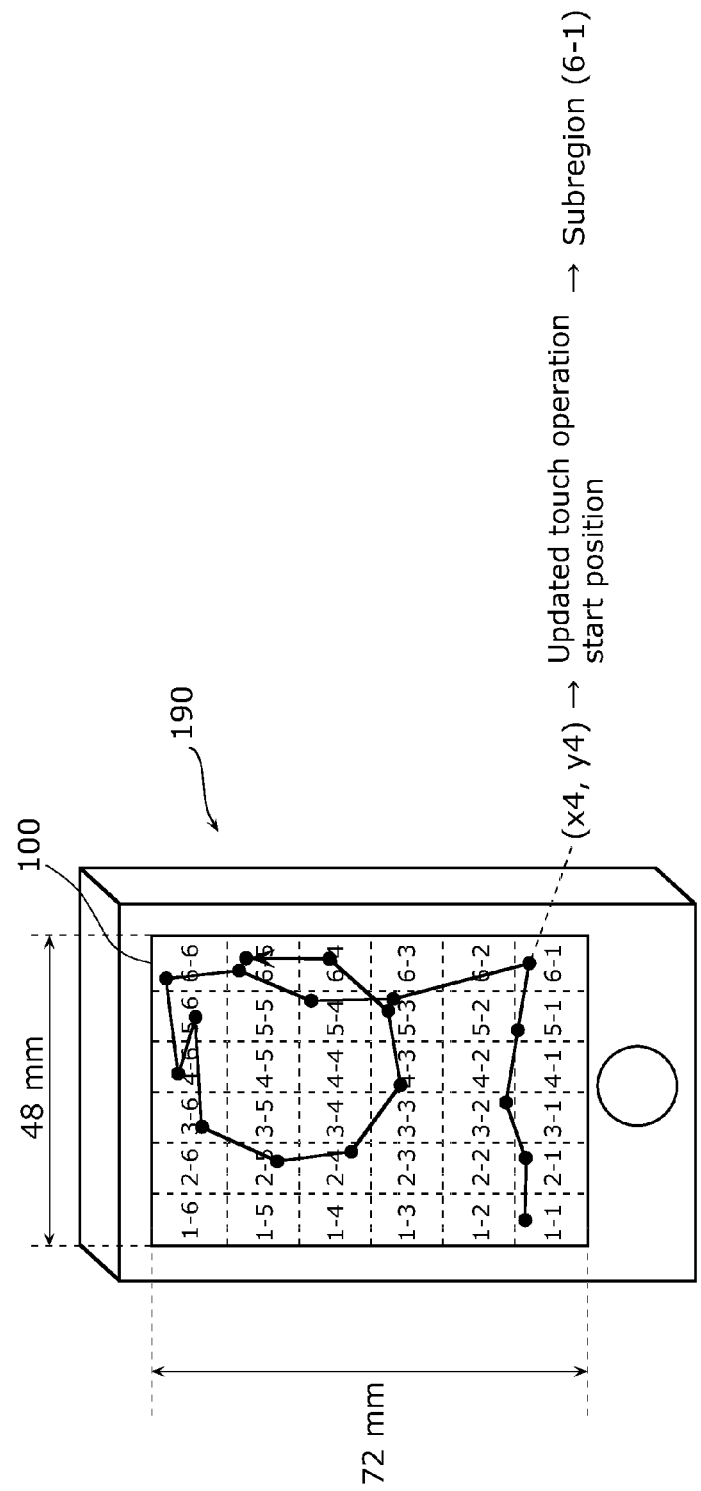

FIG. 29

115
Touch operation recognition condition storage unit

| Subregion | Vertical slide | | Horizontal slide | | Rotation | |
|---|---|---|---|---|---|---|
| | Conditional expression | Threshold value | Conditional expression | Threshold value | Conditional expression | Threshold value |
| ... | ... | ... | ... | ... | ... | ... |
| 6-1 | $Lsn \geq Lvs$ and $\lvert\lvert D(i-1)\cdot i\ -90°\rvert\ <Dvs\rvert$ $[i = s + $ any one of 1 to n] | (6-1):Lvs = 40 mm (6-1):Dvs = 30° | $Lsn \geq Lhs$ and $\lvert D(i-1)\cdot i\rvert <Dhs$ (at time of rightward slide), $180° - \lvert D(i-1)\cdot i\rvert <Dhs$ (at time of leftward slide), $[i = s + $ any one of 1 to n] | (6-1):Lhs = 40 mm (9-1):Dhs = 25° | $Lsn \geq Lr$ and $\lvert dD(i-2)\cdot i\rvert <dDr$, $[i = s + $ any one of 2 to n] and $\lvert Rsn\rvert \geq Rr$ | (6-1):Lr = 25 mm (6-1):dDr = 60° (6-1):Rr = 200° |
| ... | ... | ... | ... | ... | ... | ... |

$Lsn \geq 40$ mm and $\lvert\lvert D(i-1)\cdot i\ -90°\rvert\ \rvert < 30°$ $[i = s + $ any one of 1 to n]

$Lsn \geq 40$ mm and $\lvert D(i-1)\cdot i\rvert < 25°$ (at time of rightward slide), $180° - \lvert D(i-1)\cdot i\rvert < 25°$ (at time of leftward slide), $[i = s + $ any one of 1 to n]

$Lsn \geq 25$ mm and $\lvert dD(i-2)\cdot i\rvert < 60°$, $[i = s + $ any one of 2 to n] and $\lvert Rsn\rvert \geq 200°$ 118
Gesture operation end determination condition storage unit

| Subregion | Vertical slide | | Horizontal slide | | Rotation | |
|---|---|---|---|---|---|---|
| | Conditional expression | Threshold value | Conditional expression | Threshold value | Conditional expression | Threshold value |
| ... | ... | ... | ... | ... | ... | ... |
| 6-1 | $\lvert\lvert D(i-1)\cdot i\rvert\ \leq Dvse$ or $180° - \lvert D(i-1)\cdot i\rvert \leq Dvse$ $[i = s + $ any one of 1 to n] | (1-1): Dvse = 60° | $\lvert D(i-1)\cdot i\ -90°\rvert \leq Dhse$ $[i = s + $ any one of 1 to n] | (6-1): Dhse = 40° | $\lvert D(i-2)\cdot i\rvert \geq dDre$, $[i = s + $ any one of 2 to n] | (2-1): dDre = 70° |
| ... | ... | ... | ... | ... | ... | ... |

$\lvert\lvert D(i-1)\cdot i\rvert\ \leq 60°$ or $180° - \lvert D(i-1)\cdot i\rvert \leq 60°$ $[i = s + $ any one of 1 to n]

FIG. 32

Touch operation recognition condition storage unit — 115

| Subregion | Vertical slide | | Horizontal slide | | Rotation | |
|---|---|---|---|---|---|---|
| | Conditional expression | Threshold value | Conditional expression | Threshold value | Conditional expression | Threshold value |
| .. | .. | .. | .. | .. | .. | .. |
| 6-6 | $Lsn \geq Lvs$ and $\lvert\lvert D(i-1)\cdot i \rvert -90°\rvert < Dvs$ $[i = s + \text{any one of 1 to n}]$ | (6-6):Lvs = 30 mm (6-6):Dvs = 30° | $Lsn \geq Lhs$ and $\lvert D(i-1)\cdot i \rvert < Dhs$ (at time of rightward slide), $180° - \lvert D(i-1)\cdot i \rvert < Dhs$ (at time of leftward slide), $[i = s + \text{any one of 1 to n}]$ | (6-6):Lhs = 30 mm (6-6):Dhs = 30° | $Lsn \geq Lr$ and $\lvert dD(i-2)\cdot i \rvert < dDr$, $[i = s + \text{any one of 2 to n}]$ and $\lvert Rsn \rvert \geq Rr$ | (6-6):Lr = 25 mm (6-6):dDr = 90° (6-6):Rr = 180° |
| .. | .. | .. | .. | .. | .. | .. |

$Lsn \geq 30$ mm and $\lvert\lvert D(i-1)\cdot i \rvert -90°\rvert < 30°$ $[i = s + \text{any one of 1 to n}]$ $Lsn \geq 30$ mm and $\lvert D(i-1)\cdot i \rvert < 30°$ (at time of rightward slide), $180° - \lvert D(i-1)\cdot i \rvert < 30°$ (at time of leftward slide), $[i = s + \text{any one of 1 to n}]$ $Lsn \geq 25$ mm and $\lvert dD(i-2)\cdot i \rvert < 90°$, $[i = s + \text{any one of 2 to n}]$ and $\lvert Rsn \rvert \geq 180°$ Gesture operation end determination condition storage unit — 118

| Subregion | Vertical slide | | Horizontal slide | | Rotation | |
|---|---|---|---|---|---|---|
| | Conditional expression | Threshold value | Conditional expression | Threshold value | Conditional expression | Threshold value |
| .. | .. | .. | .. | .. | .. | .. |
| 6-6 | $\lvert D(i-1)\cdot i \rvert \leq Dvse$ or $180° - \lvert D(i-1)\cdot i \rvert \leq Dvse$ $[i = s + \text{any one of 1 to n}]$ | (6-6): Dvse = 60° | $\lvert\lvert D(i-1)\cdot i \rvert -90°\rvert \leq Dhse$ $[i = s + \text{any one of 1 to n}]$ | (6-6): Dhse = 60° | $\lvert D(i-2)\cdot i \rvert \geq dDre$, $[i = s + \text{any one of 2 to n}]$ | (6-6): dDre = 90° |
| .. | .. | .. | .. | .. | .. | .. |

FIG. 35

Touch operation recognition condition storage unit — 115

| Subregion | Vertical slide | | Horizontal slide | | Rotation | |
|---|---|---|---|---|---|---|
| | Conditional expression | Threshold value | Conditional expression | Threshold value | Conditional expression | Threshold value |
| ... | ... | ... | ... | ... | ... | ... |
| 3-6 | $Lsn \geq Lvs$ and $\lvert\lvert D(i-1)\cdot i \rvert -90° \rvert < Dvs$ [i = s + any one of 1 to n] | (3-6):Lvs = 40 mm (3-6):Dvs = 45° | $Lsn \geq Lhs$ and $\lvert D(i-1)\cdot i \rvert < Dhs$ (at time of rightward slide), $180° - \lvert D(i-1)\cdot i \rvert < Dhs$ (at time of leftward slide), [i = s + any one of 1 to n] | (3-6):Lhs = 40 mm (3-6):Dhs = 45° | $Lsn \geq Lr$ and $\lvert dD(i-2)\cdot i \rvert < dDr$, [i = s + any one of 2 to n] and $\lvert Rsn \rvert \geq Rr$ | (3-6):Lr = 25 mm (3-6):dDr = 45° (3-6):Rr = 180° |
| ... | ... | ... | ... | ... | ... | ... |

$Lsn \geq 40$ mm and $\lvert \lvert D(i-1)\cdot i \rvert -90° \rvert < 45°$ [i = s + any one of 1 to n]

$Lsn \geq 40$ mm and $\lvert D(i-1)\cdot i \rvert < 45°$ (at time of rightward slide), $180° - \lvert D(i-1)\cdot i \rvert < 45°$ (at time of leftward slide), [i = s + any one of 1 to n]

$Lsn \geq 25$ mm and $\lvert dD(i-2)\cdot i \rvert < 45°$, [i = s + any one of 2 to n] and $\lvert Rsn \rvert \geq 180°$ Gesture operation end determination condition storage unit — 118

| Subregion | Vertical slide | | Horizontal slide | | Rotation | |
|---|---|---|---|---|---|---|
| | Conditional expression | Threshold value | Conditional expression | Threshold value | Conditional expression | Threshold value |
| ... | ... | ... | ... | ... | ... | ... |
| 3-6 | $\lvert D(i-1)\cdot i \rvert \leq Dvse$ or $180° - \lvert D(i-1)\cdot i \rvert \leq Dvse$ [i = s + any one of 1 to n] | (3-6): Dvse = 45° | $\lvert \lvert D(i-1)\cdot i \rvert -90° \rvert \leq Dhse$ [i = s + any one of 1 to n] | (3-6): Dhse = 45° | $\lvert D(i-2)\cdot i \rvert \geq dDre$, [i = s + any one of 2 to n] | (3-6): dDre = 45° |
| ... | ... | ... | ... | ... | ... | ... |

FIG. 42

Touch operation recognition condition storage unit 115

| Subregion | Holding hand | Vertical slide | | Horizontal slide | | Rotation | |
|---|---|---|---|---|---|---|---|
| | | Conditional expression | Threshold value | Conditional expression | Threshold value | Conditional expression | Threshold value |
| 1-1 | Right hand | $Lsn \geq Lvs$ and $\|\|D(i-1)\cdot i\| -90°\| < Dvs$ $[i = s + $ any one of 1 to n$]$ | (R) (1-1): Lvs (LR) (1-1): Dvs | $Lsn \geq Lvs$ and $\|D(i-1)\cdot i\| < Dhs$ (at time of rightward slide), $180° - \|D(i-1)\cdot i\| < Dhs$ (at time of leftward slide), $[i = s + $ any one of 1 to n$]$ | (R) (1-1): Lhs (R) (1-1): Dhs | $Lsn \geq Lr$ and $\|dD(i-2)\cdot i\| < dDr$, $[i = s + $ any one of s to n$]$ and $\|Rsnl\| \geq Rr$ | (R) (1-1): Lr (R) (1-1): dDr (R) (1-1): Rr |
| | Left hand | $Lsn \geq Lvs$ and $\|\|D(i-1)\cdot i\| -90°\| < Dvs$ $[i = s + $ any one of 1 to n$]$ | (L) (1-1): Lvs (L) (1-1): Dvs | $Lsn \geq Lvs$ and $\|D(i-1)\cdot i\| < Dhs$ (at time of rightward slide), $180° - \|D(i-1)\cdot i\| < Dhs$ (at time of leftward slide), $[i = s + $ any one of 1 to n$]$ | (L) (1-1): Lhs (L) (1-1): Dhs | $Lsn \geq Lr$ and $\|dD(i-2)\cdot i\| < dDr$, $[i = s + $ any one of s to n$]$ and $\|Rsnl\| \geq Rr$ | (L) (1-1): Lr (L) (1-1): dDr (L) (1-1): Rr |
| | Both hands | $Lsn \geq Lvs$ and $\|\|D(i-1)\cdot i\| -90°\| < Dvs$ $[i = s + $ any one of 1 to n$]$ | (LR) (1-1): Lvs (LR) (1-1): Dvs | $Lsn \geq Lvs$ and $\|D(i-1)\cdot i\| < Dhs$ (at time of rightward slide), $180° - \|D(i-1)\cdot i\| < Dhs$ (at time of leftward slide), $[i = s + $ any one of 1 to n$]$ | (LR) (1-1): Lhs (LR) (1-1): Dhs | $Lsn \geq Lr$ and $\|dD(i-2)\cdot i\| < dDr$, $[i = s + $ any one of s to n$]$ and $\|Rsnl\| \geq Rr$ | (LR) (1-1): Lr (LR) (1-1): dDr (LR) (1-1): Rr |
| 1-2 | Right hand | $Lsn \geq Lvs$ and $\|\|D(i-1)\cdot i\| -90°\| < Dvs$ $[i = s + $ any one of 1 to n$]$ | (R) (1-2): Lvs (R) (1-2): Dvs | $Lsn \geq Lvs$ and $\|D(i-1)\cdot i\| < Dhs$ (at time of rightward slide), $180° - \|D(i-1)\cdot i\| < Dhs$ (at time of leftward slide), $[i = s + $ any one of 1 to n$]$ | (R) (1-2): Lhs (R) (1-2): Dhs | $Lsn \geq Lr$ and $\|dD(i-2)\cdot i\| < dDr$, $[i = s + $ any one of s to n$]$ and $\|Rsnl\| \geq Rr$ | (R) (1-2): Lr (R) (1-2): dDr (R) (1-2): Rr |
| | Left hand | $Lsn \geq Lvs$ and $\|\|D(i-1)\cdot i\| -90°\| < Dvs$ $[i = s + $ any one of 1 to n$]$ | (L) (1-2): Lvs (L) (1-2): Dvs | $Lsn \geq Lvs$ and $\|D(i-1)\cdot i\| < Dhs$ (at time of rightward slide), $180° - \|D(i-1)\cdot i\| < Dhs$ (at time of leftward slide), $[i = s + $ any one of 1 to n$]$ | (L) (1-2): Lhs (L) (1-2): Dhs | $Lsn \geq Lr$ and $\|dD(i-2)\cdot i\| < dDr$, $[i = s + $ any one of s to n$]$ and $\|Rsnl\| \geq Rr$ | (L) (1-2): Lr (L) (1-2): dDr (L) (1-2): Rr |
| | Both hands | $Lsn \geq Lvs$ and $\|\|D(i-1)\cdot i\| -90°\| < Dvs$ $[i = s + $ any one of 1 to n$]$ | (LR) (1-2): Lvs (LR) (1-2): Dvs | $Lsn \geq Lvs$ and $\|D(i-1)\cdot i\| < Dhs$ (at time of rightward slide), $180° - \|D(i-1)\cdot i\| < Dhs$ (at time of leftward slide), $[i = s + $ any one of 1 to n$]$ | (LR) (1-2): Lhs (LR) (1-2): Dhs | $Lsn \geq Lr$ and $\|dD(i-2)\cdot i\| < dDr$, $[i = s + $ any one of s to n$]$ and $\|Rsnl\| \geq Rr$ | (LR) (1-2): Lr (LR) (1-2): dDr (LR) (1-2): Rr |
| ⋮ | | | | | | | |
| 6-6 | Right hand | $Lsn \geq Lvs$ and $\|\|D(i-1)\cdot i\| -90°\| < Dvs$ $[i = s + $ any one of 1 to n$]$ | (R) (6-6): Lvs (R) (6-6): Dvs | $Lsn \geq Lvs$ and $\|D(i-1)\cdot i\| < Dhs$ (at time of rightward slide), $180° - \|D(i-1)\cdot i\| < Dhs$ (at time of leftward slide), $[i = s + $ any one of 1 to n$]$ | (R) (6-6): Lhs (R) (6-6): Dhs | $Lsn \geq Lr$ and $\|dD(i-2)\cdot i\| < dDr$, $[i = s + $ any one of s to n$]$ and $\|Rsnl\| \geq Rr$ | (R) (6-6): Lr (R) (6-6): dDr (R) (6-6): Rr |
| | Left hand | $Lsn \geq Lvs$ and $\|\|D(i-1)\cdot i\| -90°\| < Dvs$ $[i = s + $ any one of 1 to n$]$ | (L) (6-6): Lvs (L) (6-6): Dvs | $Lsn \geq Lvs$ and $\|D(i-1)\cdot i\| < Dhs$ (at time of rightward slide), $180° - \|D(i-1)\cdot i\| < Dhs$ (at time of leftward slide), $[i = s + $ any one of 1 to n$]$ | (L) (6-6): Lhs (L) (6-6): Dhs | $Lsn \geq Lr$ and $\|dD(i-2)\cdot i\| < dDr$, $[i = s + $ any one of s to n$]$ and $\|Rsnl\| \geq Rr$ | (L) (6-6): Lr (L) (6-6): dDr (L) (6-6): Rr |
| | Both hands | $Lsn \geq Lvs$ and $\|\|D(i-1)\cdot i\| -90°\| < Dvs$ $[i = s + $ any one of 1 to n$]$ | (LR) (6-6): Lvs (LR) (6-6): Dvs | $Lsn \geq Lvs$ and $\|D(i-1)\cdot i\| < Dhs$ (at time of rightward slide), $180° - \|D(i-1)\cdot i\| < Dhs$ (at time of leftward slide), $[i = s + $ any one of 1 to n$]$ | (LR) (6-6): Lhs (LR) (6-6): Dhs | $Lsn \geq Lr$ and $\|dD(i-2)\cdot i\| < dDr$, $[i = s + $ any one of s to n$]$ and $\|Rsnl\| \geq Rr$ | (LR) (6-6): Lr (LR) (6-6): dDr (LR) (6-6): Rr |

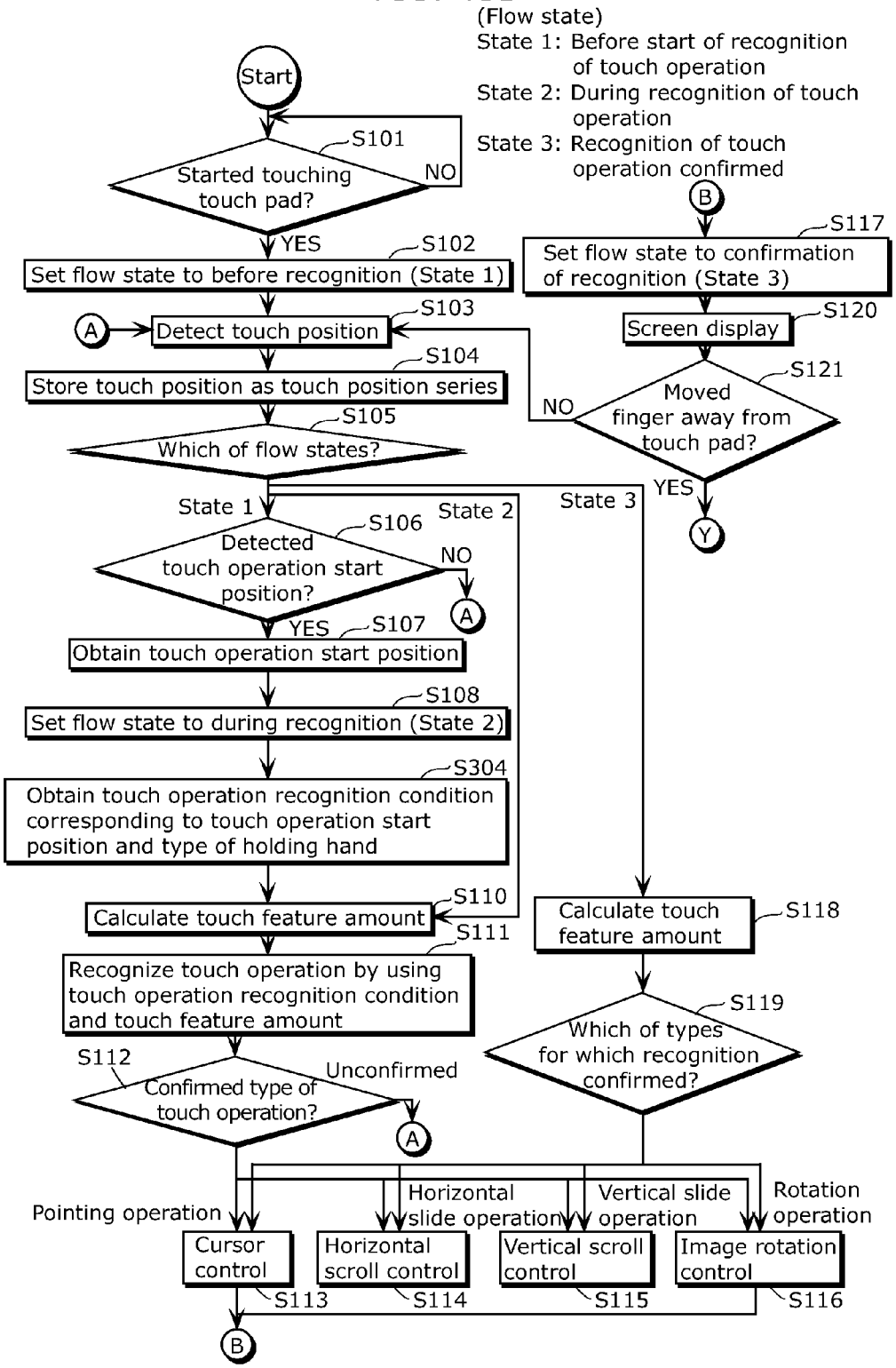

FIG. 45
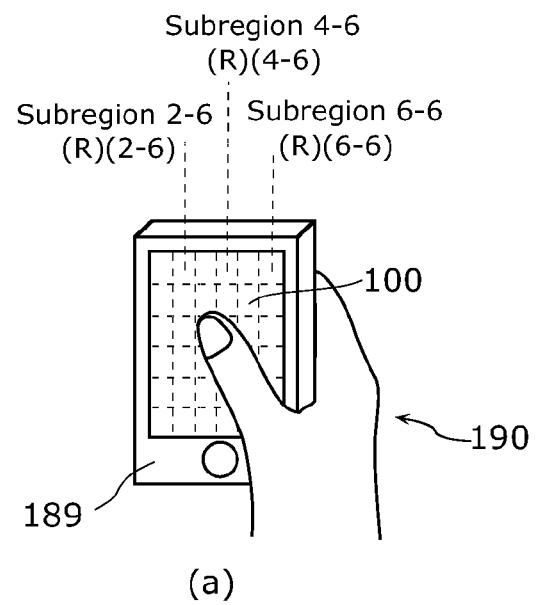
(a)
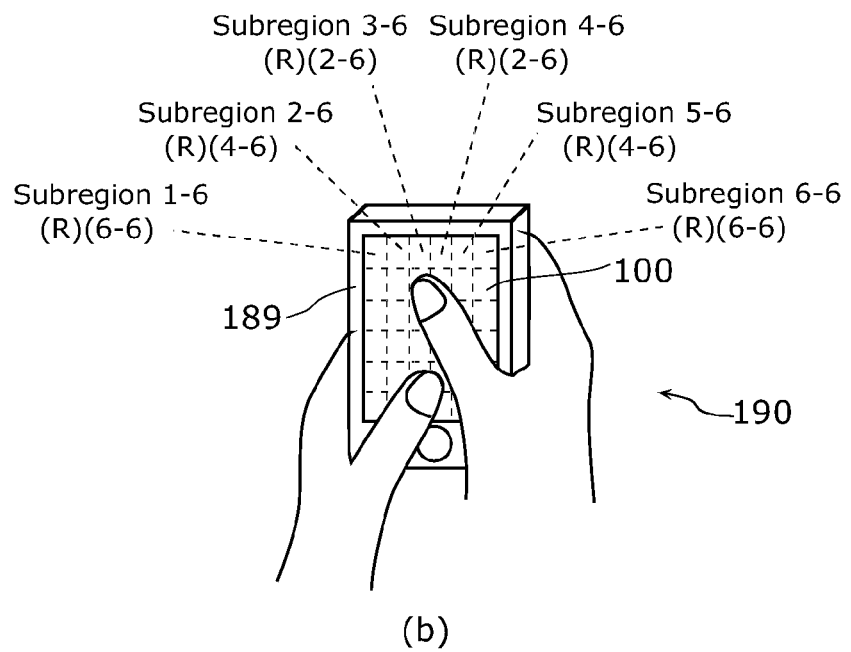
(b)

FIG. 55
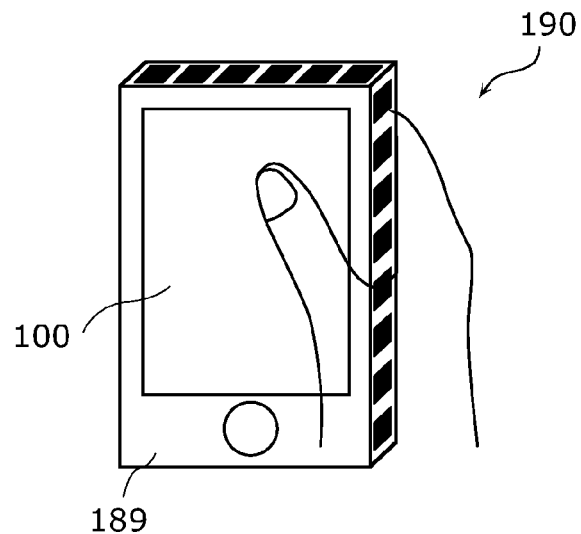
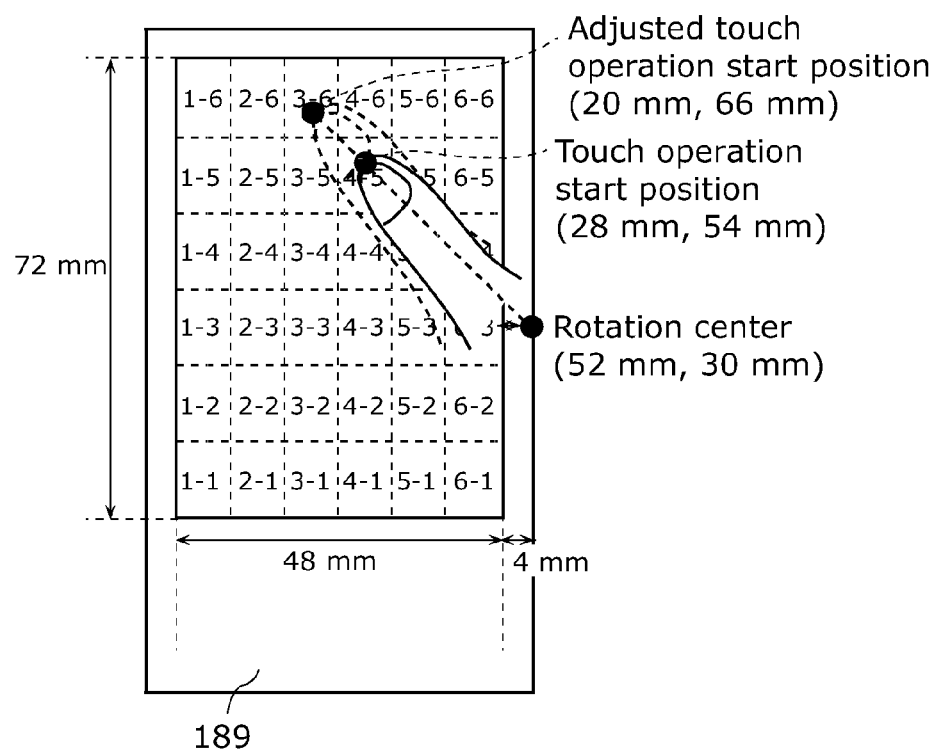

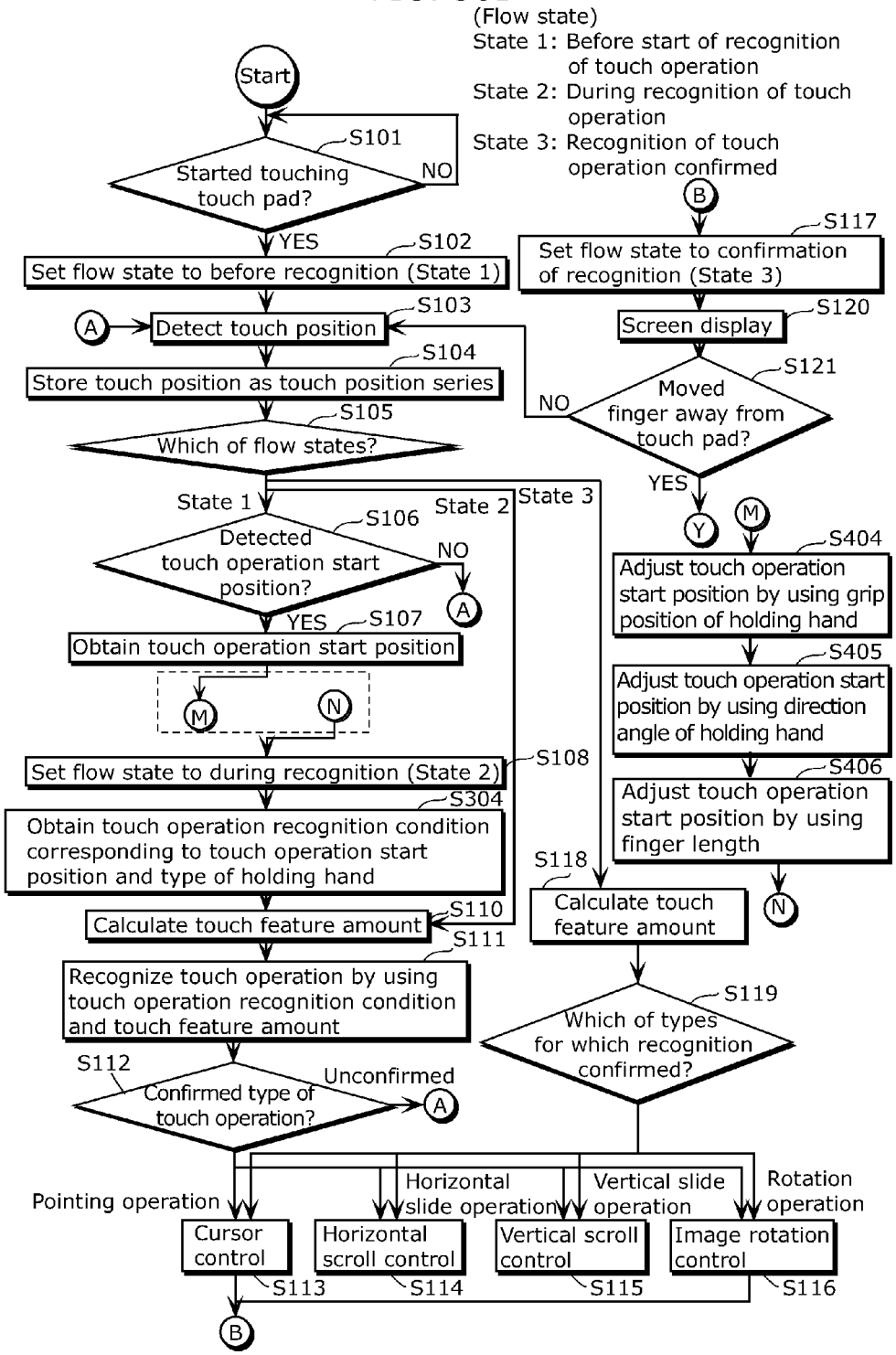

FIG. 59

Touch operation type frequency storage unit — 127

| Subregion | The number of times vertical slide recognized | The number of times horizontal slide recognized | The number of times rotation recognized | The number of times pointing recognized |
|---|---|---|---|---|
| 1-1 | 6 | 4 | 8 | 2 |
| 1-2 | 0 | 3 | 4 | 3 |
| 1-3 | 3 | 3 | 3 | 3 |
| 1-4 | 5 | 0 | 2 | 3 |
| 1-5 | 5 | 3 | 2 | 0 |
| 1-6 | 0 | 0 | 0 | 4 |
| 2-1 | 5 | 2 | 0 | 0 |
| 2-2 | 0 | 0 | 3 | 0 |
| 2-3 | 3 | 3 | 0 | 4 |
| 2-4 | 0 | 0 | 3 | 7 |
| ... | ... | ... | ... | ... |
| 6-6 | 3 | 2 | 4 | 1 |

FIG. 60

| Subregion | Recognition priority level of vertical slide | Recognition priority level of horizontal slide | Recognition priority level of rotation | Recognition priority level of pointing |
|---|---|---|---|---|
| 1-1 | 30 | 20 | 40 | 10 |
| 1-2 | 0 | 30 | 40 | 30 |
| 1-3 | 25 | 25 | 25 | 25 |
| 1-4 | 50 | 0 | 20 | 30 |
| 1-5 | 50 | 30 | 20 | 0 |
| 1-6 | 0 | 0 | 0 | 100 |
| 2-1 | 17 | 83 | 0 | 0 |
| 2-2 | 0 | 0 | 100 | 0 |
| 2-3 | 30 | 30 | 0 | 40 |
| 2-4 | 0 | 0 | 30 | 70 |
| ⋮ | ⋮ | ⋮ | ⋮ | ⋮ |
| 6-6 | 30 | 20 | 40 | 10 |

FIG. 61

| Touch position | Size of angle range of movement direction in recognition of slide operation | Size of angle range of movement direction difference in recognition of rotation operation | Size of angle range of movement direction or movement direction difference in recognition of pointing operation |
|---|---|---|---|
| (xs, ys) ↓ (x(s+1), y(s+1)) | Ds × 4 | dDr × 2 | 360° − Ds × 4 × Ps − dDr × 2 × Pr |
| (x(s+1), y(s+1)) ↓ (x(s+2), y(s+2)) | Ds × 2 | dDr × 2 | 360° − Ds × 2 × Ps − dDr × 2 × Pr |
| (x(s+2), y(s+2)) ↓ (x(s+3), y(s+3)) | Ds × 2 | dDr × 2 | 360° − Ds × 2 × Ps − dDr × 2 × Pr |
| | ↓ | ↓ | ↓ |
| Sum of direction ranges = degree of ease of input | Ds × 8 | dDr × 6 | 1080° − Ds × 8 × Ps − dDr × 6 × Pr |

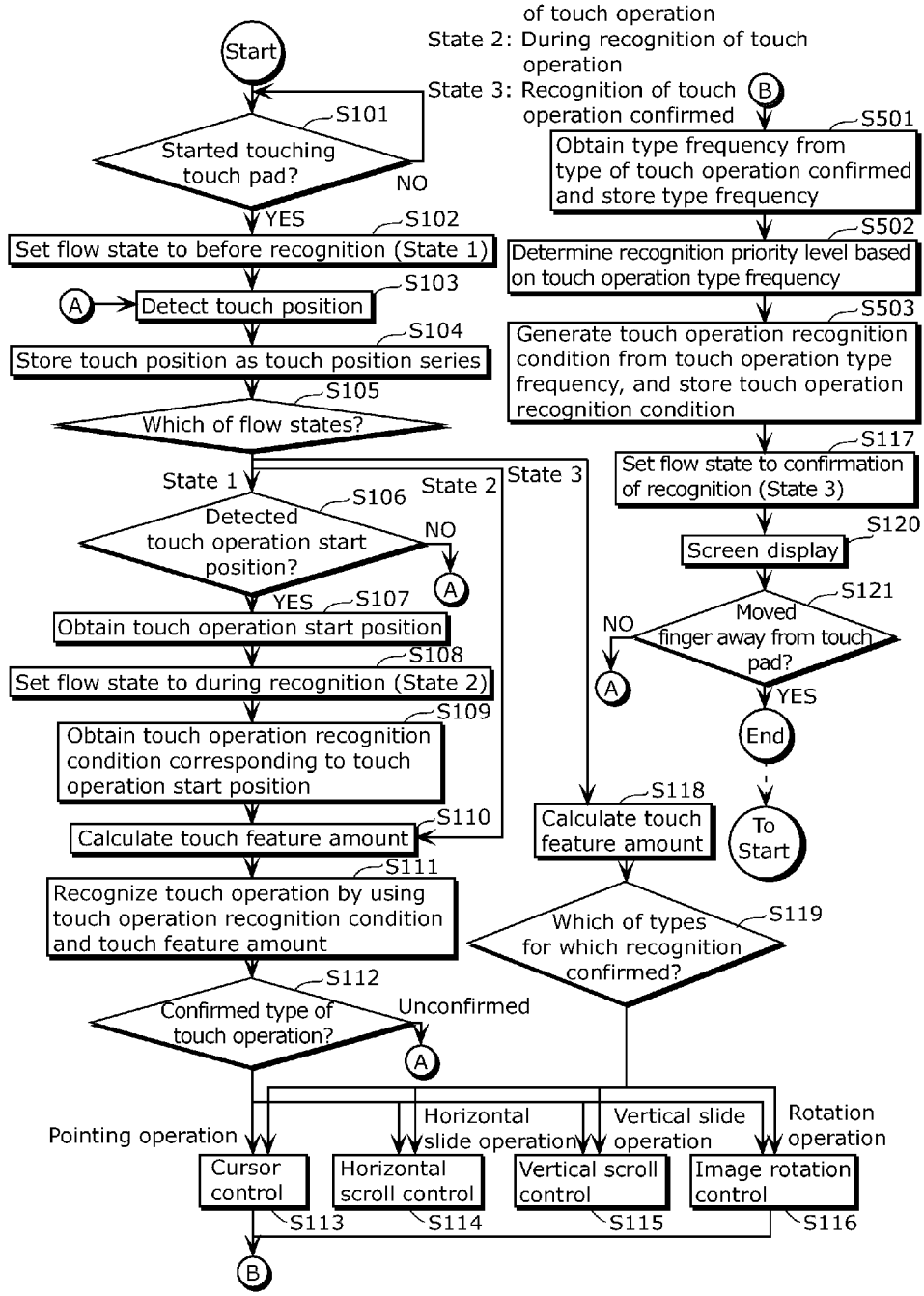

FIG. 67

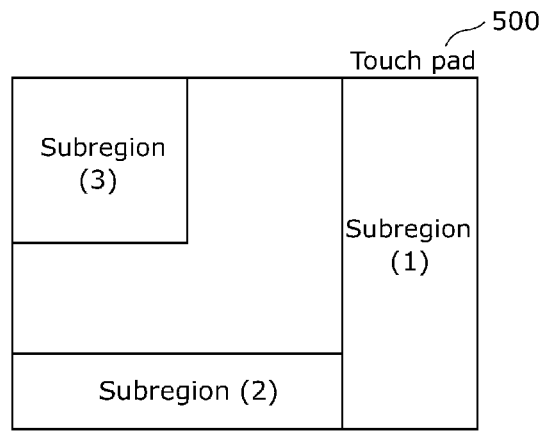

FIG. 68

| Subregion | Type of touch operation |
|---|---|
| (1) | Vertical slide operation |
| (2) | Horizontal slide operation |
| (3) | Rotation operation |

FIG. 69

| Type of touch operation | Recognition condition |
|---|---|
| Vertical slide operation | Vertical movement distance from touch operation start position greater than or equal to 10 mm |
| Horizontal slide operation | Horizontal movement distance from touch operation start position greater than or equal to 10 mm |
| Rotation operation | Angle between line segment connecting center of touch pad and touch operation start position and line segment connecting center of touch pad and current touch position greater than or equal to 15° |

FIG. 70
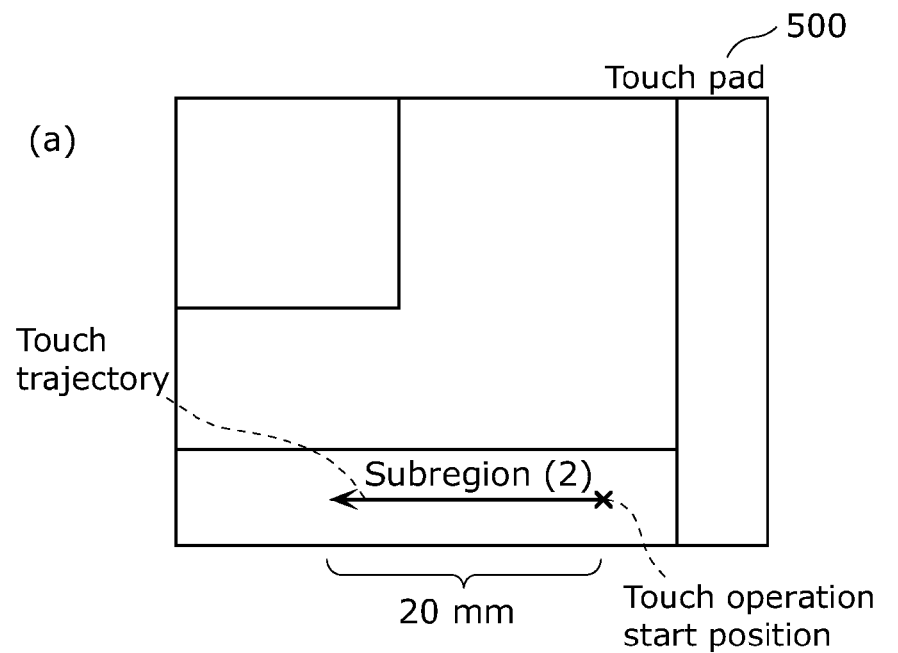
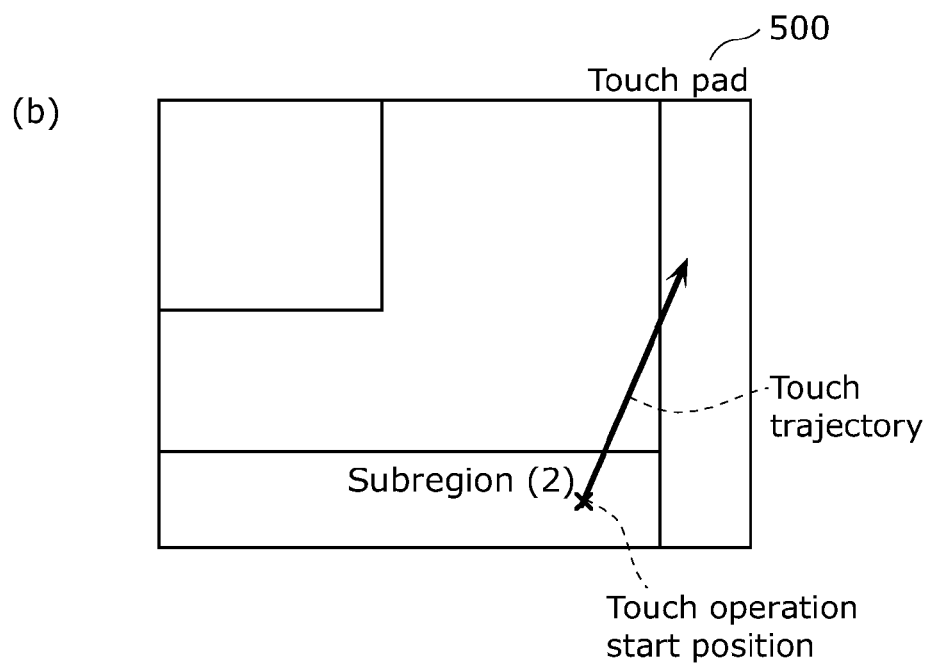

INFORMATION INPUT APPARATUS, INFORMATION INPUT METHOD, AND PROGRAM

TECHNICAL FIELD

The present invention relates to information input apparatuses, and particularly to an information input apparatus of which the graphical user interface (GUI) displayed on a screen is operated with a touch sensor.

BACKGROUND ART

Along with the screen size increase and the enhancement of performance of displays, televisions are not being merely used for viewing broadcast programs or movies.

Specifically, televisions having new functions such as browsing of diverse information on the Internet, coordination with home appliances connected through a network, and a wide variety of applications including photo browsers and games are being developed and increasingly used.

In such a situation, to operate the diverse applications or functions, it is indispensable to develop input apparatuses which allow more flexible input operations, in addition to conventional input apparatuses including a plurality of buttons.

A pointing device is an input apparatus which successfully designates a given position or direction by controlling a pointer or a cursor displayed on a screen. For instance, a touch panel, a trackball, a joystick, and a mouse are put to practical use as the pointing device.

Because, compared to a conventional button-based input apparatus, the pointing device allows easy versatile operations such as menu or object selection regardless of the configuration of a GUI, the pointing device is installed on many cellular phones, AV apparatuses, and game consoles. Above all, many apparatuses which adopt a touch panel or a touch pad as the input apparatus have been developed in recent years, and the apparatuses are characterized by a sense of intuition for operation by directly touching with a finger or a pen.

With the advancement of the sensing technology, it has become possible not only to perform operations such as cursor movement and GUI objection selection but also to directly perform various functions through a "gesture operation" which inputs a specific movement or trajectory on the touch pad/touch panel.

Such a touch operation which allows easy input with only the hand is often adopted by small handheld apparatuses.

Patent Literature (PTL) 1 discloses a method of scrolling on a screen by performing an operation of drawing a line trajectory (slide operation) on an operation region provided at an end of a touch pad without selecting, with a cursor, a scroll bar provided as a GUI object.

When a vertical scroll is performed, an upward or downward slide operation is inputted at the right end of the touch pad. When a horizontal scroll is performed, a rightward or leftward slide operation is inputted at the bottom end of the touch pad.

Moreover, even when a touch operation is started from the end of the touch pad, moving a finger to the central direction of the touch pad also makes it possible to switch to a normal cursor movement (a pointing operation) without scrolling.

CITATION LIST

Patent Literature

[PTL 1]
U.S. Pat. No. 5,943,052

SUMMARY OF INVENTION

Technical Problem

However, in PTL 1, although it is possible to input either a gesture operation of one type or a pointing operation of one type on a subregion specified on the touch pad, it is impossible to input one of gesture operations of types (e.g., one of a vertical slide operation and a horizontal slide operation) for the same touch operation start position.

It is necessary to start performing each of the gesture operations on a corresponding one of subregions resulting from previous division of the touch pad. Moreover, adding a gesture operation to be recognized requires the separate provision of a subregion for the added gesture operation.

As described above, in PTL 1, it is necessary to provide as many corresponding subregions as the number of types of gesture operation to be used, and it is impossible to input a given gesture operation at a given position on the touch pad. Therefore, because an operator, while being aware of a position of a finger on the touch pad, needs to operate the touch pad carefully, the ease of input is reduced, which decreases input efficiency.

The present invention is conceived to solve the above problem and has an object to provide an information input apparatus which has a touch pad and allows, even when an operation is started at any position, the quick input of gesture operations of types without reducing the ease of input.

Solution to Problem

An information input apparatus according to an aspect of the present invention includes: a touch sensor that is a sensor for inputting information; a touch information detecting unit which detects touch information that is information resulting from an operator contacting the touch sensor with a finger; a touch operation start position detecting unit which detects, using the touch information, a touch operation start position that is a start position of a touch operation performed by the operator; a touch operation recognition condition storage unit which stores a plurality of touch operation recognition conditions each for recognizing one of types of touch operation, in association with each of touch operation start positions; and a touch recognizing unit which recognizes the touch operation, using the touch operation recognition conditions stored in association with the touch operation start position detected by the touch operation start position detecting unit, to determine a type of the touch operation.

With this configuration, it is possible to make, for each of types of gesture, a condition for recognizing the type of gesture different depending on the touch operation start position. There is a correlation between the touch operation start position and a type of gesture the operator is thinking to input. For instance, when inputting a gesture requiring the finger to move rightward, the operator selects the left side on the operation surface of the touch sensor as the touch operation start position, if possible. This is because starting the touch operation from the right side on the operation surface leaves no space for subsequently inputting a gesture operation. Thus, it is possible to achieve the information input apparatus which allows the touch operations without reducing the each of input of the gesture operation even when the operation is started at any position, by setting the touch operation recognition conditions according to a tendency of an operation start position of each gesture operation, which results from the shape of the housing of the information input apparatus or a way the housing is held.

Moreover, the touch operation recognizing unit may output, as a result of the recognition, the type of the touch operation and an operation amount indicating a magnitude of the touch operation, and the type of the recognized touch operation may indicate either a pointing operation for inputting a position designated by the operator or any one of gesture operations of types each for instructing execution of a predetermined specific process.

More specifically, when the touch operation recognizing unit outputs the type of the gesture operation as the recognition result, the touch operation recognizing unit may determine whether or not the gesture operation of the outputted type has been inputted, and when the touch operation recognizing unit determines that the gesture operation has been inputted, the touch operation recognizing unit may output, as a gesture operation end position, at least one of (1) a touch position that is a position which is on an operation surface of the touch sensor being contacted by the operator and is detected when the determination is made and (2) a touch position that is a position which is on the operation surface of the touch sensor being contacted by the operator and is detected immediately before the determination, and the touch operation start position detecting unit may detect the outputted gesture operation end position as the touch operation start position.

Moreover, the touch operation start position detecting unit may detect, as the touch operation start position, a touch position at which the operator first contacts the touch sensor with the finger. This enables the information input apparatus to detect the end of the gesture operation inputted by the operator without the operator removing the finger from the touch sensor. Thus, it is possible to set the gesture operation end determination conditions according to a tendency of the operation start position of each gesture operation, which results from the shape of the housing of the information input apparatus or the way the housing is held. As a result, it is possible to achieve the information input apparatus which allows the continuous input of the gestures without the operator removing the finger from the touch sensor, and the input of the touch operations without reducing the ease of input of the gesture operation even when the operation is started at any position.

Moreover, the information input apparatus may further include a touch information series storage unit which may store the touch information for a predetermined certain period of time, wherein the touch operation recognizing unit may include: a touch feature amount calculation unit which may calculate, as a touch feature amount, at least one of a touch operation time, a touch movement distance, a touch movement speed, a touch movement acceleration, and a touch movement direction, using the touch information stored in the touch information series storage unit; and a touch operation determining unit which may determine the type of touch operation using the touch feature amount, based on the touch operation recognition conditions stored in the touch operation recognition condition storage unit in association with each of the touch operation start positions.

More specifically, the touch sensor may be a capacitance touch sensor, and the touch information may include a touch position and a capacitance value indicating a touch strength that is a strength of a touch operation at a time of contacting.

Furthermore, the touch operation recognition condition storage unit may store the touch operation recognition conditions in association with each of a plurality of subregions specified on an operation surface of the touch sensor, and the touch operation determining unit may determine whether or not the touch feature amount satisfies a touch operation recognition condition, and to determine, when the touch operation determining unit determines that the touch feature amount fails to satisfy the touch operation recognition condition, that the type of the touch operation does not indicate a first touch operation that is a touch operation of one of the types, the touch operation recognition condition being one of the touch operation recognition conditions stored in association with, among the subregions, a subregion including the touch operation start position and being for recognizing the first touch operation.

More specifically, a first touch operation recognition condition may be different from a second touch operation recognition condition, the first touch operation recognition condition being one of the touch operation recognition conditions stored in the touch operation recognition condition storage unit in association with a first subregion among the subregions and being for recognizing the first touch operation, and the second touch operation recognition condition being one of the touch operation recognition conditions stored in the touch operation recognition condition storage unit in association with a second subregion among the subregions and being for recognizing the first touch operation.

Moreover, the information input apparatus may include a gesture operation end determination condition storage unit, wherein the touch operation recognizing unit may further include a gesture operation end determining unit and a gesture end position obtaining unit, the gesture operation end determination condition storage unit may store a plurality of gesture operation end determination conditions that are conditions each for determining whether or not one of the gesture operations of the types has been ended, in association with each of the subregions, the gesture operation end determining unit may determine whether or not the touch feature amount satisfies a gesture operation end determination condition, the gesture operation end determination condition being one of the gesture operation end determination conditions stored in association with, among the subregions, the subregion including the touch operation start position and being for determining whether or not the gesture operation of the type determined by the touch operation determining unit has ended, the gesture end position obtaining unit may output, when a result of the determination shows that the touch feature amount satisfies the gesture operation end determination condition, at least one of a touch position detected when the gesture operation end determination condition is satisfied and a touch position detected prior to the satisfaction of the gesture operation end determination condition, as a gesture operation end position, and the touch operation start position detecting unit may detect the outputted gesture operation end position as the touch operation start position.

Moreover, the information input apparatus may further include a grip information detecting unit which may detect grip information about the operator relative to the information input apparatus, wherein the touch operation recognition condition storage unit may store the touch operation recognition conditions in association with the grip information and each of the touch operation start positions, and the touch operation recognizing unit may recognize the touch operation, using the touch operation recognition conditions stored in association with the grip information and each of the touch operation start positions, to determine the type of the touch operation.

Furthermore, the grip information may include at least one of a type of holding hand with which the operator holds the information input apparatus, a grip position on the information input apparatus gripped by the operator, a direction angle of the information input apparatus relative to a gripping hand of the operator, and a length of the finger used for a touch operation by the operator.

Moreover, the information input apparatus may include a peripheral contact sensor which may be provided to at least part of a housing of the information input apparatus and may detect a contact position of at least one of the hand and the finger of the operator relative to the information input apparatus, wherein the grip information detecting unit may detect the type of holding hand included in the grip information, using the contact position detected by the peripheral contact sensor, the touch operation recognition condition storage unit may store the touch operation recognition conditions in association with each of types of holding hand and each of the touch operation start positions, and the touch operation recognizing unit may determine the type of the touch operation, using the touch operation recognition conditions obtained from the touch operation recognition condition storage unit.

With this configuration, the information input apparatus further detects the type of holding hand (the right hand, left hand, or both hands) of the operator. Thus, it is possible to set the touch operation recognition conditions or gesture operation end conditions separately according to the type of holding hand. As a result, it is possible to provide the information input apparatus which facilitates the recognition of the specific gesture operation more than that of the other gesture operations according to the type of holding hand of the operator, and enables the quick input at a position convenient to the operator.

Moreover, the information input apparatus may further include a peripheral proximity sensor which may be provided to at least part of a housing of the information input apparatus and may detect a proximity state of at least one of the hand and the finger of the operator relative to the information input apparatus, wherein the touch operation recognition condition storage unit may store the touch operation recognition conditions in association with each of the subregions specified on an operation surface of the touch sensor, the grip information detecting unit may detect at least one of the grip position, the direction angle, and the length of the finger, using the proximity state detected by the peripheral proximity sensor, and the touch operation recognizing unit may calculate a difference between a predetermined reference grip state and the at least one of the detected grip position, direction angle, and length of the finger, adjust the touch operation start position so that the difference becomes smaller, and recognize the touch operation, using the touch operation recognition conditions stored in association with, among the subregions, a subregion including the adjusted touch operation start position.

With this configuration, the information input apparatus detects the grip state of the housing gripped by the operator. Thus, the information input apparatus compares the detected grip state to the reference grip state determined when the touch operation recognition conditions are set, and adjusts the detected touch operation start position so that the difference becomes smaller. As a result, the information input apparatus (i) facilitates the recognition of the specific gesture operation more than that of the other gesture operations according to the type of holding hand of the operator without causing the operator to change the manner of holding the housing or changing the association between the subregions and the recognition conditions stored in the touch operation recognition condition storage unit, even when the hand holding the housing is displaced, and (ii) enables the quick input at the position convenient to the operator.

Moreover, the touch operation recognizing unit may calculate the difference between the predetermined reference grip state and the at least one of the detected grip position, direction angle, and length of the finger, adjust the touch position so that the difference becomes smaller, determine the type of the touch operation, using the adjusted touch position, and output an operation amount indicating a magnitude of the touch operation.

With this, the information input apparatus compares the detected grip state to the reference grip state determined when the touch operation recognition conditions are set, and adjusts the detected touch operation start position so that the difference becomes smaller. As a result, the information input apparatus facilitates the recognition of the specific gesture operation more than that of the other gesture operations according to the type of holding hand of the operator even when the hand holding the housing is displaced, and enables the quick input at the position convenient to the operator.

Moreover, the information input apparatus may include a recognition priority level determining unit may determine a recognition priority level indicating a degree of recognition for each of the types of touch operation, in association with each of the subregions; and a touch operation recognition condition update unit may update, according to the recognition priority level determined in association with, among the subregions, a third subregion, the touch operation recognition conditions stored in association with the third subregion, wherein the touch operation recognition condition update unit may update a threshold value included in the touch operation recognition conditions so that a type of touch operation having a higher recognition priority level is recognized more easily.

With this configuration, the touch operation type frequency storage unit obtains and stores the touch operation type frequency that is the result of the recognition of the touch operation, the recognition priority level determining unit determines the priority level for recognizing the touch operation using the touch operation type frequency, and the touch operation recognition condition update unit updates the touch operation recognition conditions using the recognition priority level. As a result, the information input apparatus is capable of not only inputting the gesture operations even when the operation is started at any position on the touch sensor, but also automatically facilitating, for each subregion corresponding to the touch operation start position, the input of the touch operation having the higher input frequency more than another touch operation according to an operation tendency or usage of the operator. This allows quick input of commonly-used operations in a short time, which increases the convenience.

More specifically, the information input apparatus may further include a touch operation type frequency storage unit which may store a type frequency that is a frequency for each of the types of touch operation recognized by the touch operation recognizing unit, in association with each of the subregions, wherein the recognition priority level determining unit may determine the recognition priority level so that a touch operation of a type having a higher type frequency has a higher recognition priority level.

It is to be noted that the present invention is realized not only as such an information input apparatus but also as an information input method having, as steps, characteristics units included in the information input apparatus, and a program causing a computer to execute such characteristic steps. It goes without saying that such a program can be distributed through a recording medium such as a CD-ROM and a transmission medium such as the Internet.

Furthermore, the present invention can be realized as a semiconductor integrated circuit (LSI) implementing part or all of the functions of the information input apparatus, and as an information input system including the information input apparatus.

Advantageous Effects of Invention

The present invention can provide an information input apparatus which has a touch pad and allows, even when an operation is started at any position, the quick input of gesture operations of types without reducing the ease of input.

BRIEF DESCRIPTION OF DRAWINGS

FIG. 3 is a block diagram showing a configuration of the information input apparatus according to Embodiment 1 of the present invention.

FIG. 4 is a diagram showing an exemplary data structure in which a touch position is stored according to Embodiment 1 of the present invention.

FIG. 5 is a diagram illustrating touch feature amounts used for touch operation recognition according to Embodiment 1 of the present invention.

FIG. 6 is a diagram showing an exemplary data structure in which touch operation recognition conditions are stored according to Embodiment 1 of the present invention.

FIG. 11C is a third diagram illustrating a method of recognizing a vertical slide operation according to Embodiment 1 of the present invention.

FIG. 16 is a table showing examples of ranges of threshold values for recognition according to Embodiment 1 of the present invention.

FIG. 20 is a table showing examples of degrees of ease of input according to Embodiment 1 of the present invention.

FIG. 23 is a diagram showing an exemplary data structure in which gesture operation end determination conditions are stored according to Embodiment 2 of the present invention.

FIG. 26 shows tables, one of which shows examples of touch operation recognition conditions and the other of which shows examples of gesture operation end determination conditions, according to Embodiment 2 of the present invention.

FIG. 28 is a diagram showing an example of an update of a touch operation start position according to Embodiment 2 of the present invention.

FIG. 29 shows tables, one of which shows examples of touch operation recognition conditions and the other of which shows examples of gesture operation end determination conditions, according to Embodiment 2 of the present invention.

FIG. 32 shows tables, one of which shows examples of touch operation recognition conditions and the other of which shows examples of gesture operation end determination conditions, according to Embodiment 2 of the present invention.

FIG. 35 shows tables, one of which shows examples of touch operation recognition conditions and the other of which shows examples of gesture operation end determination conditions, according to Embodiment 2 of the present invention.

FIG. 42 is a table showing an exemplary data structure in which touch operation recognition conditions are stored according to Embodiment 3 of the present invention.

FIG. 43B is a second flow chart illustrating a processing flow of the information input apparatus according to Embodiment 3 of the present invention.

FIG. 45 is a diagram showing a method of determining a threshold value for recognition according to Embodiment 3 of the present invention.

FIG. 55 is a diagram illustrating a method of adjusting a touch operation start position based on a finger length according to Embodiment 4 of the present invention.

FIG. 56B is a second flow chart illustrating a processing flow of the information input apparatus according to Embodiment 4 of the present invention.

FIG. 59 is a table showing an exemplary data structure in which touch operation type frequencies are stored according to Embodiment 5 of the present invention.

FIG. 60 is a table showing examples of recognition priority levels of touch operations according to Embodiment 5 of the present invention.

FIG. 61 is a table showing examples of degrees of ease of input according to Embodiment 5 of the present invention.

FIG. 62 is a flow chart illustrating a processing flow of the information input apparatus according to Embodiment 5 of the present invention.

FIG. 67 is a diagram showing exemplary subregions provided on a touch pad according to the related art of the present invention.

FIG. 68 is a table showing an exemplary data structure in which types of gesture operation are stored according to the related art of the present invention.

FIG. 69 is a table showing an exemplary data structure in which gesture operation recognition conditions are stored according to the related art of the present invention.

FIG. 70 is a diagram showing an exemplary touch trajectory of a gesture operation according to the related art of the present invention.

DESCRIPTION OF EMBODIMENTS

First, to clarify the significance of the present invention, the following describes in detail the related art of the present invention.

It is to be noted that in the following description, an operation by a finger on a touch pad or a touch panel is defined as follows.

The touch operation is classified into two types, one of which is a gesture operation that inputs a specific trajectory for the purpose of instructing execution of a specific function among predetermined functions, and the other of which is a pointing operation that inputs a position touched by a finger so as to mainly control a cursor position or the like displayed on a display apparatus such as a television.

The gesture operation is further classified into types such as a slide operation of linearly moving a finger on the touch pad/touch panel, a rotation operation of drawing a circular arc with a finger, and a flick operation of quickly flicking a finger.

The gesture operation is characterized in that a function such as scroll and page switch can be directly performed without selection and determination of a GUI object such as an icon and a menu.

Moreover, when an operator (the operator of an information input apparatus) can input a plurality of gesture operations at any position on the touch pad/touch panel without being aware of a specific operation region or operation start position, various functions can be performed quickly and easily, which enhances convenience.

It is to be noted that a "type of touch operation" indicates whether a touch operation is a pointing operation or a gesture operation, and indicates, when the touch operation is the gesture operation, which of types of gesture operation the gesture operation is.

Figure 66:
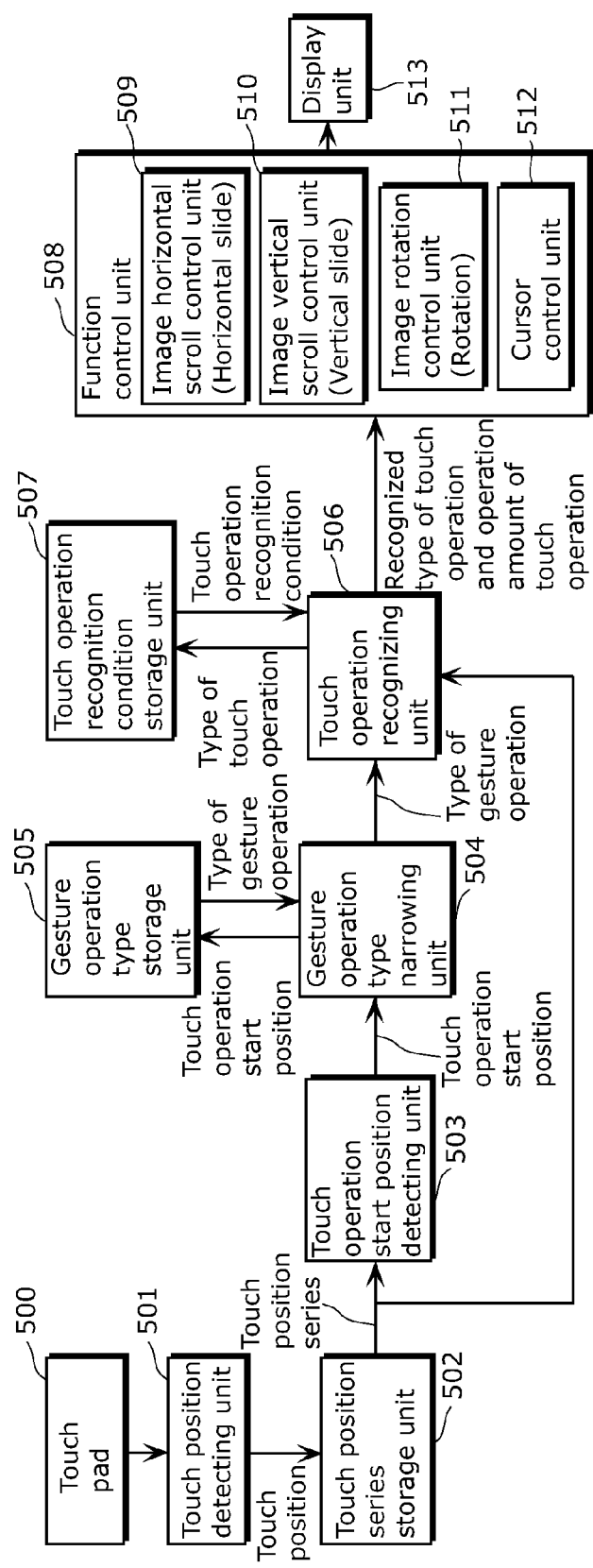
FIG. 66 is a block diagram showing a configuration of an information input apparatus according to a related art of the present invention.

FIG. 66 is a block diagram showing a configuration of an information input apparatus according to PTL 1 that is the related art of the present invention.

A touch position detecting unit 501 obtains, through a touch pad 500, a contact position of the finger of an operator, that is, a touch position.

A touch position series storage unit 502 stores, in order of obtaining touch positions by the touch position detecting unit 501, one or more touch positions as a touch position series that is a set of at least one touch position.

A touch operation start position detecting unit 503 obtains the touch position series stored in the touch position series storage unit 502, and obtains, from the touch position series, a first position at which the operator started touching the touch pad, as a touch operation start position.

A gesture operation type narrowing unit 504 obtains the touch operation start position detected by the touch operation start position detecting unit 503, and obtains, from a gesture operation type storage unit 505, a type of gesture operation corresponding to the touch operation start position.

The gesture operation type storage unit 505 stores, for each of subregions provided on the touch pad, a type of gesture operation that the operator can input on the subregion.

For example, as shown by FIG. 67, the gesture operation type storage unit 505 provides three subregions on the touch pad, and stores a vertical slide operation, a horizontal slide operation, and a rotation operation in association with a subregion (1), a subregion (2), and a subregion (3), respectively (FIG. 68).

When the touch operation start position detected by the touch operation start position detecting unit 503 is in the subregion (2), the gesture operation type narrowing unit 504 outputs the horizontal slide operation as the type of gesture operation.

A touch operation recognizing unit 506 obtains the touch position series from the touch position series storage unit 502, and obtains the type of gesture operation determined by the gesture operation type narrowing unit 504. The touch operation recognizing unit 506 then obtains, from a touch operation recognition condition storage unit 507, touch operation recognition conditions corresponding to types of operation.

Next, the touch operation recognizing unit 506 recognizes a touch operation, using the touch position series and the touch operation recognition conditions, and outputs a type of touch operation as the recognition result, and an operation amount corresponding to the type of touch operation such as a touch movement distance and a touch movement speed.

For instance, as shown by FIG. 69, the touch operation recognition condition storage unit 507 stores types of touch operation and recognition conditions for the types of touch operation in association with each other.

When the type of operation determined by the gesture operation type narrowing unit 504 indicates the horizontal slide operation, the touch operation recognizing unit 506 obtains a recognition condition "horizontal movement distance from touch operation start position greater than or equal to 10 mm", and determines whether or not the touch position series or a touch trajectory connecting the touch positions in the touch position series satisfies the recognition condition.

As shown by (a) in FIG. 70, when the touch trajectory obtained from the touch position series satisfies the recognition condition, the touch operation recognizing unit 506 outputs the horizontal slide operation as the recognition result.

In addition, the touch operation recognizing unit 506 outputs a movement distance (e.g., 20 mm in FIG. 70) as the operation amount of the horizontal slide operation.

As shown by (b) in FIG. 70, when a touch position is moved outside of the corresponding subregion before the recognition condition is satisfied, the touch operation recognizing unit 506 recognizes the type of touch operation as the pointing operation regardless of the destination subregion.

Similarly, when the touch position is moved outside of the corresponding subregion before the recognition condition for vertical slide operation or the recognition condition for rotation operation is satisfied, the touch operation recognizing unit 506 recognizes the type of touch operation as the pointing operation.

In the case of the correspondence relationships between the subregions and the types of gesture operation as shown by FIG. 68, it is possible to input the vertical slide operation and the pointing operation according to the touch position series when the touch operation start position is in the subregion (1).

Moreover, it is possible to input the horizontal slide operation and the pointing operation when the touch operation start position is in the subregion (2).

Furthermore, it is possible to input the rotation operation and the pointing operation when the touch operation start position is in the subregion (3).

A function control unit 508 performs a corresponding process according to the type of touch operation outputted as the recognition result by the touch operation recognizing unit 506.

For instance, when the recognition result indicates the horizontal slide operation, an image horizontal scroll control unit 509 horizontally scrolls a screen. The scroll distance is determined according to the operation amount of the horizontal slide operation outputted by the touch operation recognizing unit 506, e.g. the movement distance.

Likewise, for example, when the recognition result indicates the vertical slide operation, an image vertical scroll control unit 510 vertically scrolls the screen.

Moreover, when the recognition result indicates the rotation operation, an image rotation control unit 511 rotates an image displayed on the screen.

Furthermore, when the recognition result indicates the pointing operation, a cursor control unit 512 moves a cursor.

A display unit 513 outputs the processing result of the function control unit 508 as a screen display.

As stated above, although the information input apparatus disclosed in PTL 1 makes it possible to input either the gesture operation of the one type or the pointing operation of the one type on the subregion on the touch pad, but does not make it possible to input the one of the gesture operations of the types (e.g., one of the vertical slide operation and the horizontal slide operation) for the same touch operation start position.

It is necessary to start performing each of the gesture operations on the corresponding one of the subregions resulting from the previous division of the touch pad. Moreover, adding the gesture operation to be recognized requires the separate provision of the subregion for the added gesture operation.

As described above, the information input apparatus disclosed in PTL 1 requires that as many corresponding subregions as the number of types of gesture operation to be used be provided, and does not make it possible to input the given gesture operation at the given position on the touch pad. This causes the operator to operate the touch pad carefully while being aware of the position of the finger on the touch pad, which is inconvenient to the operator.

Moreover, when a gesture operation to be recognized is increased by simply adding a recognition condition to one touch operation start position or one subregion in the method disclosed in PTL 1, it is necessary to tighten respective recognition conditions for gesture operation in order to recognize a gesture operation without confusion among gesture operations.

For example, assuming that it is stipulated to draw a triangle when a gesture operation A is inputted, a circle when a gesture operation B is inputted, and a quadrangle when a gesture operation C is inputted, compared with a case of recognizing only the triangle, in order to distinguish between the triangle and the circle, it is necessary to eliminate a trajectory having a round corner of the triangle, and in order to distinguish between the triangle and quadrangle, it is necessary to cause a trajectory of an acute angle to correspond to the corner of the triangle by narrowing a range of an angle to be determined as the corner of the triangle.

Thus, the operator needs to identifiably draw the triangle, the quadrangle, and the circle in a rigorous manner so that the information input apparatus successfully distinguishes between the triangle, the quadrangle, and the circle.

As a result, for instance, not only the trajectory of the gesture is complicated, but also the time and effort to input the gesture operation is increased, which decreases the convenience of the operator.

In order to solve the above problem, the present invention provides an information input apparatus which has a touch pad in the housing and allows, even when an operation is started at any position, the quick input of gesture operations of types without reducing the ease of input.

The following describes embodiments according to the present invention with reference to the drawings.

(Embodiment 1)

Figure 1:
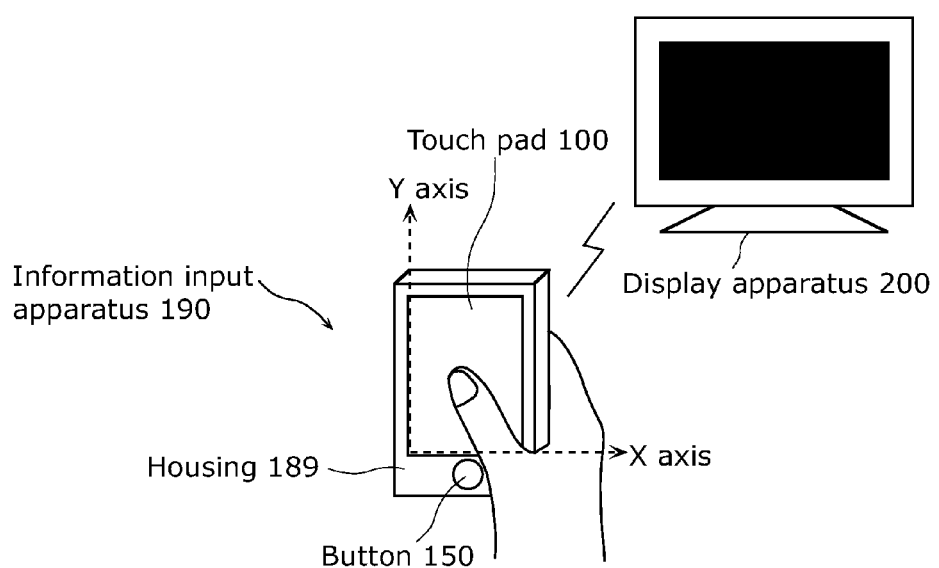
FIG. 1 is a diagram showing an exemplary appearance of an information input apparatus according to respective Embodiments 1 to 5 of the present invention.

FIG. 1 is a diagram showing an exemplary appearance of an information input apparatus 190 according to Embodiment 1 of the present invention.

The information input apparatus 190 includes a housing 189, a touch pad 100 that is a touch sensor, and an operation determination button 150.

When an operator contacts (touches) the touch pad 100 with the finger, the touch pad 100 detects the touch position. When the operator traces the touch pad 100 with the finger, the touch pad continuously detects the touch position at predetermined time intervals, to obtain a touch position series.

The information input apparatus 190 recognizes a type of touch operation (hereinafter also referred to as a touch operation), using the touch position series, and controls an operation object, using the result of the recognition of the touch operation.

The operation object is a GUI object displayed on a screen by a display apparatus 200 such as a display, and examples of the operation object include a menu and an icon.

In Embodiment 1, the information input apparatus 190 recognizes, as a touch operation, a pointing operation for moving a screen-displayed cursor. Moreover, the information input apparatus 190 recognizes, as gesture operations, a vertical slide operation for tracing the touch pad 100 linearly in a vertical direction, a horizontal slide operation for tracing the touch pad 100 linearly in a horizontal direction, and a rotation operation for tracing the touch pad 100 in a circular trajectory.

Figure 2:
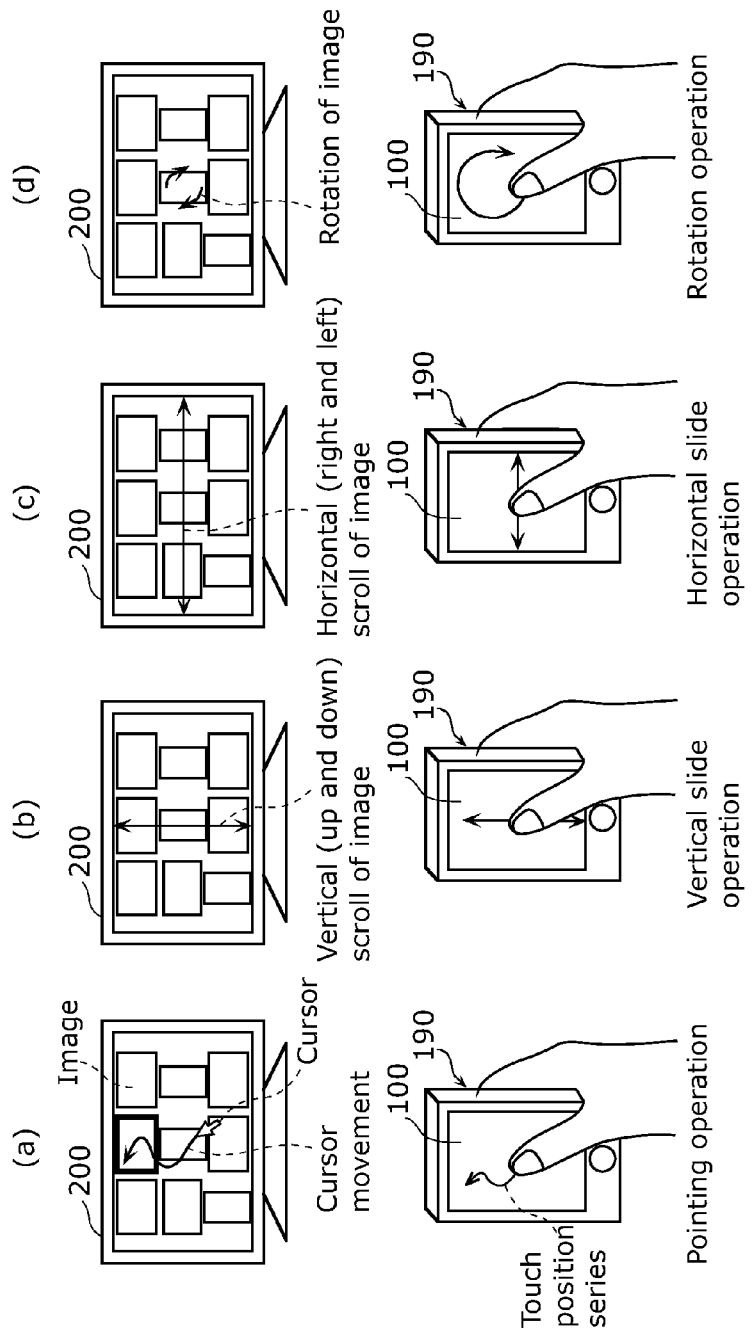
FIG. 2 is a diagram showing touch operations and corresponding functions according to respective Embodiments 1 to 5 of the present invention.

FIG. 2 is a diagram showing specific examples of touch operations recognized by the information input apparatus 190 and corresponding functions. As shown by (a) in FIG. 2, the operator can select an image through the pointing operation and with the operation determination button 150.

Moreover, as shown by (d) in FIG. 2, the operator can rotate a central image through the rotation operation.

Furthermore, as shown by (b) in FIG. 2, the operator can vertically scroll an image through the vertical slide operation.

Moreover, as shown by (c) in FIG. 2, the operator can horizontally scroll an image through the horizontal slide operation.

FIG. 3 is a diagram showing a configuration example of the information input apparatus 190 according to this embodiment.

The information input apparatus 190 includes: a touch pad 100; a touch position detecting unit 101 which detects a position when the operator contacts the touch pad 100 with the finger; a touch position series storage unit 102 which stores the touch position for a predetermined time; a touch operation start position detecting unit 103 which detects a touch operation start position of the operator, using the touch position stored in the touch position series storage unit 102; a touch operation recognition condition storage unit 115 which stores touch operation recognition conditions for recognizing touch operations, in association with the touch operation start position; a touch operation recognizing unit 114 which obtains, from the touch operation recognition condition storage unit 115, the touch operation recognition conditions associated with the touch operation start position detected by the touch operation start position detecting unit 103, and recognizes the touch operation performed by the operator; and a function control unit 108 which performs a process according to an operation type indicated by the recognition result outputted by the touch operation recognizing unit 114.

More specifically, in the function control unit 108: when the operation type indicated by the recognition result is the horizontal slide operation, an image horizontal scroll control unit 109 performs a horizontal scroll process; when the operation type indicated by the recognition result is the vertical slide operation, an image vertical scroll control unit 110 performs a vertical scroll process; when the operation type indicated by the recognition result is the rotation operation, an image rotation control unit 111 performs a rotation process of an image; and when the operation type indicated by the recognition result is the pointing operation, a cursor control unit 112 performs a cursor movement process.

A display unit 113 displays, as a GUI, the result of the process performed by the function control unit 108.

To put it differently, the information input apparatus 190 includes: the touchpad 100 which is a touch sensor for inputting information; the touch position detecting unit 101 which detects a touch position that is information resulting from the operator contacting the touch pad 100 with the finger; the touch operation start position detecting unit 103 which detects, using the touch position, a touch operation start position that is the start position of the touch operation performed by the operator; the touch operation recognition storage unit 115 which stores touch operation recognition conditions each for recognizing one of types of touch operation, in association with the touch operation start position; and the touch operation recognizing unit 114 which recognizes touch information, using the touch operation recognition conditions associated with the touch operation start position detected by the touch operation start position detecting unit 103, and determines the type of touch operation performed by the operator. It is to be noted that although types of touch operation recognized by the touch operation recognizing unit 114 are assumed to include the "pointing operation", "vertical slide operation", "horizontal slide operation", and "rotation operation" shown by FIG. 2, the types may include other operations (e.g., an operation for drawing a graphic having predetermined shape such as a triangle and a quadrangle).

The touch operation recognizing unit 114 outputs, as the recognition result, the type of touch operation performed by the operator and an operation amount indicating a magnitude of the touch operation. Here, the type of recognized touch operation indicates either a pointing operation for inputting a position designated by the operator or one of gesture operations of types each for instructing execution of a predetermined specific process.

It is to be noted that the touch operation start position detecting unit 103 may detect, as the touch operation start position, a touch position at which the operator first contacts the touch pad 100 with the finger.

It is to be noted that when a capacitance touch pad 100 is used, the touch pad 100 is capable of outputting, together with the touch position, a capacitance value indicating a degree of strength of a touch operation (i.e., a degree of force used by the operator pressing the touch pad 100).

In this case, the procedure described in this embodiment can be also applied to a case of recognizing a touch operation based on touch strength of a "rubbing" operation, a "scraping" operation, or the like, by the touch position detecting unit 101 detecting the capacitance value in addition to the touch position.

Thus, hereinafter the touch position or information including the touch position and the capacitance value is referred to as touch information.

Moreover, hereinafter the touch position detecting unit is also referred to as a touch information detecting unit, and the touch position series storage unit is also referred to as a touch information series storage unit.

The following describes the information input apparatus in more detail with reference to FIG. 3.

The touch position detecting unit 101 detects a position contacted with the finger of the operator at predetermined time intervals. For instance, the touch position detecting unit 101 assigns coordinate axes shown by FIG. 1 on an operation surface of the touch pad 100, and outputs the touch position in a two-dimensional coordinate value (xn, yn). Moreover, when the operator removes the finger from the touch pad 100, the touch position detecting unit 101 outputs a touch off signal that is different from two-dimensional coordinates indicating the touch position.

The touch position series storage unit 102 stores, in output order, touch positions which are detected after output of a previous touch off signal and outputted by the touch position detecting unit 101, that is, touch positions from when the finger started contacting the touch pad 100, as (x0, y0), (x1, y1), . . . (xn, yn).

FIG. 4 shows a structure of data stored in the touch position series storage unit 102.

The touch operation start position detecting unit 103 obtains a distance LS between the first touch position (x0, y0) (i.e., the touch position at which the finger started contacting) and the last touch position (xn, yn) that are in the stored touch position series. When the distance LS is greater than a preset threshold value LTM, the touch operation start position detecting unit 103 determines that the last touch position (xn, yn) in the touch position series is a touch operation start position (xs, ys). Once the touch operation start position detecting unit 103 detects a touch operation start position, the touch operation start position detecting unit 103 does not detect the touch operation start position until the operator starts touching the touch pad with the finger again after the operator removes the finger from the touch pad.

It is to be noted that in this embodiment, in order to avoid performing subsequent processes when the operator unintentionally and suddenly touches the touch pad 100 with the finger and removes the finger from the touch pad 100, the distance threshold value LTM is set and the touch operation start position is detected, however the touch operation start position detecting unit 103 may determine that the first touch position (x0, y0) at which the operator started touching the touch pad 100 with the finger is the touch operation start position (xs, ys).

The touch operation recognition condition storage unit 115 stores, for each subregion set on the touch pad 100, a touch movement distance threshold value, a touch movement direction threshold value, and a touch rotation angle threshold value that are obtained from a touch position series, as recognition conditions for recognizing a touch operation.

As shown by (a) in FIG. 5, the touch movement distance is a linear distance between two touch positions. Here, the formula $Li \cdot i+3$ denotes a touch movement distance from a touch position (xi, yi) to a touch position (x(i+3), y(i+3)).

As shown by (b) in FIG. 5, the touch movement direction is an angle between two consecutive touch positions with respect to the x-axis of a coordinate system on the touch pad 100. Here, a left rotation direction is positive, and a right rotation direction is negative (−180° to 180°).

Here, the formula $Di \cdot i+1$ denotes a touch movement direction between the touch position (xi, yi) and a touch position (x(i+1), y(i+1)).

The touch rotation angle is an angle between two touch positions such as a line segment (xi, yi)·(x(i+1), y(i+1)) and a line segment (x(i+2), y(i+2))·(x(i+3), y(i+3)) in an example shown by (c) in FIG. 5. The angle is represented as a rotation angle from the touch position (xi, yi) to the touch position (x(i+3), y(i+3)). A left rotation direction is positive, and a right rotation direction is negative (−180° to 180°). Here, the formula Ri·i+3 denotes a touch rotation angle from the touch position (xi, yi) to the touch position (x(i+3), y(i+3)). Moreover, the formula Ri·i+3 is also expressed as Ri (i+3).

Moreover, the touch operation recognition condition storage unit 115 stores, for each subregion, threshold values associated with types of touch operation recognized by the information input apparatus 190. For instance, in this embodiment, the touch operation recognition condition storage unit 115 stores vertical slide recognition threshold values, horizontal slide recognition threshold values, and rotation recognition threshold values.

FIG. 6 shows an exemplary structure of data and exemplary subregions that are stored in the touch operation recognition condition storage unit 115.

The touch operation recognition condition storage unit 115 stores, for each of 36 subregions (1-1) to (6-6), a movement distance threshold value Lvs to be compared with a distance Lsn between the touch operation start position (xs, ys) and the last touch position (xn, yn) in the touch position series, and a movement direction threshold value Dvs to be compared with a movement direction D(i−1)·i of the two consecutive positions (x(i−1), y(i−1)) and (xi, yi) in the touch position series [i=s+any one of 1 to n], as threshold values for recognizing the vertical slide operation. Hereinafter, the expression "(m−n): (threshold value 1, threshold value 2, . . . )" indicates a threshold value associated with a subregion (m-n). Examples of the expression include: (1-1): (Lvs, Dvs), (1-2): (Lvs, Dvs), . . . (1-6): (Lvs, Dvs), (2-1): (Lvs, Dvs), (2-2): (Lvs, Dvs), . . . (2-6): (Lvs, Dvs), . . . (6-1): (Lvs, Dvs), (6-2): (Lvs, Dvs), . . . and (6-6): (Lvs, Dvs).

The touch operation recognition condition storage unit 115 stores the following recognition conditions for vertical slide operation, using the threshold values.

vertical slide recognition condition (1): Lsn≥Lvs, and vertical slide recognition condition (2): ||D(i−1)·i|−90°|<Dvs, [i=s+any one of 1 to n]

Here, a range of the Lvs is 5 mm≤Lvs≤40 mm.

Moreover, a range of the Dvs is 10°≤Dvs≤80°. (it is to be noted that a relationship with the Dhs to be described is expressed as 20°≤Dvs+Dhs≤90°.)

Here, for a touch position series continuously updated by adding a touch position until a vertical slide operation is finally recognized, the vertical slide recognition condition (1) (hereinafter described as a flag condition) needs to be satisfied at least once, however the vertical slide recognition condition (2) (hereinafter described as a repeat condition) needs to be always satisfied.

In other words, when a touch position series that fails to satisfy the vertical slide recognition condition (2) appears in a recognition process, the vertical slide operation is excluded from a recognition result.

Similarly, the touch operation recognition condition storage unit 115 stores, for each of the 36 subregions (1-1) to (6-6), a movement distance threshold value Lhs to be compared with the distance Lsn between the touch operation start position (xs, ys) and the last touch position (xn, yn) in the touch position series, and a movement direction threshold value Dhs to be compared with the movement direction D(i−1)·i of the consecutive two positions (x(i−1), y(i−1)) and (xi, yi) in the touch position series [i=s+any one of 1 to n], as recognition conditions for horizontal slide operation. Examples of the expression include: (1-1): (Lr, dDr, Rr), (1-2): (Lr, dDr, Rr), . . . (1-6): (Lr, dDr, Rr), (2-1): (Lr, dDr, Rr), (2-2): (Lr, dDr, Rr), . . . (2-6): (Lr, dDr, Rr), . . . (6-1): (Lr, dDr, Rr), (6-2): (Lr, dDr, Rr), . . . and (6-6): (Lr, dDr, Rr).

The touch operation recognition condition storage unit 115 stores the following recognition conditions for horizontal slide operation, using the threshold values.

horizontal slide recognition condition (1) (flag condition): Lsn≥Lhs, and horizontal slide recognition condition (2) (repeat condition): |D(i−1)·i|<Dhs (at the time of rightward slide), |180°−|D(i−1)·i||<Dhs (at the time of leftward slide), [i=s+any one of 1 to n]

It is to be noted that a range of Lhs is 5 mm≤Lhs≤40 mm. Moreover, a range of the Dhs is 10°≤Dhs≤80°, and a relationship with the Dvs is expressed as 20°≤Dvs+Dhs≤90°.

This is to prevent occurrence of a movement direction which satisfies both the recognition conditions for vertical slide operation and the recognition conditions for horizontal slide operation.

Furthermore, the touch operation recognition condition storage unit 115 stores, for each of the 36 subregions (1-1) to (6-6), (i) a movement distance threshold value Lr to be compared with the distance Lsn between the touch operation start position (xs, ys) and the last touch position (xn, yn) in the touch operation series, (ii) a movement direction difference threshold value dDr to be compared with a difference dD(i−2)·i between (a) a movement direction D(i−2)·(i−1) between (x(i−2), y(i−2)) and (x(i−1), y(i−1)) and (b) a movement direction D(i−1)·i of (x(i−1), y(i−1)) and (xi, yi), among three consecutive touch positions (x(i−2), y(i−2)), (x(i−1), y(i−1)), and (xi, yi) in the touch position series [i=s+any one of 2 to n], and (iii) a rotation angle threshold value Rr to be compared with a rotation angle Rs·n between the touch operation start position (xs, ys) and the last touch position (xn, yn) in the touch position series, as recognition conditions for rotation operation. Examples of the expression include: (1-1): (Lr, dDr, Rr), (1-2): (Lr, dDr, Rr), . . . (1-6): (Lr, dDr, Rr), (2-1): (Lr, dDr, Rr), (2-2): (Lr, dDr, Rr), . . . (2-6): (Lr, dDr, Rr), . . . (6-1): (Lr, dDr, Rr), (6-2): (Lr, dDr, Rr), . . . and (6-6): (Lr, dDr, Rr).

The touch operation recognition condition storage unit 115 stores the following recognition conditions for rotation operation, using the threshold values.

rotation recognition condition (1) (flag recognition condition): Lsn≥Lr, rotation recognition condition (2) (repeat recognition condition): |dD (i−2)·i|<dDr, [i=s+any one of 2 to n], and rotation recognition condition (3) (flag recognition condition): |Rsn|≥Rr It is to be noted that a range of the Lr is 5 mm≤Lr≤40 mm. Moreover, a range of the dDr is 10°≤dDr≤180°. Furthermore, a range of the Rr is 30°≤Rr≤360°.

It is to be noted that although a conditional expression for recognition is common to each operation regardless of the subregions in the example shown by FIG. 6, not only threshold values but also a conditional expression may differ for each subregion.

Figure 7:
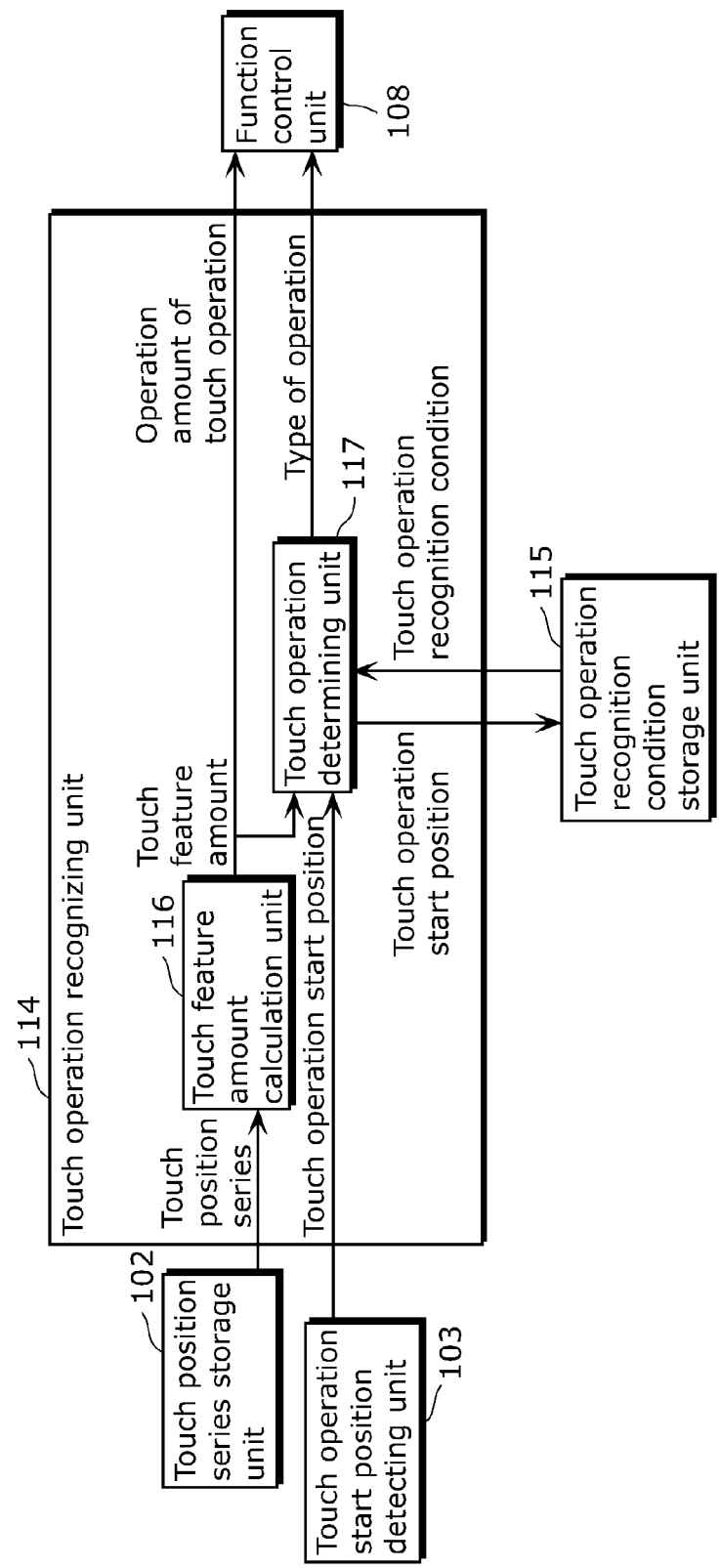
FIG. 7 is a block diagram showing an exemplary process of recognizing a touch operation according to Embodiment 1 of the present invention.

FIG. 7 shows a detailed internal configuration of the touch operation recognizing unit 114. The touch operation recognizing unit 114 includes a touch feature amount calculation unit 116 and a touch operation determining unit 117.

Here, the information input apparatus includes the touch position (i.e., touch information) series storage unit 102 which stores touch information for a predetermined certain period of time. The touch operation recognizing unit 114 includes: the touch feature amount calculation unit 116 which calculates, as a touch feature amount, at least one of a touch operation time, a touch movement distance, a touch movement speed, a touch movement acceleration, and a touch movement direction, using the touch information stored in the touch position series storage unit 102; and the touch operation determining unit 117 which determines a type of touch operation from the touch feature amount, based on the touch operation recognition conditions which are stored in association with the touch operation start position in the touch operation recognition condition storage unit 115.

More specifically, the touch operation recognition condition storage unit 115 stores, for each of the subregions specified on the operation surface of the touch sensor, the touch operation recognition conditions each of which corresponds to one of types of gesture operation.

Moreover, the touch operation determining unit 117 determines whether or not the touch feature amount calculated by the touch feature amount calculation unit 116 satisfies, among touch operation recognition conditions stored in association with, among the subregions, a subregion including the touch operation start position, a touch operation recognition condition for recognizing, among types of gesture operation, a first gesture operation. Specifically, the touch operation determining unit 117 determines whether or not the touch feature amount satisfies the touch operation recognition condition, by comparing a threshold value included in the touch operation recognition condition with the touch feature amount.

When the determination result shows that the touch feature amount fails to satisfy the touch operation recognition condition, the touch operation determining unit 117 determines that the touch operation is not the first gesture operation.

Stated differently, a first touch operation recognition condition for recognizing the first gesture operation associated with a first subregion among the subregions is different from a second touch operation recognition condition for recognizing the first gesture operation associated with a second subregion among the subregions.

The following describes in more detail the above process.

The touch feature amount calculation unit 116 obtains, from the touch position series storage unit 102, the touch operation start position (xs, ys) to the last touch position (xn, yn) in the touch position series.

Next, the touch feature amount calculation unit 116 calculates, as a touch feature amount, (1) a distance Lsn between the touch operation start position (xs, ys) and the last touch position (xn, yn) in the touch position series, (2) a movement direction $D(i-1) \cdot i$ between two consecutive touch positions $(x(i-1), y(i-1))$ and $(xi, yi)$ in the touch position series [i=s+any one of 1 to n], (3) a rotation angle Rsn between the touch operation start position (xs, ys) and the last touch position (xn, yn) in the touch position series, and (4) a difference $dD(i-2) \cdot i$ between the movement direction $D(i-1) \cdot i$ and a movement direction of $(x(i-2), y(i-2))$ and $(x(i-1), y(i-1))$, among three consecutive touch positions $(x(i-2), y(i-2))$, $(x(i-1), y(i-1))$, and $(xi, yi)$ [i=s+any one of 2 to n].

The touch operation determining unit 117 obtains the touch operation start position (xs, ys) from the touch operation start position detecting unit 103, and reads and obtains a subregion (M-N) including the touch operation start position (xs, ys), corresponding recognition threshold values, and corresponding recognition conditions, from the touch operation recognition condition storage unit 115.

Specifically, the touch operation determining unit 117 obtains: for vertical slide recognition, threshold values (M-N): (Lvs, Dvs), and a recognition condition Lsn≥Lvs and $\|D(i-1)\cdot i|-90°|<Dvs$ [i=s+any one of 1 to n]; for horizontal slide recognition, threshold values (M-N): (Lr, dDr, Rr), and a recognition condition Lsn≥Lhs and $|D(i-1)\cdot i|<Dvs$ (at the time of rightward slide) or $180°-|D(i-1)\cdot i|<Dhs$ (at the time of leftward slide) [i=s+any one of 1 to n]; for rotation recognition, threshold values (M-N): (Lr, dDr, Rr), and a recognition condition Lsn≥Lr, $|dD(i-2)\cdot i|<dDr$ [i=s+any one of 2 to n], and $|Rsn|≥Rr$.

Next, the touch operation determining unit 117 checks which of recognition conditions for types of touch operation the calculated touch feature amount satisfies, using Lsn, $D(i-1)\cdot i$, $dD(i-2)\cdot i$, and Rs·n that are calculated as the touch feature amount by the touch feature amount calculation unit 116.

When it is recognized whether or not a touch position series indicates the vertical slide operation, for instance, assuming that the threshold values (M-N): (Lvs, Dvs) corresponding to the touch operation start position are (20 mm, 30°, the touch position series which satisfies Lsn≥20 mm and $\|D(i-1)\cdot i|-90°|<30°$ indicates the vertical slide operation.

When it is recognized whether or not a touch position series indicates the horizontal slide operation, for instance, assuming that the threshold values (M-N): (Lr, dDr, Rr) corresponding to the touch operation start position are (10 mm, 30°), the touch position series which satisfies Lsn≥10 mm and $|D(i-1)\cdot i|<30°$ (at the time of rightward slide) or $180°-|D(i-1)\cdot i|<30°$ (at the time of leftward slide) [i=s+any one of 1 to n] indicates the horizontal slide operation.

When it is recognized whether or not a touch position series indicates the rotation operation, for instance, assuming that the threshold values (M-N): (Lr, dDr, Rr) corresponding to the touch operation start position are (15 mm, 90°, 180°), the touch position series which satisfies Lsn≥15 mm, $|dD(i-2)\cdot i|<90°$ [i=s+any one of 2 to n], and $|Rsn|≥180°$ indicates the rotation operation.

When the touch position series fails to satisfy any of the repeat recognition conditions for vertical slide operation, horizontal slide operation, and rotation operation, that is, when it is confirmed that the touch position series indicates neither of the vertical slide operation, the horizontal slide operation, and the rotation operation, the touch operation recognizing unit 114 outputs, as the recognition result for the type of operation, the pointing operation.

FIGS. 8 to 11 illustrate an example of obtaining a result of recognizing a vertical slide operation.

Figure 8:
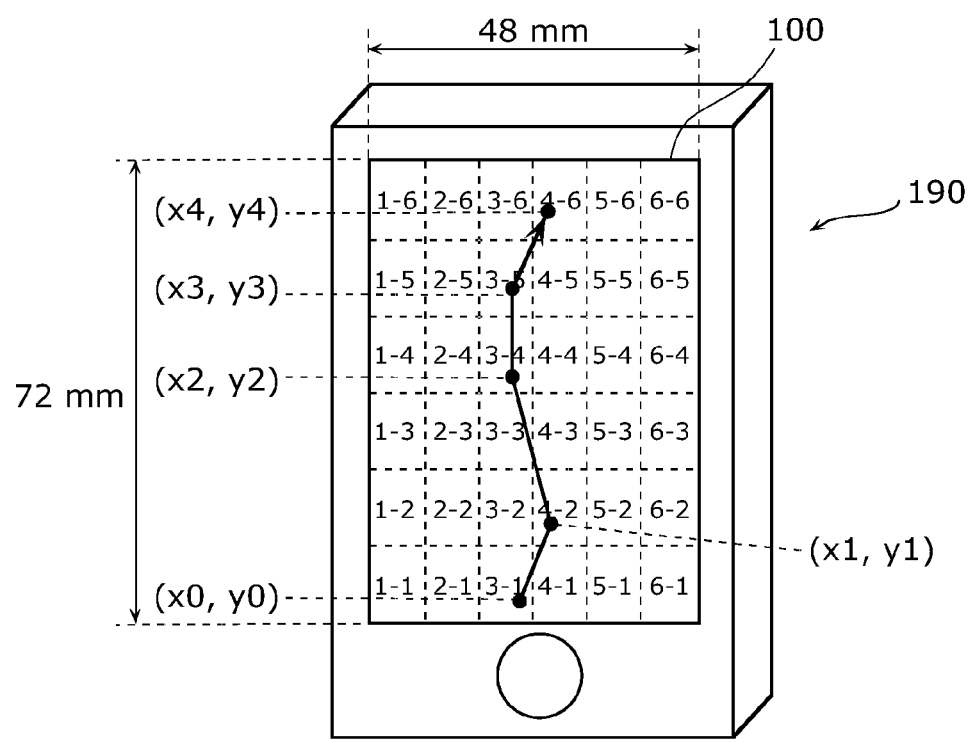
FIG. 8 is a diagram showing an exemplary touch trajectory of a vertical slide operation according to Embodiment 1 of the present invention.

FIG. 8 shows a touch position series (x0, y0) to (x4, y4) to be recognized.

Figure 9:
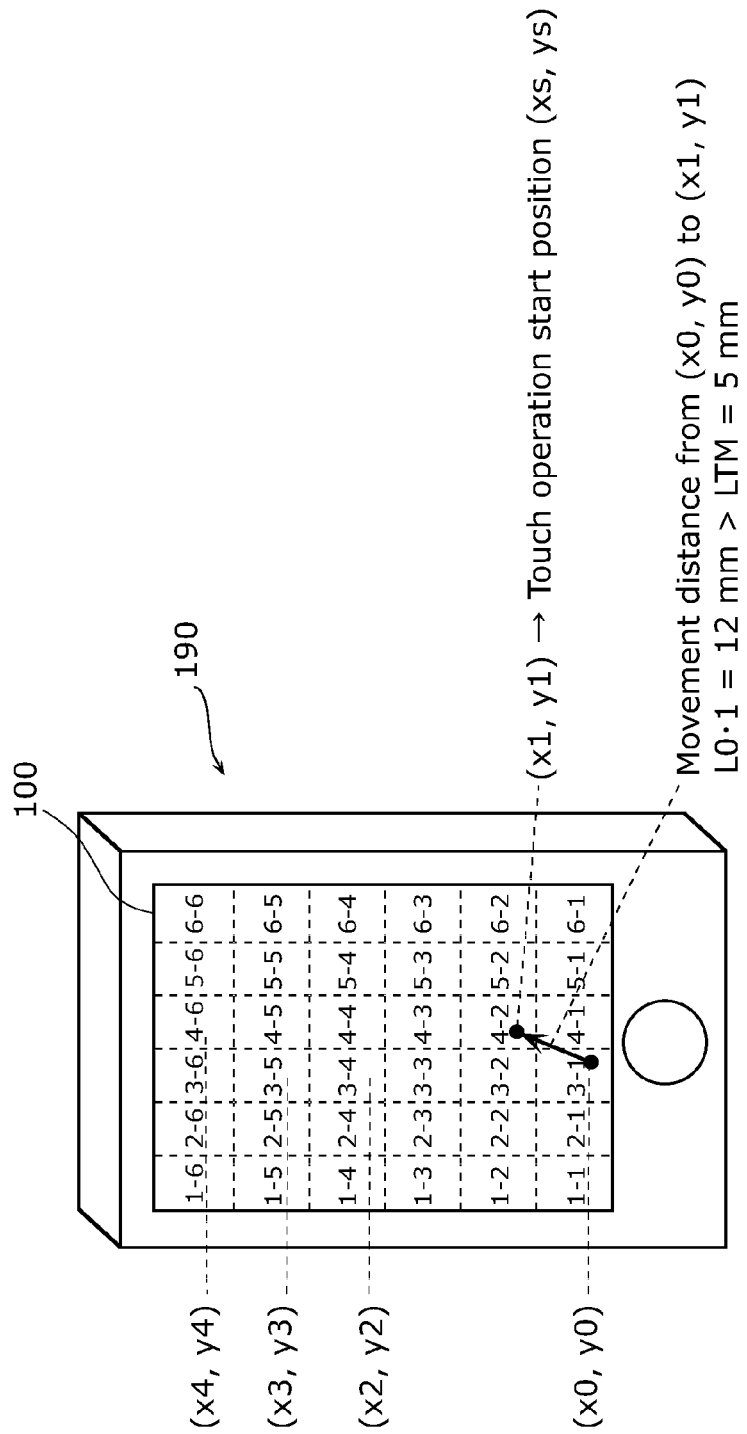
FIG. 9 is a diagram showing an example of a touch operation start position according to Embodiment 1 of the present invention.

First, as shown by FIG. 9, assuming that a movement distance between (x0, y0) and (x1, y1) is L0·1=12 mm, the movement distance exceeds a threshold value for detecting a touch operation start position LTM=5 mm. Consequently, the touch operation start position detecting unit 103 sets (x1, y1) as a touch operation start position (xs, ys).

Figure 10:
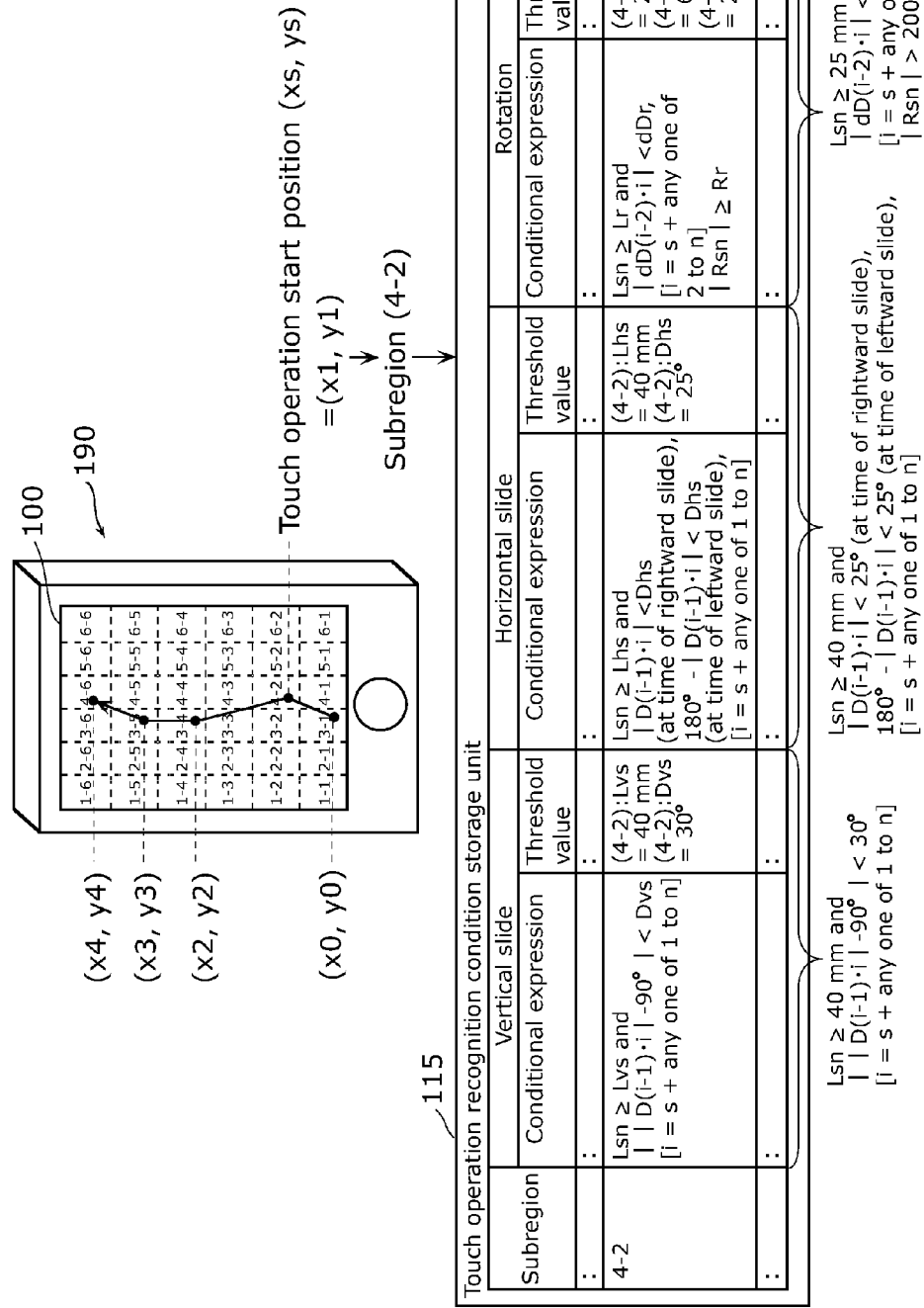
FIG. 10 is a diagram showing examples of touch operation recognition conditions according to Embodiment 1 of the present invention.

Next, as shown by FIG. 10, the touch operation determining unit 117 obtains, from the touch operation recognition condition storage unit 115, conditional expressions and threshold values as touch operation recognition conditions corresponding to (x1, y1).

Figure 11A:
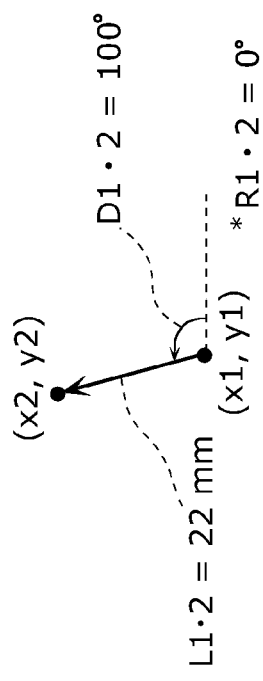
FIG. 11A is a first diagram illustrating a method of recognizing a vertical slide operation according to Embodiment 1 of the present invention.

Next, as shown by FIG. 11A, the touch feature amount calculation unit 116 calculates a touch feature amount between touch positions (x1, y1) and (x2, y2), and the touch operation determining unit 117 compares the touch feature amount with threshold values of each operation, using a conditional expression of each operation. As a result, the touch feature amount fails to satisfy a repeat condition for horizontal slide operation, and thus it is confirmed that the touch position series does not indicate the horizontal slide operation.

Figure 11B:
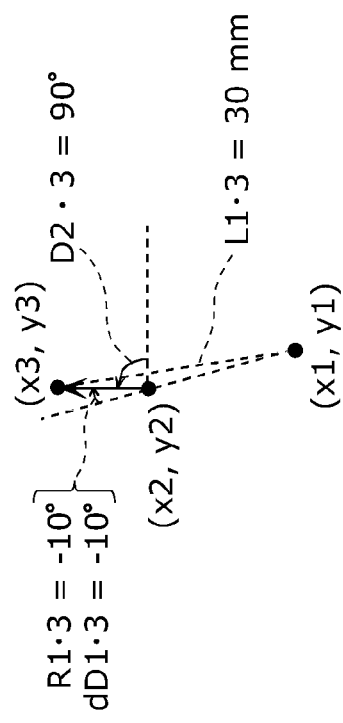
FIG. 11B is a second diagram illustrating a method of recognizing a vertical slide operation according to Embodiment 1 of the present invention.

Next, as shown by FIG. 11B, the touch feature amount calculation unit 116 calculates a touch feature amount among touch positions (x1, y1) to (x3, y3), and the touch operation determining unit 117 compares the touch feature amount with the threshold values of each operation, using the conditional expression of each operation.

Next, as shown by FIG. 11C, the touch feature amount calculation unit 116 calculates a touch feature amount among touch positions (x1, y1) to (x4, y4), and the touch operation determining unit 117 compares the touch feature amount with the threshold values of each operation, using the conditional expression of each operation. As a result, the touch feature amount satisfies the recognition condition for vertical slide operation, and thus the touch operation recognizing unit 114 outputs the vertical slide operation (upward direction) as a type of operation that is the recognition result. Moreover, the touch operation recognizing unit 114 outputs, among the touch feature amounts calculated by the touch feature amount calculation unit 116, a movement distance from the touch operation start position as an operation amount of the vertical slide operation.

Figure 12:
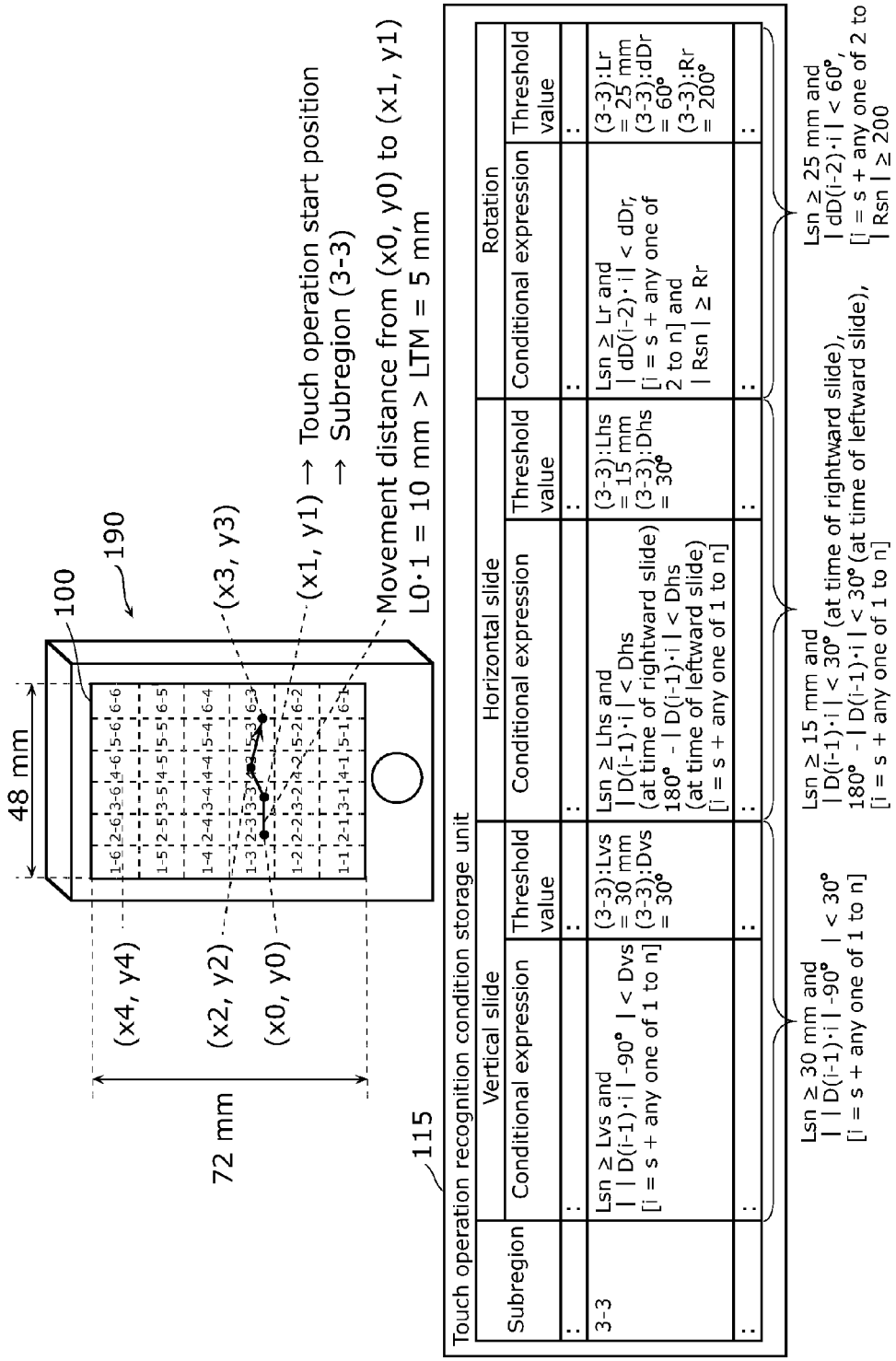
FIG. 12 is a diagram showing examples of touch operation recognition conditions according to Embodiment 1 of the present invention.
Figure 13A:
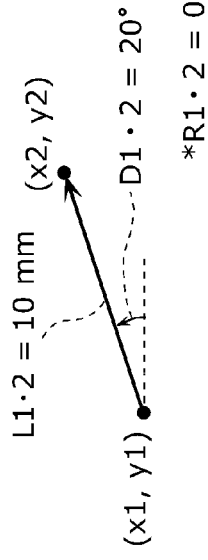
FIG. 13A is a first diagram illustrating a method of recognizing a horizontal slide operation according to Embodiment 1 of the present invention.
Figure 13B:
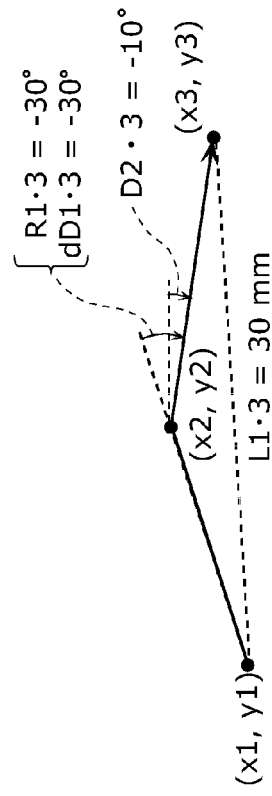
FIG. 13B is a second diagram illustrating a method of recognizing a horizontal slide operation according to Embodiment 1 of the present invention.

The following describes an example of obtaining a result of recognizing a horizontal slide operation, with reference to FIGS. 12, 13A, and 13B.

As shown by FIG. 12, a touch position series (x0, y0) to (x3, y3) is to be recognized.

First, as with the above example of recognizing the vertical slide operation, the touch operation start position detecting unit 103 sets (x1, y1) as a touch operation start position (xs, ys).

Next, as shown by FIG. 12, the touch operation determining unit 117 obtains, from the touch operation recognition condition storage unit 115, conditional expressions and threshold values as touch operation recognition conditions corresponding to (x1, y1).

Next, as shown by FIG. 13A, the touch feature amount calculation unit 116 calculates a touch feature amount between touch positions (x1, y1) and (x2, y2), and the touch operation determining unit 117 compares the touch feature amount with threshold values of each operation, using a conditional expression of each operation. As a result, the touch feature amount fails to satisfy a repeat condition for vertical slide operation, and thus it is confirmed that the touch position series does not indicate the vertical slide operation.

Next, as shown by FIG. 13B, the touch feature amount calculation unit 116 calculates a touch feature amount among touch positions (x1, y1) to (x3, y3), and the touch operation determining unit 117 compares the touch feature amount with the threshold values of each operation, using the conditional expression of each operation. As a result, the touch feature amount satisfies the recognition condition for horizontal slide operation, and thus the touch operation recognizing unit 114 outputs the vertical slide operation (rightward direction) as a type of operation that is the recognition result.

Moreover, the touch operation recognizing unit 114 outputs, among the touch feature amounts calculated by the touch feature amount calculation unit 116, a movement distance from the touch operation start position as an operation amount of the horizontal slide operation.

Figure 14:
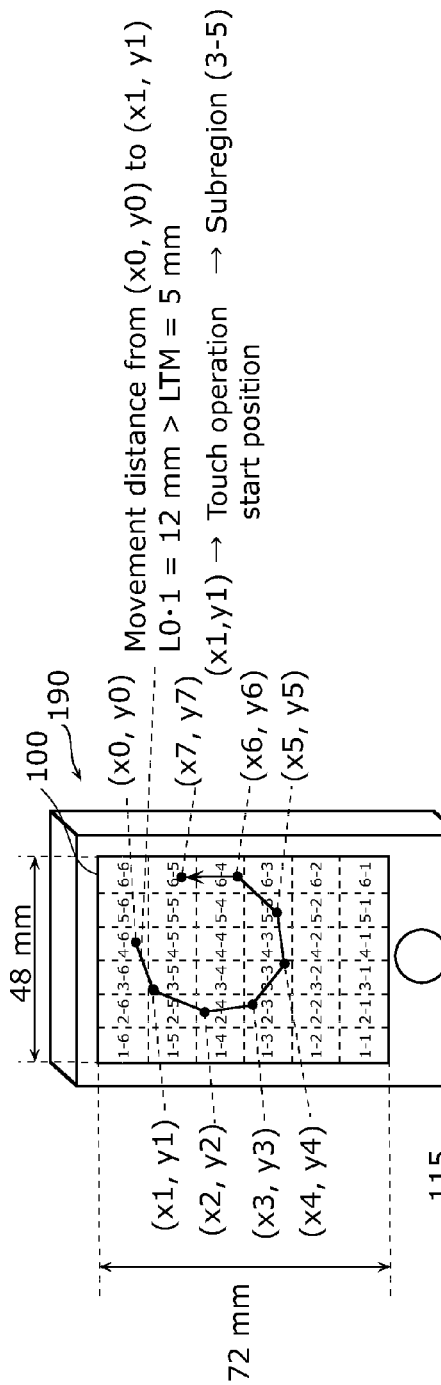
FIG. 14 is a diagram showing examples of touch operation recognition conditions according to Embodiment 1 of the present invention.

The following describes an example of obtaining a result of recognizing a rotation operation, with reference to FIGS. 14, and 15A to 15E. As shown by FIG. 14, a touch position series (x0, y0) to (x7, y7) is to be recognized.

First, as with the above example of recognizing the vertical slide operation, the touch operation start position detecting unit 103 sets (x1, y1) as a touch operation start position (xs, ys).

Next, as shown by FIG. 14, the touch operation determining unit 117 obtains, from the touch operation recognition condition storage unit 115, conditional expressions and threshold values as touch operation recognition conditions corresponding to (x1, y1).

Figure 15A:
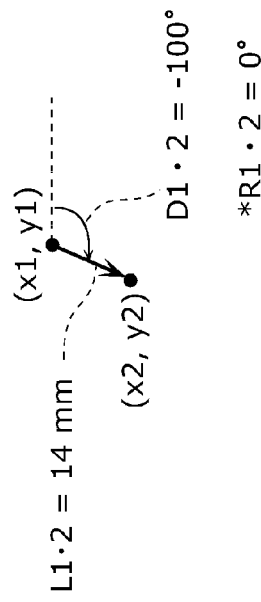
FIG. 15A is a first diagram illustrating a method of recognizing a rotation operation according to Embodiment 1 of the present invention.

Next, as shown by FIG. 15A, the touch feature amount calculation unit 116 calculates a touch feature amount between touch positions (x1, y1) and (x2, y2), and the touch operation determining unit 117 compares the touch feature amount with threshold values of each operation, using a conditional expression of each operation. As a result, the touch feature amount fails to satisfy a repeat condition for horizontal slide operation, and thus it is confirmed that the touch position series does not indicate the horizontal slide operation.

Figure 15B:
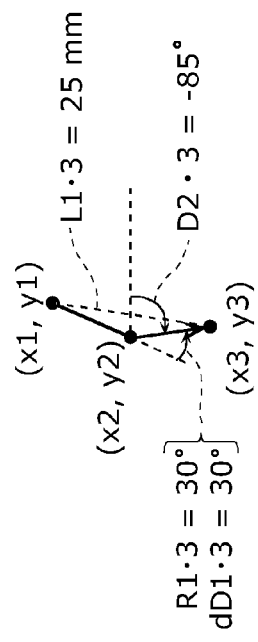
FIG. 15B is a second diagram illustrating a method of recognizing a rotation operation according to Embodiment 1 of the present invention.

Next, as shown by FIG. 15B, the touch feature amount calculation unit 116 calculates a touch feature amount among touch positions (x1, y1) to (x3, y3), and the touch operation determining unit 117 compares the touch feature amount with the threshold values of each operation, using the conditional expression of each operation.

Figure 15C:
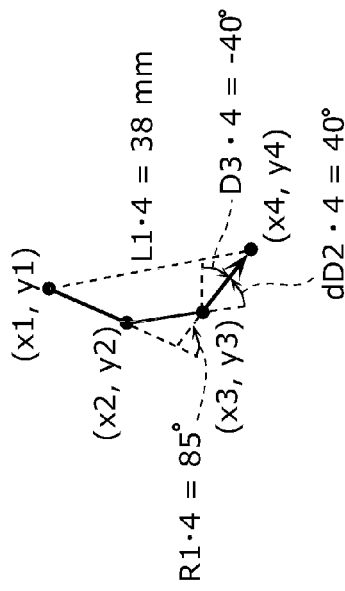
FIG. 15C is a third diagram illustrating a method of recognizing a rotation operation according to Embodiment 1 of the present invention.

Next, as shown by FIG. 15C, the touch feature amount calculation unit 116 calculates a touch feature amount among touch positions (x1, y1) to (x4, y4), and the touch operation determining unit 117 compares the touch feature amount with the threshold values of each operation, using the conditional expression of each operation. As a result, the touch feature amount fails to satisfy a repeat condition for vertical slide operation, and thus it is confirmed that the touch position series does not indicate the vertical slide operation.

Figure 15D:
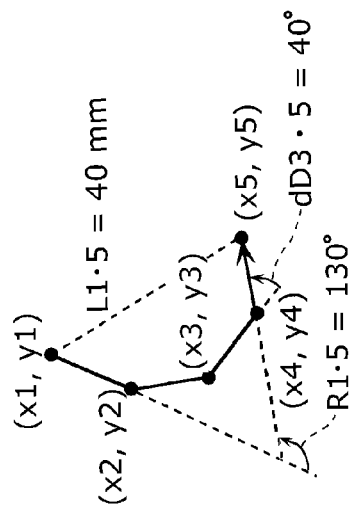
FIG. 15D is a fourth diagram illustrating a method of recognizing a rotation operation according to Embodiment 1 of the present invention.

Next, as shown by FIG. 15D, the touch feature amount calculation unit 116 calculates a touch feature amount among touch positions (x1, y1) to (x5, y5), and the touch operation determining unit 117 compares the touch feature amount with the threshold values of each operation, using the conditional expression of each operation.

Next, the touch feature amount calculation unit 116 calculates a touch feature amount among touch positions (x1, y1) to (x6, y6), and the touch operation determining unit 117 compares the touch feature amount with the threshold values of each operation, using the conditional expression of each operation.

Figure 15E:
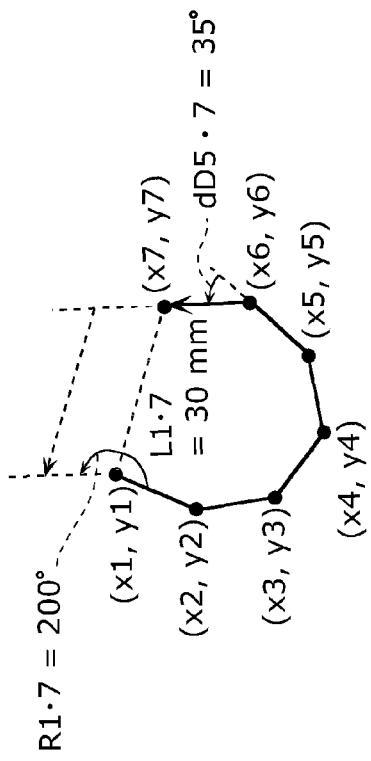
FIG. 15E is a fifth diagram illustrating a method of recognizing a rotation operation according to Embodiment 1 of the present invention.

Next, as shown by FIG. 15E, the touch feature amount calculation unit 116 calculates a touch feature amount among touch positions (x1, y1) to (x7, y7), and the touch operation determining unit 117 compares the touch feature amount with the threshold values of each operation, using the conditional expression of each operation.

As a result, the touch feature amount satisfies the recognition condition for rotation operation, and thus the touch operation recognizing unit 114 outputs the rotation operation (leftward rotation) as a type of operation that is the recognition result. Moreover, the touch operation recognizing unit 114 outputs, among the touch feature amounts calculated by the touch feature amount calculation unit 116, a rotation angle from the touch operation start position as an operation amount of the rotation operation.

The following describes a method of setting a threshold value for a recognition condition, which is intended to facilitate the input of an operation for inputting a specific type of gesture more than that of an operation for inputting another type of gesture.

In the above description, the movement distance threshold value Lvs and the movement direction threshold value Dvs are used for recognizing the vertical slide operation, the movement distance threshold value Lhs and the movement direction threshold value Dhs are used for recognizing the horizontal slide operation, and the movement distance threshold value Lr, the movement direction difference threshold value dDr, and the rotation angle threshold value Rr are used for recognizing the rotation operation.

A degree of ease of input of each of the three gesture operations, the vertical slide operation, the horizontal slide operation, and the rotation operation, is determined in the following manner, using, among the threshold values, the movement direction threshold value Dvs, the movement direction threshold value Dhs, and the movement direction difference threshold value dDr that are used for a conditional expression set as the repeat condition.

FIG. 16 is a table showing possible angular ranges for movement directions or movement direction differences so that a gesture operation is recognized as one of the three gesture operations at three consecutive touch positions from a touch operation start position.

The table shows the possible angular ranges for the movement directions or the movement direction differences between the touch positions at the time when a touch position is sequentially moved from a touch operation start position (xs, ys) through (x(s+1), y(s+1)) and (x(s+2), y(s+2)) to (x(s+3), y(s+3)).

Figure 17:
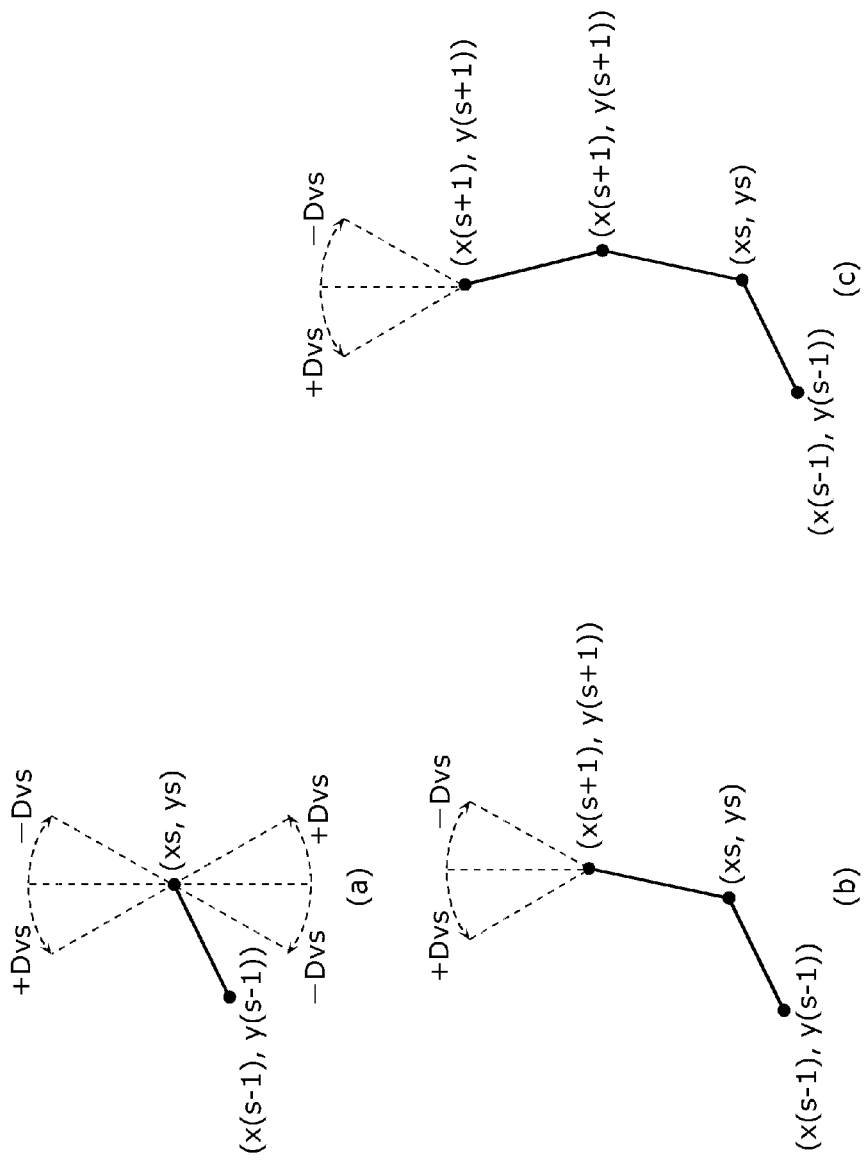
FIG. 17 is a diagram illustrating movement direction ranges of vertical slide operations according to Embodiment 1 of the present invention.

For vertical slide operations, as shown by (a) in FIG. 17, first, to satisfy the rotation recognition condition (2) relative to (xs, ys), in the case of an upward vertical slide operation, (x(s+1), y(s+1)) needs to be inside a sector having (xs, ys) as the center, the positive direction of the y-axis of coordinates as the central line, and the central angle (Dvs×2)°, and in the case of a downward vertical slide operation, (x(s+1), y(s+1)) needs to be inside a sector having (xs, ys) as the center, the negative direction of the y-axis of coordinates as the central line, and the central angle (Dvs×2)°.

In the case of the upward vertical slide operation, for instance, as shown by (b) in FIG. 17, (x(s+2), y(s+2)) needs to be inside a sector having (x(s+1), y(s+1)) as the center, the positive direction of the y-axis of coordinates as the central line, and the central angle (Dvs×2)°.

Likewise, as shown by (c) in FIG. 17, (x(s+3), y(s+3)) needs to be inside the sector having (x(s+1), y(s+1)) as the center, the positive direction of the y-axis of coordinates as the central line, and the central angle (Dvs×2)°. When the touch position moves to the outside of the sector shown by FIG. 17, the vertical slide recognition condition (2) is not satisfied, and immediately it is determined that the gesture operation is not the vertical slide operation.

Thus, when the Dvs is small, a range in which the next touch position is allowed narrows, that is, it is less likely that the gesture operation is recognized as the vertical slide operation. In contrast, when the Dvs is large, the range in which the next touch position is allowed expands, that is, it is more likely that the gesture operation is recognized as the vertical slide operation.

Figure 18:
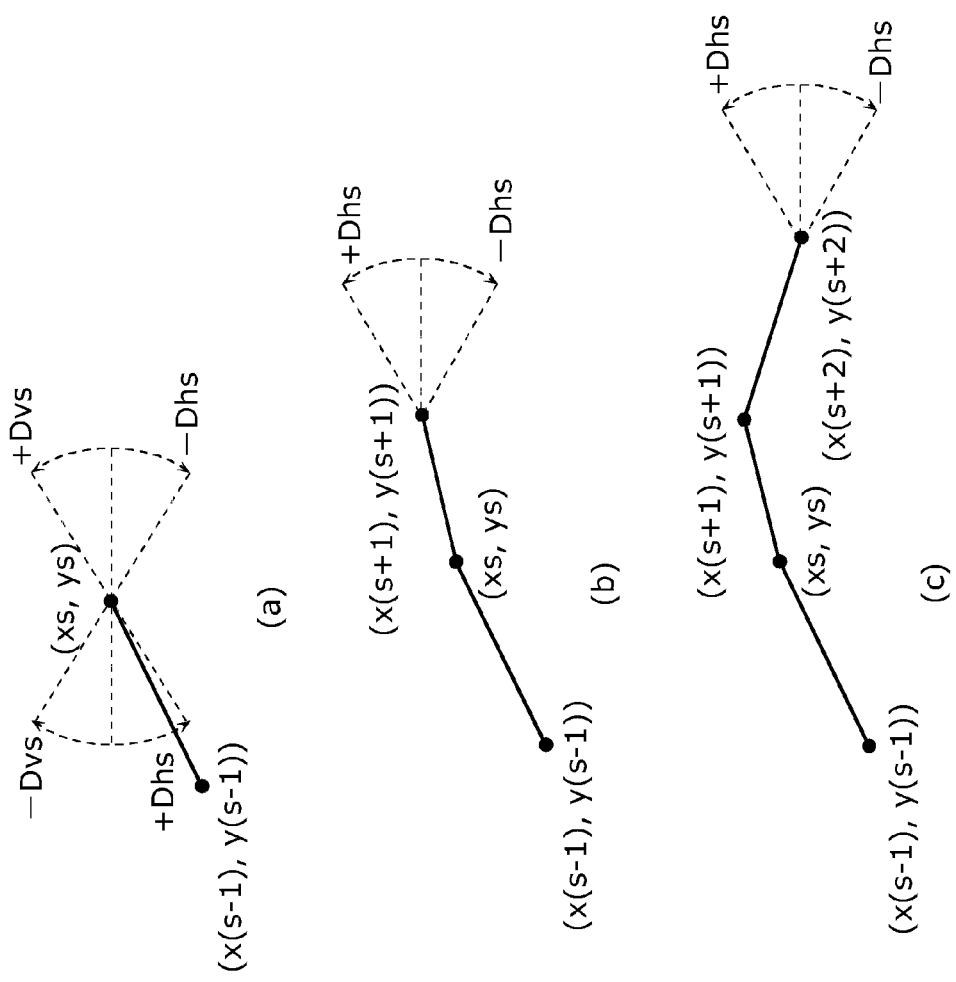
FIG. 18 is a diagram illustrating movement direction ranges of horizontal slide operations according to Embodiment 1 of the present invention.

Like the vertical slide operation, as shown by FIG. 18, as for horizontal slide operations, when the Dhs is large, a range in which the next touch position is allowed expands, that is, it is more likely that the gesture operation is recognized as the horizontal slide operation.

Figure 19:
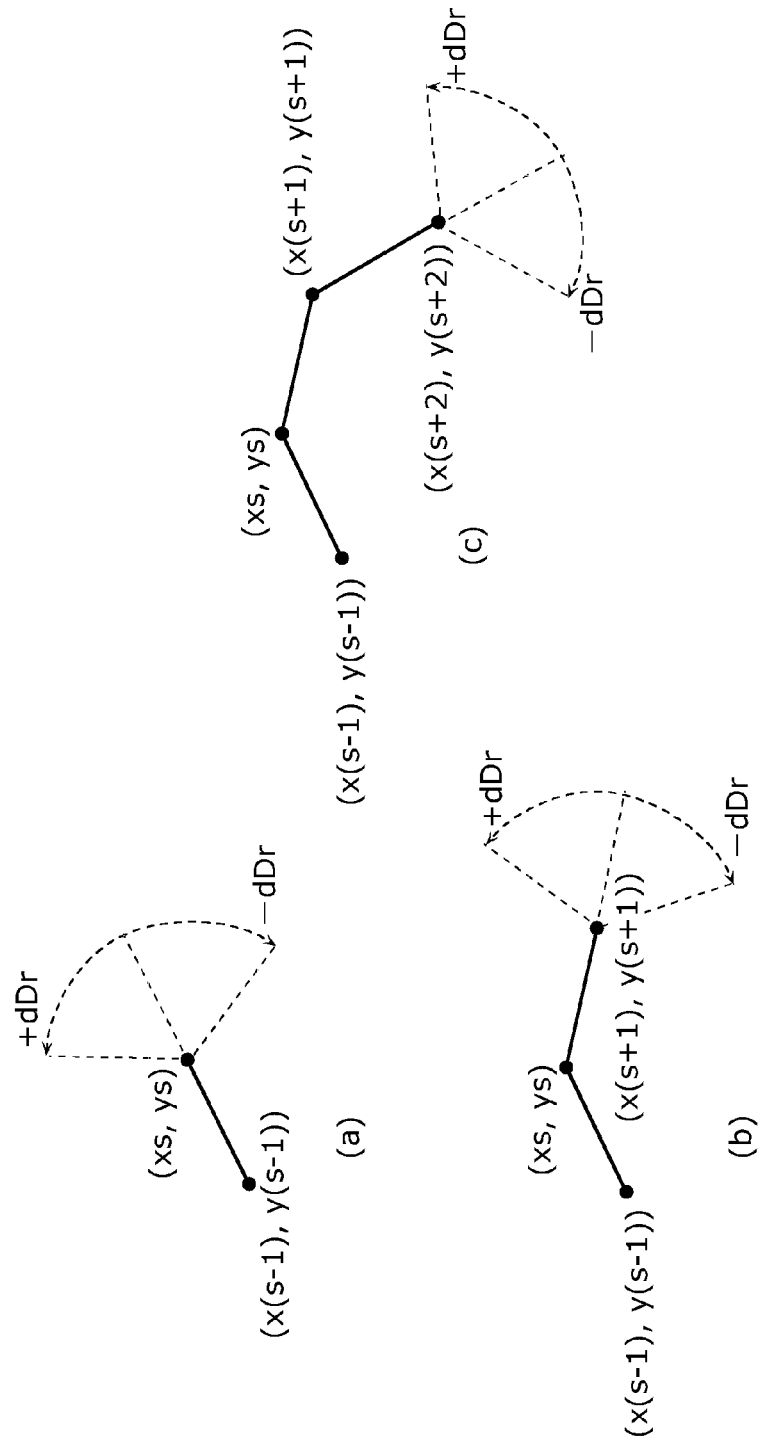
FIG. 19 is a diagram illustrating movement direction difference ranges of horizontal slide operations according to Embodiment 1 of the present invention.

For rotation operations, as shown by (a) in FIG. 19, first, to satisfy the rotation recognition condition (2) relative to (xs, ys), (x(s+1), y(s+1)) needs to be inside a sector having (xs, ys) as the center and the central angle (dDr×2)°.

Likewise, as shown by (b) in FIG. 19, (x(s+2), y(s+2)) needs to be inside a sector having (x(s+1), y(s+1)) as the center and the central angle (dDr×2)°. Similarly, as shown by (c) in FIG. 19, (x(s+3), y(s+3)) needs to be inside a sector having (x(s+2), y(s+2)) as the center and the central angle (dDr×2)°.

When the touch position moves to the outside of the sector shown by FIG. 19, the rotation recognition condition (2) is not satisfied, and immediately it is determined that the gesture operation is not the rotation operation. Thus, when the dDr is small, a range in which the next touch position is allowed narrows, that is, it is less likely that the gesture operation is recognized as the rotation operation. In contrast, when the dDr is large, the range in which the next touch position is allowed expands, that is, it is more likely that the gesture operation is recognized as the rotation operation.

FIG. 20 is a table showing size of possible angular ranges for movement directions or movement direction differences so that a gesture operation is recognized as one of the three gesture operations at three consecutive touch positions from a touch operation start position. For the vertical slide operations, (x(s+1), y(s+1)) is allowable by both the upward and downward vertical slide operations, and thus size of a possible angular range is expressed as (Dvs×4). The same applies to the horizontal slide operations.

The size of each of the angular ranges is a factor for determining how easily each of touch gestures is recognized, and can be used as a degree of ease of input indicating how easily a gesture operation is inputted. In this embodiment, for each gesture operation, a sum of the size of the allowable angular ranges of (xs, ys) to (x(s+3), y(s+3)) is handled as a degree of ease of input.

It is possible to facilitate the input of a specific gesture operation more than that of other gesture operations by setting the threshold values of a recognition condition using the above degree of ease of input.

For instance, when it is intended to facilitate the input of a rotation operation more than that of a vertical slide operation, using the degrees of ease of input shown by FIG. 20, the threshold values dDr and Dvs are set so that dDr×6>Dvs×8 is satisfied. For example, the threshold values may be set as dDr=90° and Dvs=30°.

Moreover, for instance, when it is intended to facilitate the input of a horizontal slide operation most and to make the input of the rotation operation most difficult, the threshold values may be set as Dhs=40°, Dvs=35°, and dDr=45° so that Dhs×8>Dvs×8>dDr×6 is satisfied.

For instance, when it is intended to facilitate the input of the rotation operation more than that of the vertical slide operation, the movement distance threshold values of the vertical slide recognition condition (1), the horizontal slide recognition condition (1), and the rotation recognition condition (1) may be set so that Lr<Lvs is satisfied. Moreover, when it is intended to facilitate the input of the horizontal slide operation most and to make the input of the rotation operation most difficult, the threshold values may be set so that Lhs<Lvs<Lr is satisfied.

As described above, in this embodiment, it is possible to set, for each subregion, the threshold values of the recognition condition, and thus it is possible to set, for each subregion in which the touch operation start position is included, the ease of input according to the type of gesture operation.

Referring back to FIG. 3 again, the function control unit 108 performs a process corresponding to a type of operation indicated by a recognition result.

For instance, when a recognition result of an operation shows that a type of operation indicates a horizontal slide operation (leftward direction) and an operation amount is 30 mm, the image horizontal scroll control unit 109 scrolls an image to the left by 30 mm.

When the recognition result of the operation shows that the type of operation indicates a vertical slide operation (downward direction) and the operation amount is 30 mm, the image vertical scroll control unit 110 scrolls the image downward by 30 mm.

When the recognition result of the operation shows that the type of operation indicates a rotation operation (leftward rotation) and the operation amount is 90°, the image rotation control unit 111 rotates the image to the left by 90°.

When the recognition result of the operation shows that the type of operation indicates a pointing operation, the cursor control unit 112 moves the cursor to a position on the screen which corresponds to the touch position.

As shown by FIG. 2, the display unit 113 draws, on the screen, the result of the process performed by the function control unit 108 as the GUI.

Figure 21:
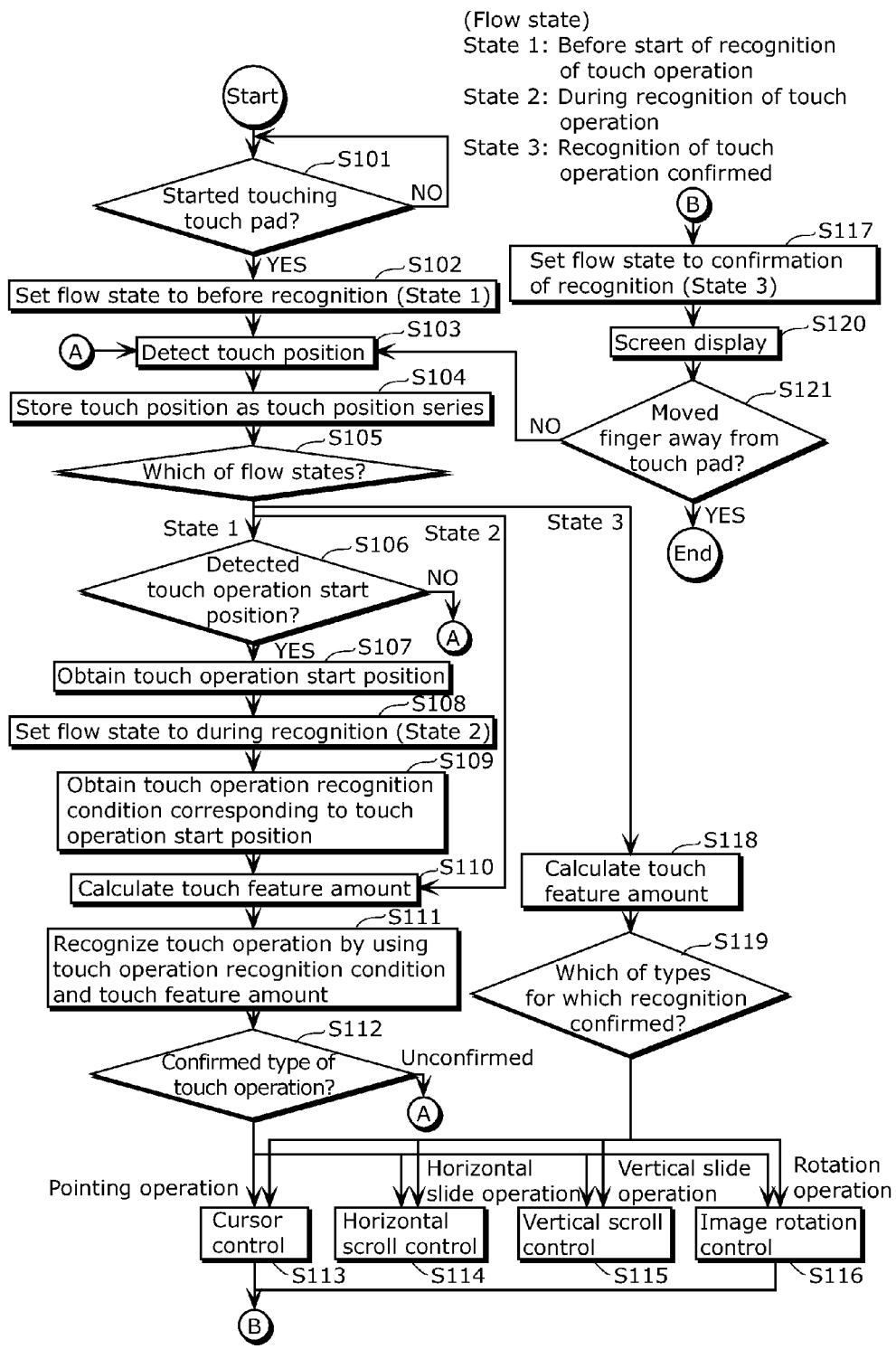
FIG. 21 is a flow chart illustrating a processing flow of the information input apparatus according to Embodiment 1 of the present invention.

FIG. 21 is a flow chart showing the above-described processing flow from when the touch operation is recognized after the touch pad 100 detects the touch position of the finger of the operator to when the screen display is performed.

In this embodiment, the flow is managed by using three flow states, that is, a before recognition state where recognition of a touch operation is not started, a during recognition state where a touch operation is being recognized, and a recognition confirmed state where recognition of a touch operation is confirmed.

First, when the touch position detecting unit 101 detects that the operator has contacted the touch pad 100 with the finger (S101), the touch position detecting unit 101 sets a flow state to the before recognition state (S102), and the touch pad 100 and the touch position detecting unit 101 obtain the touch position (S103).

Next, the touch position series storage unit 102 stores, as a touch position series, the touch position obtained by the touch position detecting unit 101 (S104).

Next, a process is changed according to the flow state (S105).

The flow branches off to a process of detecting a touch operation start position, when the flow state is the before recognition state (State 1), to a process of calculating a touch feature amount and performing recognition, when the flow state is the during recognition state (State 2), and to a process of calculating a touch feature amount and performing function control, when the flow state is the recognition confirmed state (State 3).

When the flow state is the before recognition state in S103, the touch operation start position detecting unit 103 detects the touch operation start position (S106 and S107) and sets the flow state to the during recognition state (S108), the touch operation determining unit 117 obtains touch operation recognition conditions corresponding to the touch operation start position (S109), the touch feature amount calculation unit 116 calculates a touch feature amount (S110), and the touch operation determining unit 117 recognizes the touch operation by comparing the touch operation recognition conditions (conditional expressions and threshold values) with the touch feature amount (S111).

When the recognition of the touch operation is confirmed and a type of touch operation is determined (S112), the function control unit 108 performs: cursor control when the determined type of touch operation indicates a pointing operation (S113); image horizontal scroll control when the determined type of touch operation indicates a horizontal slide operation (S114); image vertical scroll control when the determined type of touch operation indicates a vertical slide operation (S115); and image rotation control when the determined type of touch operation indicates a rotation operation (S116). Furthermore, the function control unit 108 sets the flow state to the recognition confirmed state (State 3) (S117).

When the flow state is the during recognition state (State 2) in S103, the touch feature amount calculation unit 116 calculates a touch feature amount (S110), and performs the recognition using the obtained touch operation recognition conditions.

When the flow state is the recognition confirmed state (State 3) in S103, the touch feature amount calculation unit 116 calculates a touch feature amount to obtain an operation amount of the confirmed touch operation (S118), and the function control unit 108 performs a function (one of S113 to S116) according to the type of confirmed touch operation (S119).

Next, the display unit 113 disclose, on the screen, the result of the function performed through the touch operation (S120).

Finally, the touch position detecting unit 101 detects whether or not the operator has removed the finger from the touch pad 100 (S121). The touch position detecting unit 101 outputs the above-described touch off signal when detecting that the operator has removed the finger from the touch pad 100, and ends the series of processing after making sure that the touch position detecting unit 101 can detect the start of the next touch. The touch position detecting unit 101 obtains a new touch position (S103) when the operator keeps touching the touch pad 100 with the finger, and repeats the series of processing.

It is to be noted that although none of the functions is performed before the detection of the touch operation start position and during the recognition of the touch operation in this embodiment, the type of touch operation may be provisionally set to the pointing operation, and the function control unit 108 may perform the cursor control. Here, a type of touch operation is not yet confirmed for the pointing operation, and when the result of a recognition process is confirmed, the type of touch operation is switched to a type of touch operation corresponding to the recognition result.

Consequently, even when it takes a time to detect the touch operation start position or recognize the touch operation, a cursor is displayed on the screen for a movement of the finger of the operator, and thus the operator can obtain visual feedback.

It is to be noted that although the touch pad is used as the touch sensor which detects the finger of the operator in this embodiment, the present invention is not limited to this. A touch panel with which the display unit 113 and a touch input unit are integrated may be used.

It is to be noted that although the touch movement distance, the touch movement direction, the touch movement direction difference that are obtained from the touch movement direction, and the rotation angle are used as the touch feature amount for recognition by being compared with the threshold values in this embodiment, the present invention is not limited to these. For example, a touch operation time, a touch movement speed, a touch movement acceleration, an amount of change of a touch strength (a difference in touch strength between touch information items in touch information series), and so on may be used as a touch feature amount, and the touch feature amount to which threshold values are set may be used as a recognition condition.

For instance, it is conceivable that a type of touch operation is recognized using a touch operation time at which a rotation operation is not inputted and instead a pointing operation is inputted as a predetermined time elapses after the start of a touch.

Moreover, for example, in terms of the touch movement speed, it is conceivable that the type of touch operation is recognized as indicating the pointing operation when a speed for moving a touching finger is less than or equal to a certain speed, and as indicating a slide operation when the speed for moving the touching finger is greater than or equal to the certain speed.

Furthermore, for instance, in terms of the touch movement acceleration, it is conceivable that the type of touch operation is recognized as indicating the pointing operation when an acceleration for moving a touching finger is less than or equal to a certain acceleration, and as indicating the slide operation for only the time period during which an acceleration greater than or equal to the certain acceleration is kept.

Moreover, for example, in terms of the amount of change of a touch strength, it is conceivable that the type of touch operation is recognized as indicating the pointing operation when an amount of change of a touch strength after the start of a touch is less than or equal to a certain amount of change of a touch strength, and as indicating the slide operation when the amount of change of the touch strength after the start of the touch is greater than or equal to the certain amount of change of the touch strength.

It is to be noted that although the information input apparatus 190 includes the single touch pad 100 in this embodiment, the present invention is not limited to this. The information input apparatus 190 may include a plurality of touch pads or touch panels.

Moreover, although the information input apparatus 190 includes the button 150 different from the touch pad 100 in this embodiment, the present invention is not limited to this. For instance, a touch operation called "tap" through which the touch pad 100 is tapped for a short time may be used instead of an operation of pressing the button 150, and a button may be provided on the undersurface of the touch pad 100 so that the touch pad 100 itself can be clicked (a so-called clickable touch pad).

According to the above configuration, it is possible to provide the information input apparatus 190 which (i) allows the input of the gesture operations even when the operation is started at any position on the touch pad 100, (ii) facilitates the recognition of the specific gesture operation more than that of other gesture operations, by setting the touch operation recognition conditions based on a tendency of the touch operation start position of each gesture operation, which results from a shape of the housing or a way the housing is held, and (iii) enables the operator to perform natural and quick input.

(Embodiment 2)

As in Embodiment 1, the information input apparatus 190 according to Embodiment 2 of the present invention includes the housing 189, the capacitance touch pad 100 as the touch sensor, and the operation determination button 150.

As in Embodiment 1, the information input apparatus 190 recognizes, as a touch operation, a pointing operation for moving a screen-displayed cursor. Moreover, the information input apparatus 190 recognizes a vertical slide operation for tracing the touch pad 100 linearly in a vertical direction, a horizontal slide operation for tracing the touch pad 100 linearly in a horizontal direction, and a rotation operation for tracing the touch pad 100 in a circular trajectory.

Figure 22:
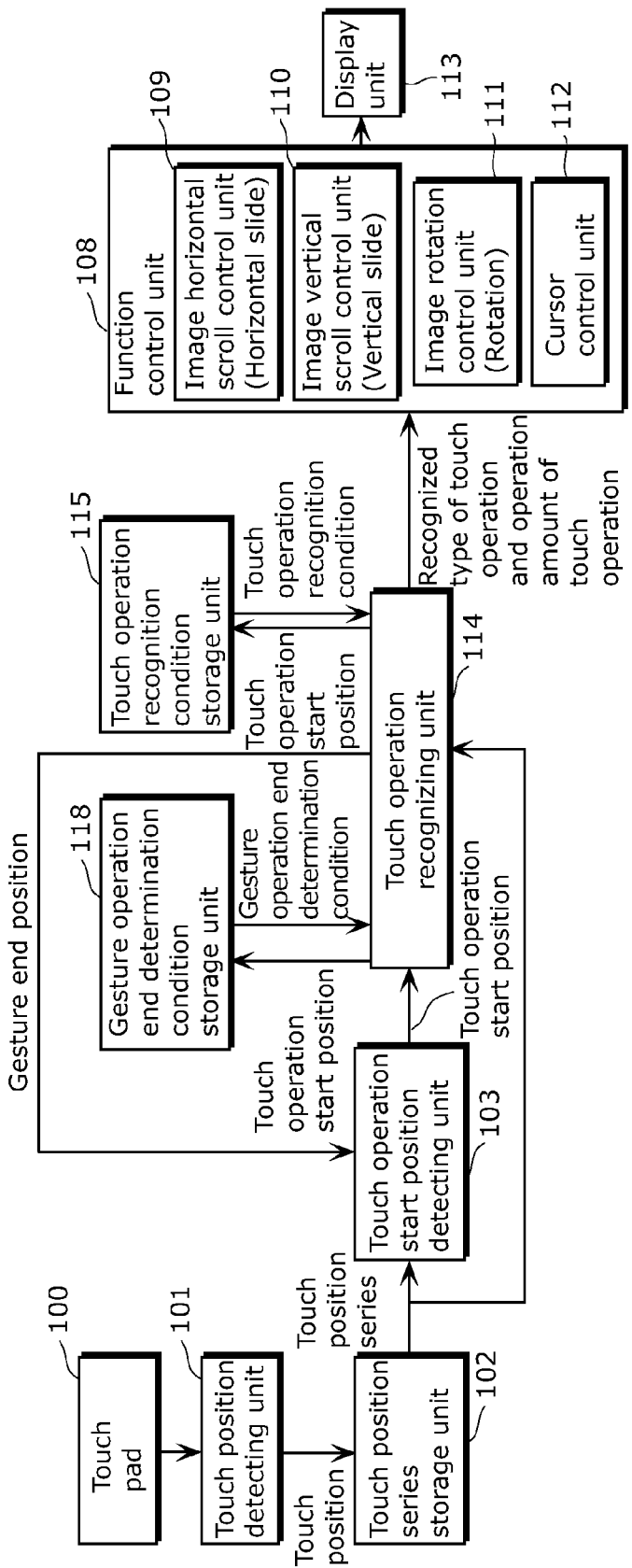
FIG. 22 is a block diagram showing a configuration of the information input apparatus according to Embodiment 2 of the present invention.

FIG. 22 is a diagram showing a configuration example of the information input apparatus 190 according to this embodiment.

The information input apparatus 190 according to this embodiment differs from the information input apparatus 190 according to Embodiment 1 (FIG. 3) in that the touch operation recognizing unit 114 determines whether or not a gesture operation has been ended with the touch pad 100 touched, based on an operation or a trajectory made with the finger of the operator, and in that the touch operation start position detecting unit 103 sets a touch position at the end of a gesture operation as a touch operation start position for the next touch operation.

This embodiment mainly describes the touch operation start position detecting unit 103, the touch operation recognizing unit 114, and a gesture operation end determination condition storage unit 118. The same reference signs are assigned to the same elements as in Embodiment 1, and descriptions thereof are omitted.

The following describes, among the blocks shown by FIG. 22, functions different from the functions in Embodiment 1.

The gesture operation end determination condition storage unit 118 stores, for each subregion set on the touch pad 100, a touch movement distance threshold value, a touch movement direction threshold value, and a touch rotation angle threshold value as conditions for determining whether or not each of gesture operations (a vertical slide operation, a horizontal slide operation, and a rotation operation) among types of touch operation confirmed by the touch operation recognizing unit 114 as recognition results has been ended.

Thus, the threshold values stored for each subregion include a vertical slide end determination threshold value, a horizontal slide end determination threshold value, and a rotation end determination threshold value.

In other words, in the case where the touch operation recognizing unit 114 outputted a type of gesture operation as a recognition result, subsequently, the touch operation recognizing unit 114 determines whether or not a gesture operation has been inputted. When the touch operation recognizing unit 114 determines that the gesture operation has been inputted, the touch operation recognizing unit 114 outputs, as a gesture operation end position, at least one of (i) a touch position that is a position which is on the operation surface of the touch pad 100 being touched by the operator and is detected when the determination is made and (ii) a touch position that is a position which was on the operation surface of the touch pad 100 being touched by the operator and was detected prior to the determination.

Moreover, the touch operation start position detecting unit 103 detects, as a touch operation start position, a touch position detected when the touch operation recognizing unit 114 determines that the gesture operation has been inputted.

More specifically, the information input apparatus 190 further includes the gesture operation end determination condition storage unit 118, and the touch operation recognizing unit 114 further includes a gesture operation end determining unit 119 and a gesture end position obtaining unit 120.

The gesture operation end determination condition storage unit 118 stores, for each subregion, gesture operation end determination conditions that are conditions for determining whether or not a gesture operation is already ended, in association with respective types of gesture operation.

The gesture operation end determining unit 119 determines whether or not a touch feature amount satisfies a gesture operation end determination condition which is stored in association with, among the subregions, a subregion including the touch operation start position and is associated with the type of gesture operation determined by the touch operation determining unit 117.

When the gesture operation end determining unit 119 determines that the touch feature amount satisfies the gesture operation end determination condition, the gesture end position obtaining unit 120 outputs, as the gesture operation end position, at least one of (i) a touch position detected when the touch feature amount satisfies the gesture operation end determination condition and (ii) a touch position detected prior to when the touch feature amount satisfies the gesture operation end determination condition.

Subsequently, the touch operation start position detecting unit 103 detects the outputted gesture operation end position as the touch operation start position.

It is to be noted that the gesture end position obtaining unit 120 may output, as the gesture operation end position, one of (i) the touch position detected when the touch operation recognizing unit 114 determines that the gesture operation has been inputted and (ii) the touch position detected prior to the determination.

The following describes in more detail the above process.

FIG. 23 is a diagram showing an exemplary structure of data stored in the gesture operation end determination condition storage unit 118, and exemplary subregions. The subregions provided on the touch pad 100 are the same as in the example of Embodiment 1 (FIG. 6).

The gesture operation end determination condition storage unit 118 stores, for each of the 36 subregions (1-1) to (6-6), a movement direction threshold value Dvse to be compared with a movement direction $D(i-1) \cdot i$ of two consecutive touch positions $(x(i-1), y(i-1))$ and $(xi, yi)$ in a touch position series [i=s+any one of 1 to n], as a threshold value to be used for determining whether or not a vertical slide operation is already ended.

The gesture operation end determination condition storage unit 118 stores, using the threshold value, a vertical slide operation end determination condition in the following exemplary manner. The gesture operation end determination condition storage unit 118 determines that the vertical slide operation has been ended, when the touch operation of the operator satisfies the condition.

Vertical slide operation end determination condition: $|Di-1 \cdot i| \leq Dvse$ or $180° - |Di-1 \cdot i| \leq Dvse$ [i=s+any one of 1 to n]

Moreover, the gesture operation end determination condition storage unit 118 stores, for each of the 36 subregions (1-1) to (6-6), a movement direction threshold value Dhse to be compared with a movement direction $D(i-1) \cdot i$ of the two consecutive touch positions $(x(i-1), y(i-1))$ and $(xi, yi)$ in a touch position series [i=s+any one of 1 to n], as a threshold value for determining whether or not a horizontal slide operation is already ended. The gesture operation end determination condition storage unit 118 stores, using the threshold value, a horizontal slide operation end determination condition in the following exemplary manner. The gesture operation end determination condition storage unit 118 determines that the horizontal slide operation has been ended, when the touch operation of the operator satisfies the condition.

Horizontal slide operation end determination condition: $||Di-1 \cdot i| - 90°| \leq Dhse$ [i=s+any one of 1 to n]

Moreover, the gesture operation end determination condition storage unit 118 stores, for each of the 36 subregions (1-1) to (6-6), a movement direction difference threshold value dDre to be compared with a difference $dD(i-2) \cdot i$ between (i) a movement direction $D(i-2) \cdot (i-1)$ of $(x(i-2), y(i-2))$ and $(x(i-1), y(i-1))$ and (ii) a movement direction $D(i-1) \cdot i$ of $(x(i-1), y(i-1))$ and $(xi, yi)$, among three consecutive touch positions $(x(i-2), y(i-2))$, $(x(i-1), y(i-1))$, and $(xi, yi)$ in a touch position series, as a threshold value for determining whether or not a rotation operation is already ended [i=s+any one of 2 to n].

The gesture operation end determination condition storage unit 118 stores, using the threshold value, a rotation operation end determination condition in the following exemplary manner. The gesture operation end determination condition storage unit 118 determines that the rotation operation has been ended, when the touch operation of the operator satisfies the condition.

Rotation operation end determination condition: $|dDi-2 \cdot i| \geq dDre$ [i=s+any one of 2 to n]

It is to be noted that although a conditional expression for recognition is common to each operation regardless of the subregions in the example shown by FIG. 23, not only threshold values but also a conditional expression may differ for each subregion.

Figure 24:
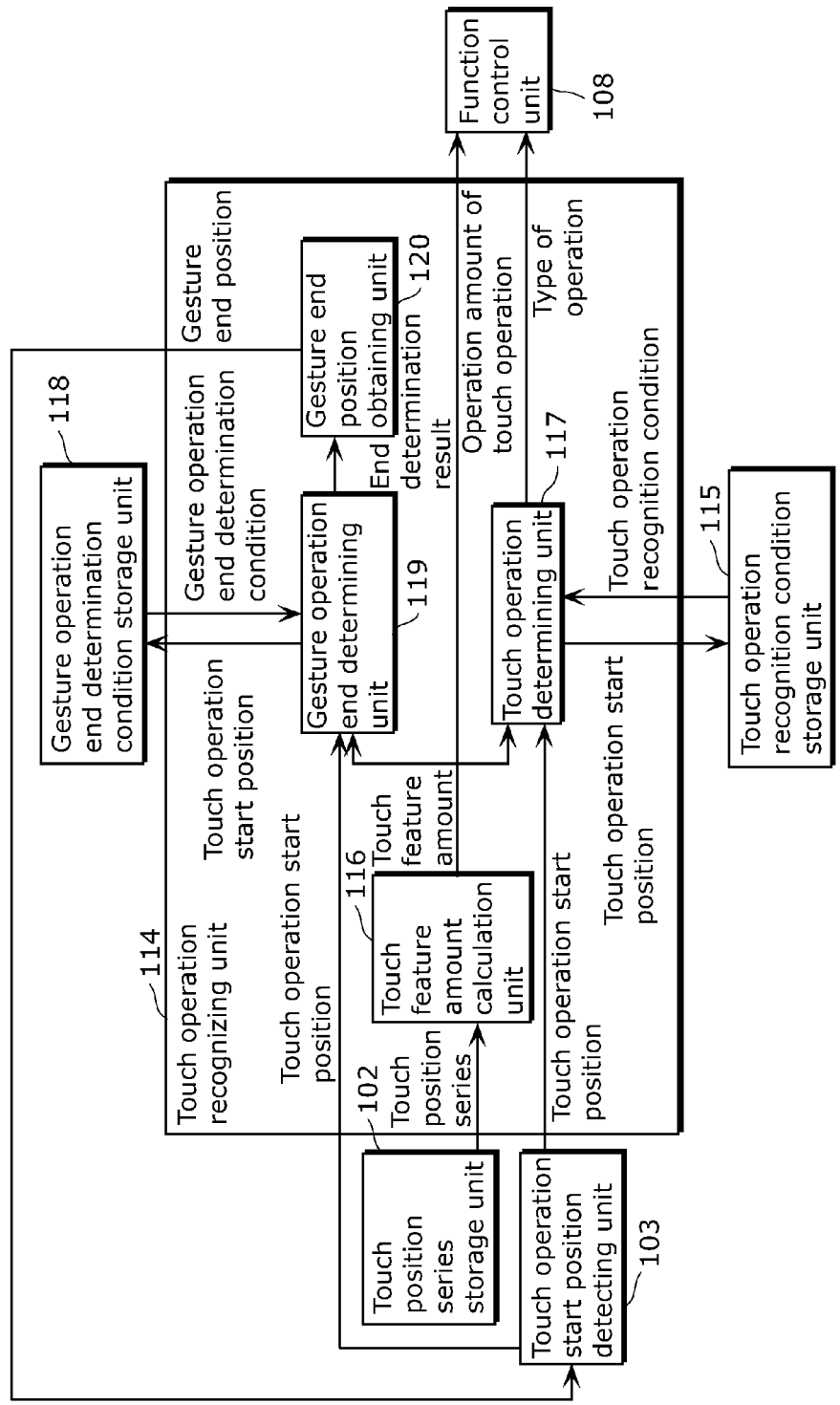
FIG. 24 is a block diagram showing an exemplary process of recognizing a touch operation according to Embodiment 2 of the present invention.

FIG. 24 shows a detailed internal configuration of the touch operation recognizing unit 114 in this embodiment.

The touch operation recognizing unit 114 includes the touch feature amount calculation unit 116, the touch operation determining unit 117, the gesture operation end determining unit 119, and the gesture end position obtaining unit 120. Among the units, the touch feature amount calculation unit 116 and the touch operation determining unit 117 are the same as those in Embodiment 1, and thus descriptions thereof are omitted.

The gesture operation end determining unit 119 obtains a touch operation start position (xs, ys) from the touch operation start position detecting unit 103, and reads and obtains, from the gesture operation end determination condition storage unit 118, a subregion (M-N) including (xs, ys) and an operation end threshold value and an end determination condition that are a gesture operation end determination condition associated with the subregion.

To determine whether or not the vertical slide operation has been ended, the gesture operation end determining unit 119 obtains (M-N): (Dvse) and $|D(i-1) \cdot i| \leq Dvse$ or $180° - |D(i-1) \cdot i| \leq Dvse$ [i=s+any one of 1 to n] as the threshold value and the end determination condition, respectively.

To determine whether or not the horizontal slide operation has been ended, the gesture operation end determining unit 119 obtains (M-N): (Dhse) and $||D(i-1) \cdot i| - 90°| \leq Dhse$ [i=s+any one of 1 to n] as the threshold value and the end determination condition, respectively.

To determine whether or not the rotation operation has been ended, the gesture operation end determining unit 119 obtains (M-N): (dDre) and $dD(i-2) \cdot i \geq dDre$ [i=s+any one of 2 to n] as the threshold value and the end determination condition, respectively.

Then, the gesture operation end determining unit 119 checks which of the gesture operation end determination conditions the gesture operation satisfies, using the touch feature amounts $D(i-1) \cdot i$ and $dD(i-2) \cdot i$ calculated by the touch feature amount calculation unit 116.

When the gesture operation end determining unit 119 determines that the gesture operation has been ended, the gesture end position obtaining unit 120 outputs, as a gesture operation end position, at least one of the last touch position (xn, yn) in a touch position series and a touch position (x(n−1), y(n−1)) second to the last touch position (xn, yn).

The touch operation start position detecting unit 103 detects, as the touch operation start position, the gesture operation end position obtained by the gesture end position obtaining unit 120, and updates a value of the touch operation start position. Subsequently, the series of touch operation recognition processing described in Embodiment 1 is repeated using the updated touch operation start position.

It is to be noted that when the gesture end position obtaining unit 120 outputs two gesture operation end positions (xn, yn) and (x(n−1), y(n−1)), the touch operation start position detecting unit 103 may update, as the touch operation start position, a middle point of a line connecting the two positions.

The following describes an example where the operator ends a gesture operation without removing the finger from the touch pad 100 and inputs the next gesture operation, with reference to FIGS. 25 to 30.

Figure 25:
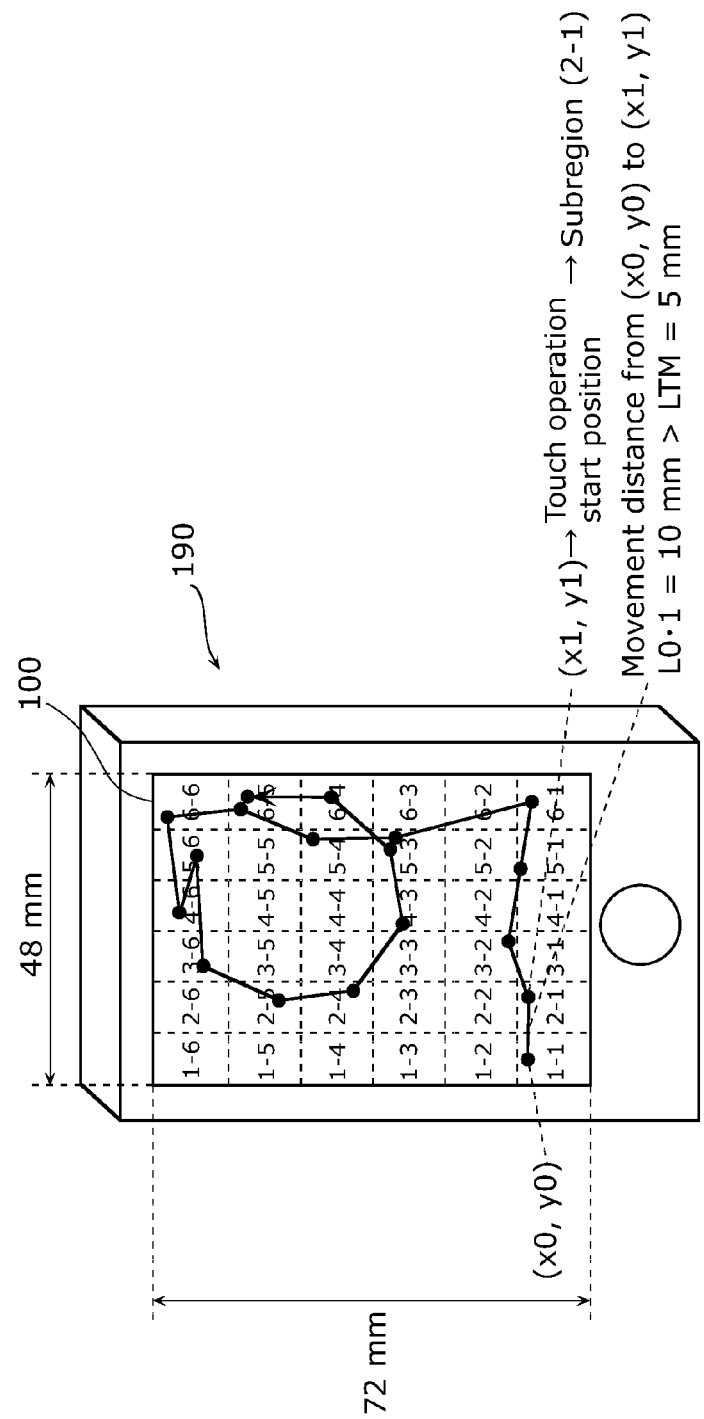
FIG. 25 is a diagram showing an exemplary touch trajectory of a touch operation according to Embodiment 2 of the present invention.

(1) First, as shown by FIG. 25, assuming that a movement distance between (x0, y0) and (x1, y1) is expressed as L0·1=10 mm, because the movement distance exceeds a threshold value LTM=5 mm for detecting a touch operation start position, the touch operation start position detecting unit 103 sets (x1, y1) as a touch operation start position (xs, ys).

(2) Next, as shown by FIG. 26, the touch operation determining unit 117 obtains, from the touch operation recognition condition storage unit 115, conditional expressions and threshold values as touch operation recognition conditions corresponding to (x1, y1). Moreover, the gesture operation end determining unit 119 obtains, from the gesture operation end determination condition storage unit 118, conditional expressions and threshold values as gesture operation end determination conditions corresponding to (x1, y1).

Figure 27:
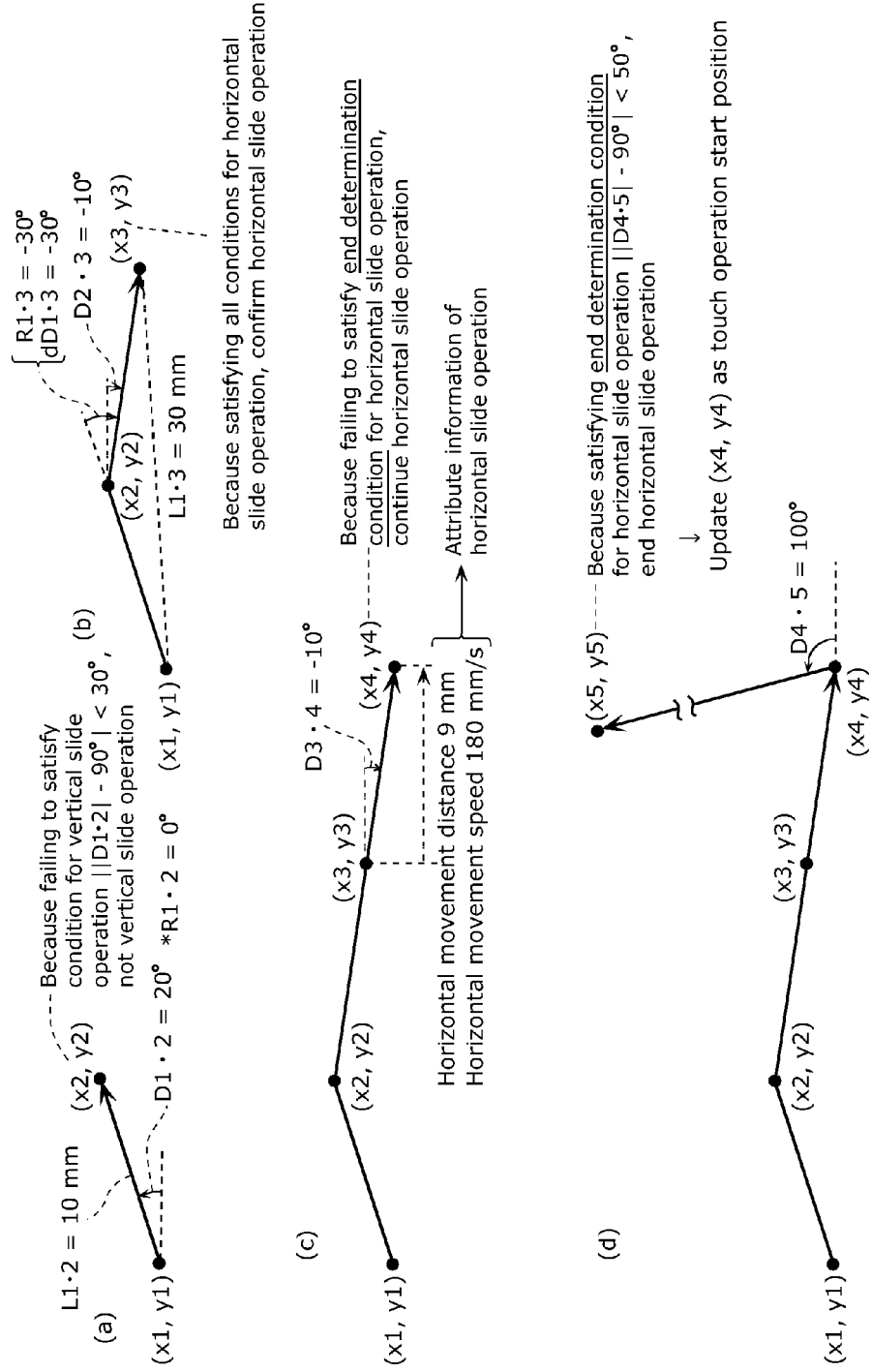
FIG. 27 is a diagram illustrating a method of determining an end of a horizontal slide operation according to Embodiment 2 of the present invention.

(3) Next, as shown by (a) in FIG. 27, the touch feature amount calculation unit 116 calculates a touch feature amount between touch positions (x1, y1) and (x2, y2), and the touch operation determining unit 117 compares the touch feature amount with the threshold values of each operation, using the conditional expression of each operation. As a result, the touch feature amount fails to satisfy a repeat condition for vertical slide operation, and thus it is confirmed that a touch position series does not indicate the vertical slide operation.

(4) Next, as shown by (b) in FIG. 27, the touch feature amount calculation unit 116 calculates a touch feature amount among touch positions (x1, y1) to (x3, y3), and the touch operation determining unit 117 compares the touch feature amount with the threshold values of each operation, using the conditional expression of each operation.

As a result, the touch feature amount satisfies the recognition condition for horizontal slide operation, and thus the touch operation recognizing unit 114 outputs the vertical slide operation (rightward direction) as a type of operation that is the recognition result. Moreover, the touch operation recognizing unit 114 outputs, among the touch feature amounts calculated by the touch feature amount calculation unit 116, a movement distance from the touch operation start position as an operation amount of the horizontal slide operation.

(5) Next, as shown by (c) in FIG. 27, the touch feature amount calculation unit 116 calculates a touch feature amount among touch positions (x1, y1) to (x4, y4), and the gesture operation end determining unit 119 compares the touch feature amount with the threshold values, using an end determination conditional expression for horizontal slide operation.

As a result, the touch feature amount fails to satisfy the end determination condition for horizontal slide operation, and thus the gesture operation end determining unit 119 continues the processing for determining a horizontal slide operation, and outputs, as an operation amount of the horizontal slide operation, the movement distance from the touch operation start position among the touch feature amounts calculated by the touch feature amount calculation unit 116.

(6) Next, as shown by (d) in FIG. 27, the touch feature amount calculation unit 116 calculates a touch feature amount among touch positions (x1, y1) to (x5, y5), and the gesture operation end determining unit 119 compares the touch feature amount with the threshold values, using the end determination conditional expression for horizontal slide operation.

As a result, the touch feature amount satisfies the end determination condition for horizontal slide operation, and thus the gesture operation end determining unit 119 outputs the determination of the end of the gesture operation and the gesture end position obtaining unit 120 outputs, as the gesture operation end position, (x4, y4). The touch operation start position detecting unit 103 updates the gesture operation end position as a new touch operation start position.

(7) Next, as shown by FIGS. 28 and 29, the touch operation determining unit 117 obtains, from the touch operation recognition condition storage unit 115, conditional expressions and threshold values as touch operation recognition conditions corresponding to (x4, y4). Moreover, the gesture operation end determining unit 119 obtains, from the gesture operation end determination condition storage unit 118, conditional expressions and threshold values as gesture operation end determination conditions corresponding to (x4, y4).

Figure 30:
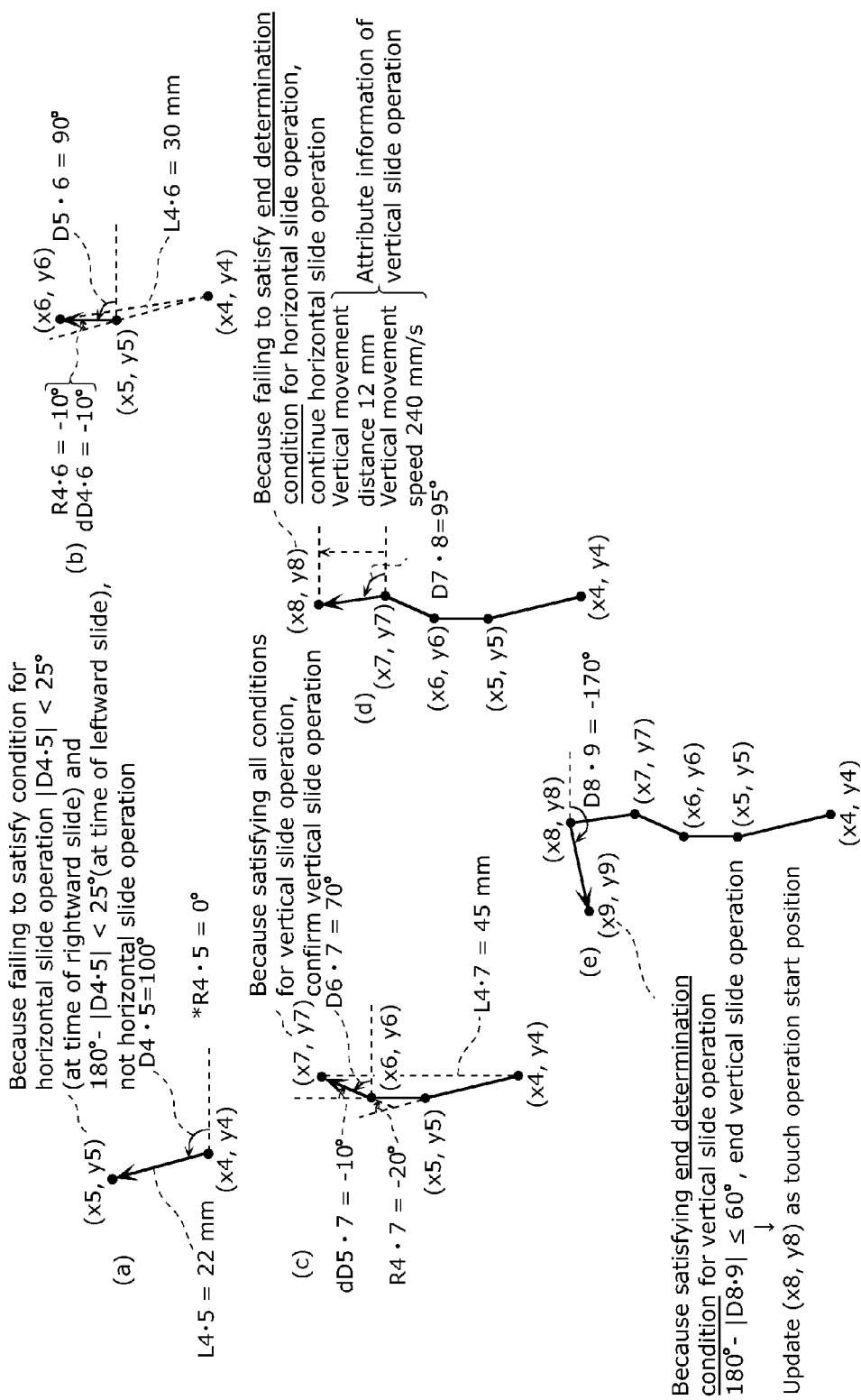
FIG. 30 is a diagram illustrating a method of determining an end of a vertical slide operation according to Embodiment 2 of the present invention.

(8) Next, as shown by (a) in FIG. 30, the touch feature amount calculation unit 116 calculates a touch feature amount between touch positions (x4, y4) and (x5, y5), and the touch operation determining unit 117 compares the touch feature amount with the threshold values of each operation, using the conditional expression of each operation. As a result, the touch feature amount fails to satisfy a repeat condition for horizontal slide operation, and thus it is confirmed that the touch position series does not indicate the horizontal slide operation.

(9) Next, as shown by (b) in FIG. 30, the touch feature amount calculation unit 116 calculates a touch feature amount among touch positions (x4, y4) to (x6, y6), and the touch operation determining unit 117 compares the touch feature amount with the threshold values of each operation, using the conditional expression of each operation.

(10) Next, as shown by (c) in FIG. 30, the touch feature amount calculation unit 116 calculates a touch feature amount among touch positions (x4, y4) to (x7, y7), and the touch operation determining unit 117 compares the touch feature amount with the threshold values of each operation, using the conditional expression of each operation. As a result, the touch feature amount satisfies the recognition condition for vertical slide operation, and thus the touch operation recognizing unit 114 outputs the vertical slide operation (upward direction) as a type of operation that is the recognition result. Moreover, the touch operation recognizing unit 114 outputs, among the touch feature amounts calculated by the touch feature amount calculation unit 116, a movement distance from the touch operation start position as an operation amount of the vertical slide operation.

(11) Next, as shown by (d) in FIG. 30, the touch feature amount calculation unit 116 calculates a touch feature amount among touch positions (x4, y4) to (x8, y8), and the gesture operation end determining unit 119 compares the touch feature amount with the threshold values, using an end determination conditional expression for vertical slide operation. As a result, the touch feature amount fails to satisfy the end determination condition for vertical slide operation, and thus the gesture operation end determining unit 119 continues the vertical slide operation and outputs, among the touch feature amounts calculated by the touch feature amount calculation unit 116, a movement distance from the touch operation start position as an operation amount of the vertical slide operation.

(12) Next, as shown by (e) in FIG. 30, the touch feature amount calculation unit 116 calculates a touch feature amount among touch positions (x4, y4) to (x9, y9), and the gesture operation end determining unit 119 compares the touch feature amount with the threshold values, using the end determination conditional expression for vertical slide operation. As a result, the touch feature amount satisfies the end determination condition for vertical slide operation, and thus the gesture operation end determining unit 119 outputs the determination of the end of the gesture operation and the gesture end position obtaining unit 120 outputs, as the gesture operation end position, (x8, y8). The touch operation start position detecting unit 103 updates the gesture operation end position as a new touch operation start position.

It is to be noted that in addition to the process of setting, as the touch operation start position, the gesture operation end position among the described processes (1) to (12), the touch operation recognizing unit 114 may output a touch position at the time when a pointing operation is confirmed as a type of operation that is a recognition result, and the touch operation start position detecting unit 103 may update the touch position as a new touch operation start position. The following describes an example of this process as a sequel to the process (12) with reference to FIGS. 31 to 41.

Figure 31:
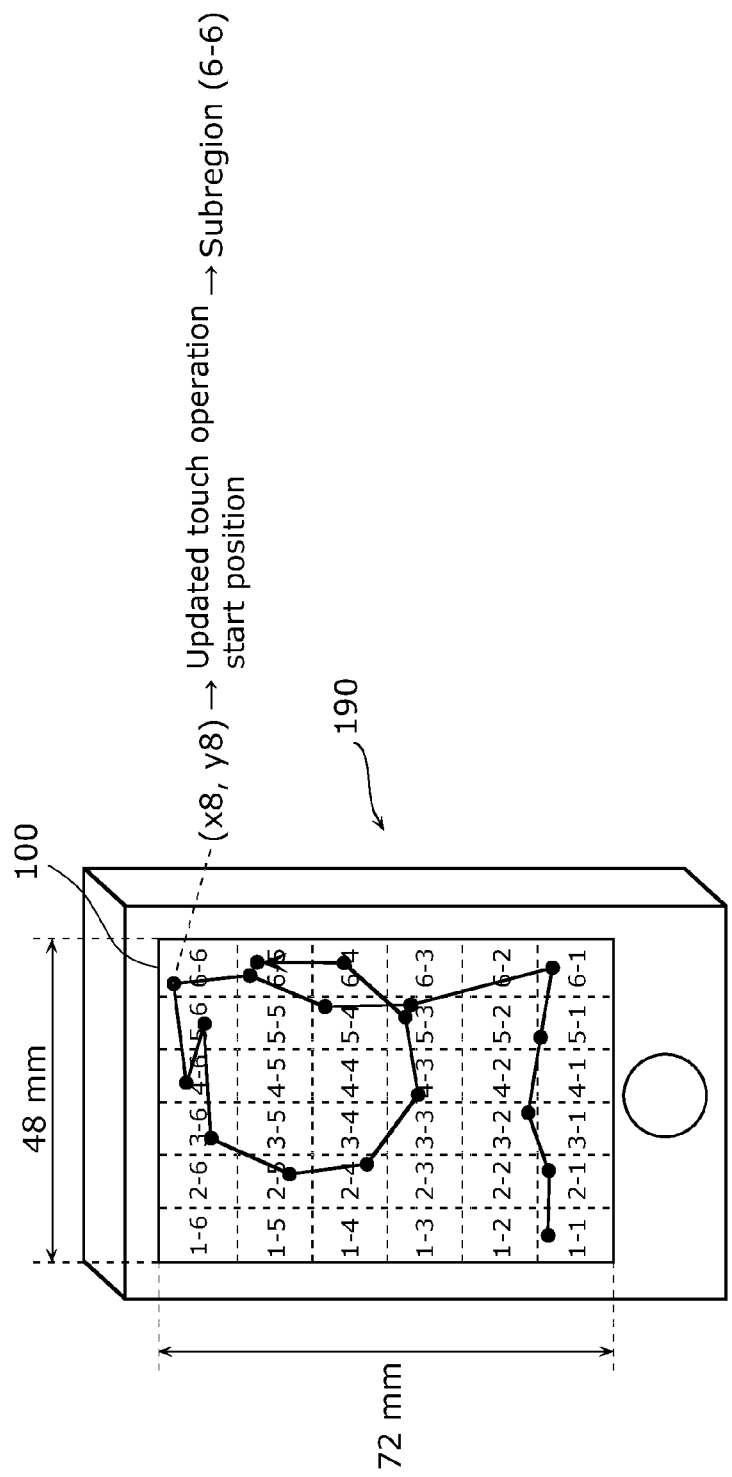
FIG. 31 is a diagram showing an example of an update of a touch operation start position according to Embodiment 2 of the present invention.

(13) Next, as shown by FIGS. 31 and 32, the touch operation determining unit 117 obtains, from the touch operation recognition condition storage unit 115, conditional expressions and threshold values as touch operation recognition conditions corresponding to (x8, y8). Moreover, the gesture operation end determining unit 119 obtains, from the gesture operation end determination condition storage unit 118, conditional expressions and threshold values as gesture operation end determination conditions corresponding to (x8, y8).

Figure 33:
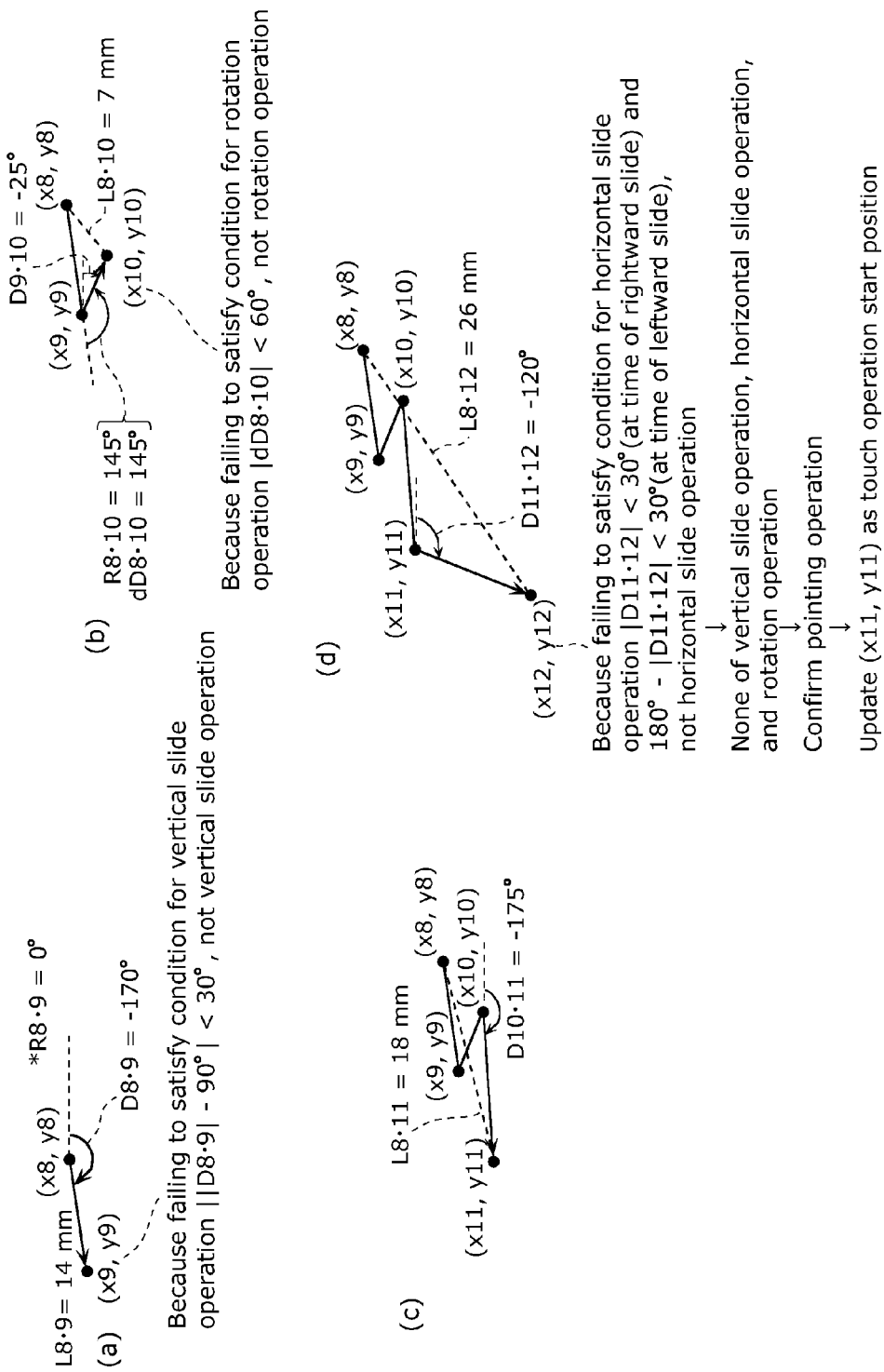
FIG. 33 is a diagram illustrating a method of recognizing a pointing operation according to Embodiment 2 of the present invention.

(14) Next, as shown by (a) in FIG. 33, the touch feature amount calculation unit 116 calculates a touch feature amount between touch positions (x8, y8) and (x9, y9), and the touch operation determining unit 117 compares the touch feature amount with the threshold values of each operation, using the conditional expression of each operation. As a result, the touch feature amount fails to satisfy a repeat condition for vertical slide operation, and thus it is confirmed that the touch position series does not indicate the vertical slide operation.

(15) Next, as shown by (b) in FIG. 33, the touch feature amount calculation unit 116 calculates a touch feature amount among touch positions (x8, y8) to (x10, y10), and the touch operation determining unit 117 compares the touch feature amount with the threshold values of each operation, using the conditional expression of each operation. As a result, the touch feature amount fails to satisfy a repeat condition for rotation operation, and thus it is confirmed that the touch position series does not indicate the rotation operation.

(16) Next, as shown by (c) in FIG. 33, the touch feature amount calculation unit 116 calculates a touch feature amount among touch positions (x8, y8) to (x11, y11), and the touch operation determining unit 117 compares the touch feature amount with the threshold values of each operation, using the conditional expression of each operation.

(17) Next, as shown by (d) in FIG. 33, the touch feature amount calculation unit 116 calculates a touch feature amount among touch positions (x8, y8) to (x12, y12), and the touch operation determining unit 117 compares the touch feature amount with the threshold values of each operation, using the conditional expression of each operation. As a result, the touch feature amount fails to satisfy a repeat condition for horizontal slide operation, and thus it is confirmed that the touch position series does not indicate the horizontal slide operation. Up to this point it is confirmed that the touch position series does not indicate none of the vertical slide operation, the horizontal slide operation, and the rotation operation, and thus the pointing operation is confirmed and outputted as the type of operation that is the recognition result. Furthermore, the touch operation recognizing unit 114 outputs (x11, y11) as a touch position at the time when the pointing operation is confirmed. The touch operation start position detecting unit 103 obtains, from the touch operation recognizing unit 114, the touch position, and updates the touch position as a new touch operation start position.

Figure 34:
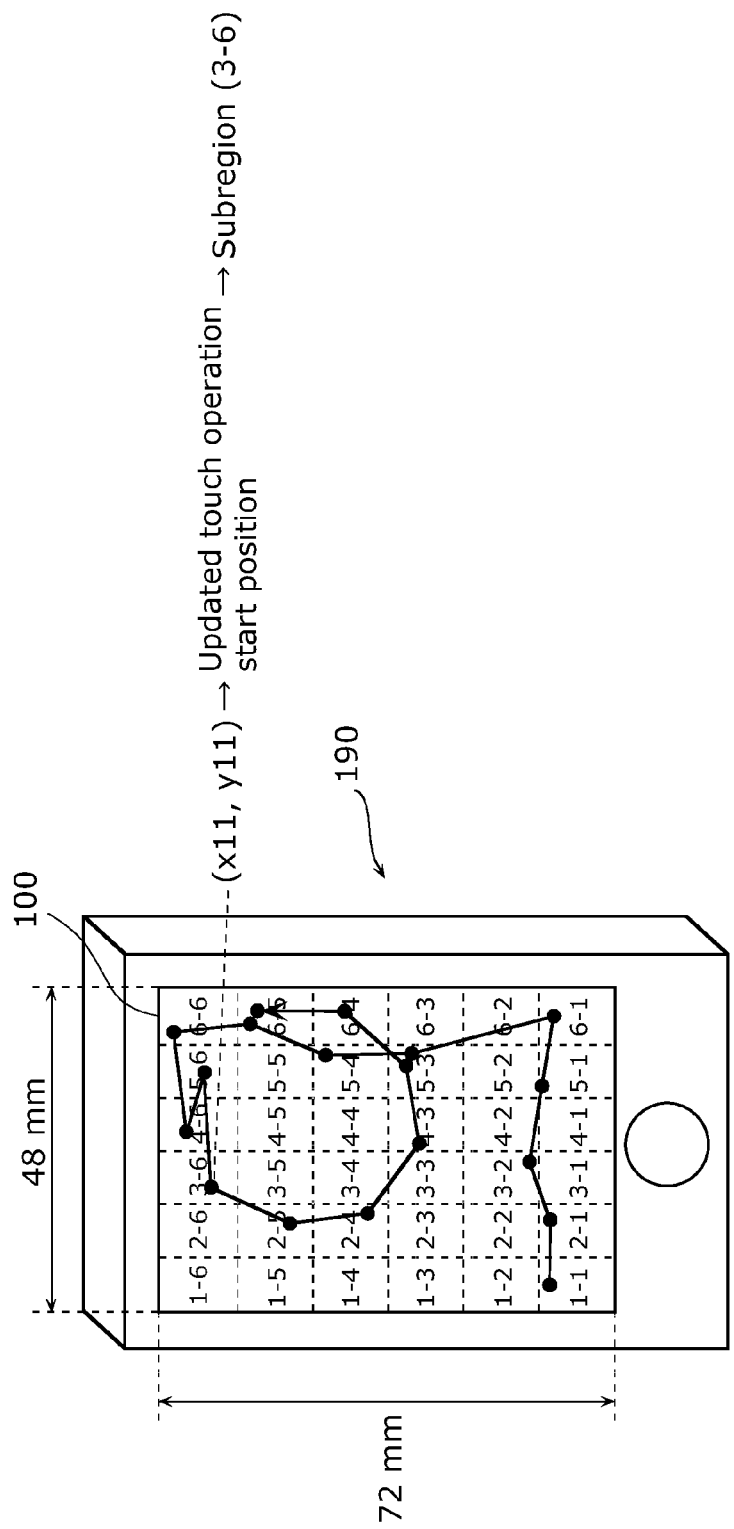
FIG. 34 is a diagram showing an example of an update of a touch operation start position according to Embodiment 2 of the present invention.

(18) Next, as shown by FIGS. 34 and 34, the touch operation determining unit 117 obtains, from the touch operation recognition condition storage unit 115, conditional expressions and threshold values as touch operation recognition conditions corresponding to (x11, y11). Moreover, the gesture operation end determining unit 119 obtains, from the gesture operation end determination condition storage unit 118, conditional expressions and threshold values as gesture operation end determination conditions corresponding to (x11, y11).

Figure 36:
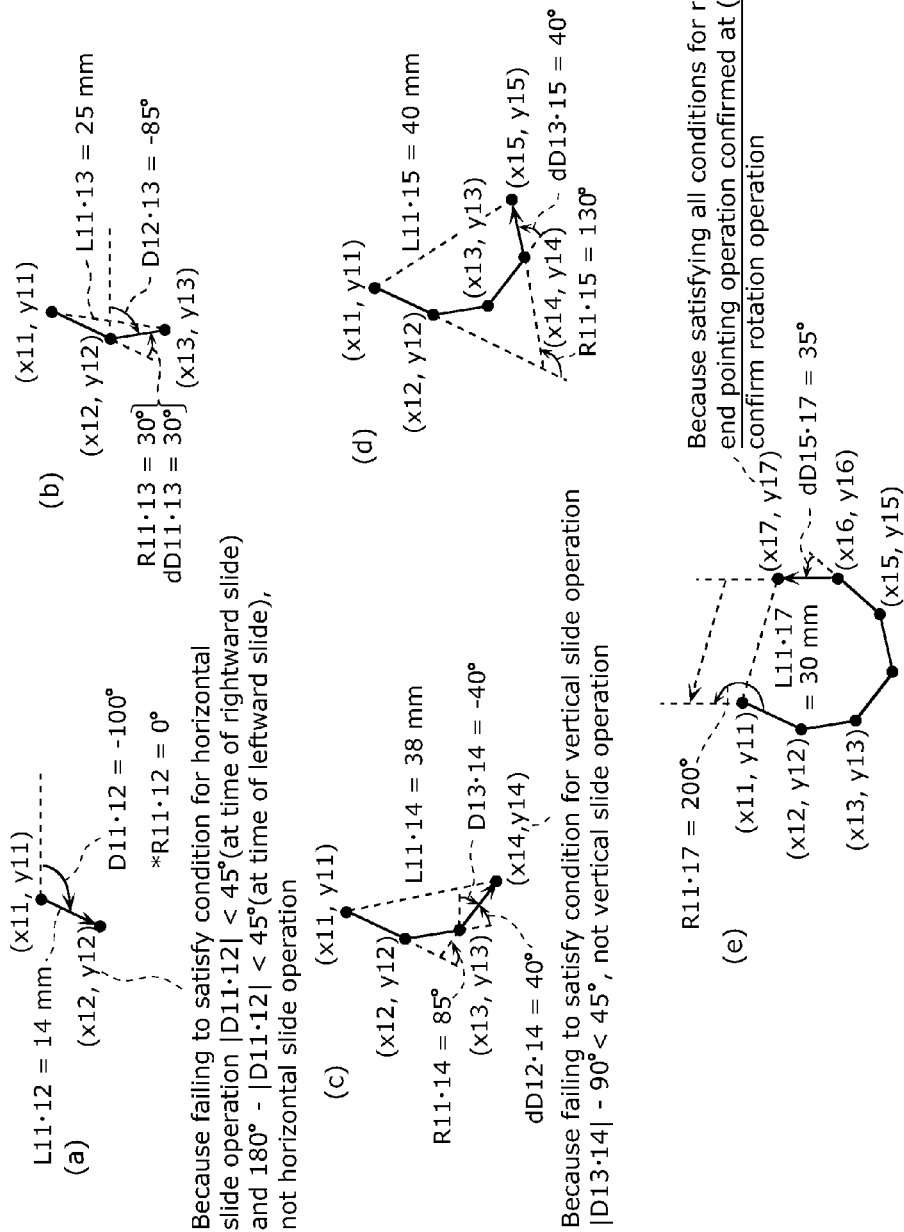
FIG. 36 is a diagram illustrating a method of recognizing a rotation operation according to Embodiment 2 of the present invention.

(19) Next, as shown by (a) in FIG. 36, the touch feature amount calculation unit 116 calculates a touch feature amount between touch positions (x11, y11) and (x12, y12), and the touch operation determining unit 117 compares the touch feature amount with the threshold values of each operation, using the conditional expression of each operation. As a result, the touch feature amount fails to satisfy a repeat condition for horizontal slide operation, and thus it is confirmed that the touch position series does not indicate the horizontal slide operation.

(20) Next, as shown by (b) in FIG. 36, the touch feature amount calculation unit 116 calculates a touch feature amount among touch positions (x11, y11) to (x13, y13), and the touch operation determining unit 117 compares the touch feature amount with the threshold values of each operation, using the conditional expression of each operation.

(21) Next, as shown by (c) in FIG. 36, the touch feature amount calculation unit 116 calculates a touch feature amount among touch positions (x11, y11) to (x14, y14), and the touch operation determining unit 117 compares the touch feature amount with the threshold values of each operation, using the conditional expression of each operation. As a result, the touch feature amount fails to satisfy a repeat condition for vertical slide operation, and thus it is confirmed that the touch position series does not indicate the vertical slide operation.

(22) Next, as shown by (d) in FIG. 36, the touch feature amount calculation unit 116 calculates a touch feature amount among touch positions (x11, y11) to (x15, y15), and the touch operation determining unit 117 compares the touch feature amount with the threshold values of each operation, using the conditional expression of each operation.

(23) The touch feature amount calculation unit 116 calculates a touch feature amount among touch positions (x11, y11) to (x16, y16), and the touch operation determining unit 117 compares the touch feature amount with the threshold values of each operation, using the conditional expression of each operation.

(24) Next, as shown by (e) in FIG. 36, the touch feature amount calculation unit 116 calculates a touch feature amount among touch positions (x11, y11) to (x17, y17), and the touch operation determining unit 117 compares the touch feature amount with the threshold values of each operation, using the conditional expression of each operation. As a result, the feature amount satisfies the recognition condition for rotation operation, and thus the touch operation recognizing unit 114 ends the pointing operation confirmed in (17) and outputs the rotation operation (leftward rotation) as the type of operation. Moreover, the touch operation recognizing unit 114 outputs, among the touch feature amounts calculated by the touch feature amount calculation unit 116, a rotation angle from the touch operation start position as an operation amount of the rotation operation.

Figure 37:
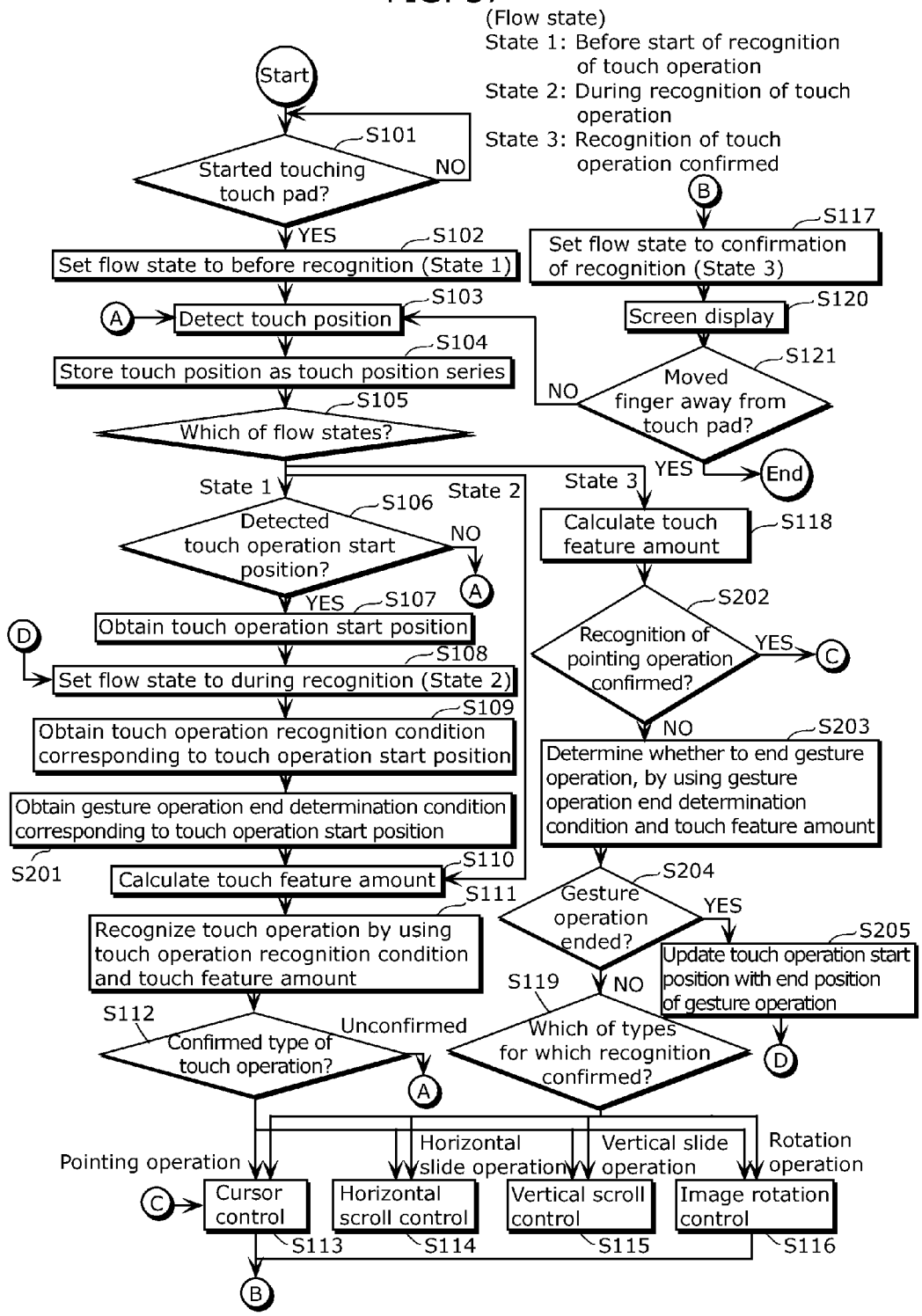
FIG. 37 is a flow chart illustrating a processing flow of the information input apparatus according to Embodiment 2 of the present invention.

FIG. 37 is a flow chart showing exemplary processing from when a touch operation is recognized after the touch pad 100 detects a touch position of the finger of the operator to when screen display is performed. The following describes S201 to S205 added to the flow chart (FIG. 21) described in Embodiment 1.

The gesture operation end determining unit 119 obtains, using a touch operation start position detected by the touch operation start position detecting unit 103, gesture operation end determination conditions corresponding to the touch operation start position (S201).

Moreover, the gesture operation end determining unit 119 determines, in the recognition confirmed state where recognition of a touch operation is confirmed, whether or not the confirmed touch operation is a gesture operation (S202). When the confirmed touch operation is the gesture operation, the gesture operation end determining unit 119 determines whether or not the gesture operation has been ended, by using the gesture operation end determination conditions obtained in S201 (S203 and S204).

When the gesture operation is already ended, the gesture end position obtaining unit 120 obtains an end position of the gesture operation, and the touch operation start position detecting unit 103 updates the touch operation start position with the end position of the gesture operation (S205).

Figure 38:
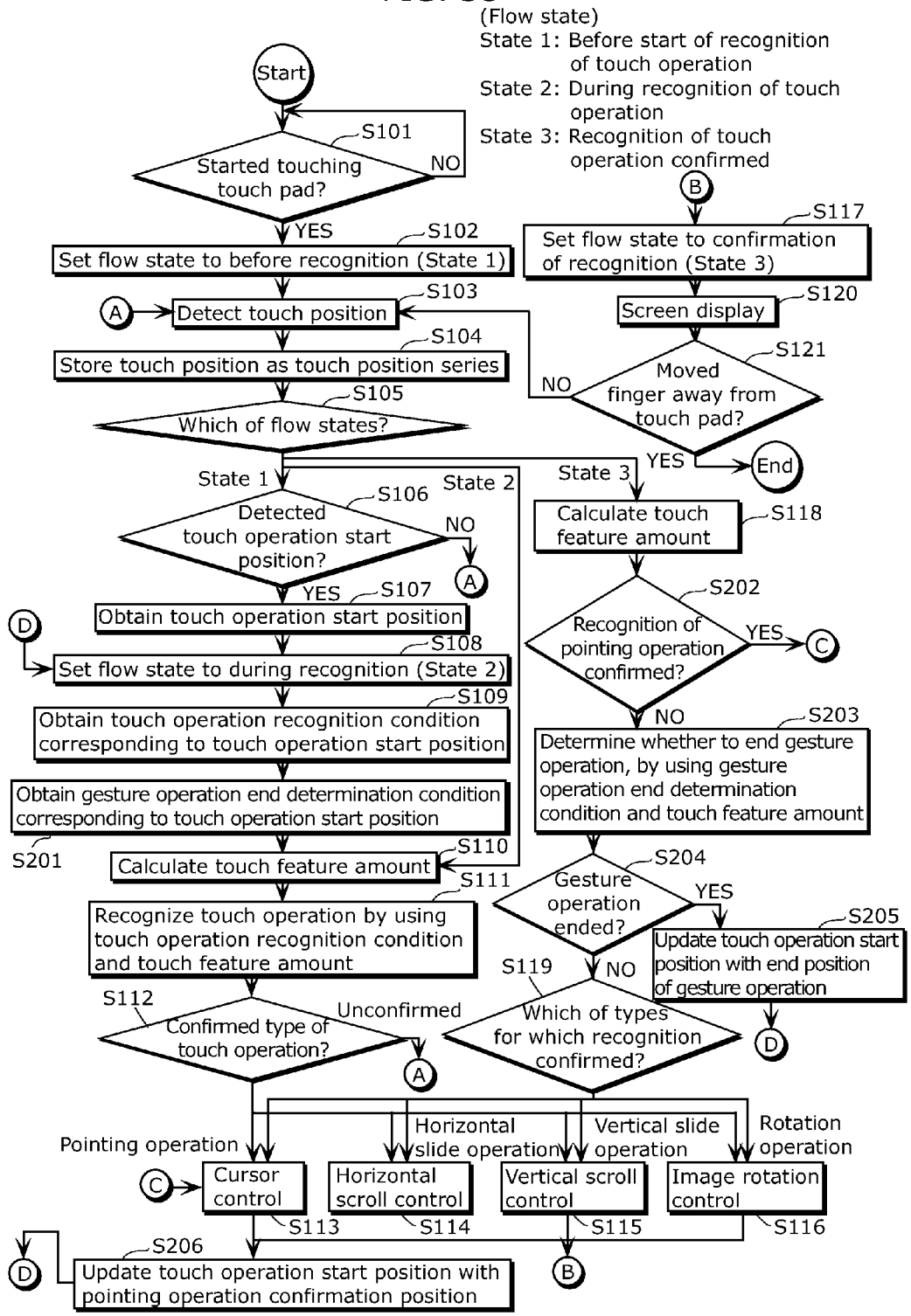
FIG. 38 is a flow chart resulting from adding a process of updating a touch operation start position through a pointing operation to the processing flow of the information input apparatus according to Embodiment 2 of the present invention.

It is to be noted that as described in (13) to (24), when the touch operation start position is updated with the touch position at the time when the pointing operation is confirmed, the flow chart is replaced with a flow chart shown by FIG. 38. When the touch operation recognizing unit 114 outputs the pointing operation as the recognition result, the touch operation recognizing unit 114 obtains a position of the pointing operation, and the touch operation start position detecting unit 103 updates the touch operation start position with the pointing operation confirmation position (S206).

According to the above configuration, it is possible to provide the information input apparatus 190 which (i) facilitates the recognition of the specific gesture operation more than that of other gesture operations, by setting, not only for the touch operation inputted first since the operator touched the touch pad 100 with the finger but also for the touch operation for continuous input by switching between a movement and a trajectory without removing the finger from touch pad 100, the touch operation recognition conditions based on a tendency of the touch operation start position of each gesture operation, which results from a shape of the housing 189 or a way the housing 189 is held, and (ii) enables the operator to perform natural and quick input.

(Embodiment 3)

Figure 39:
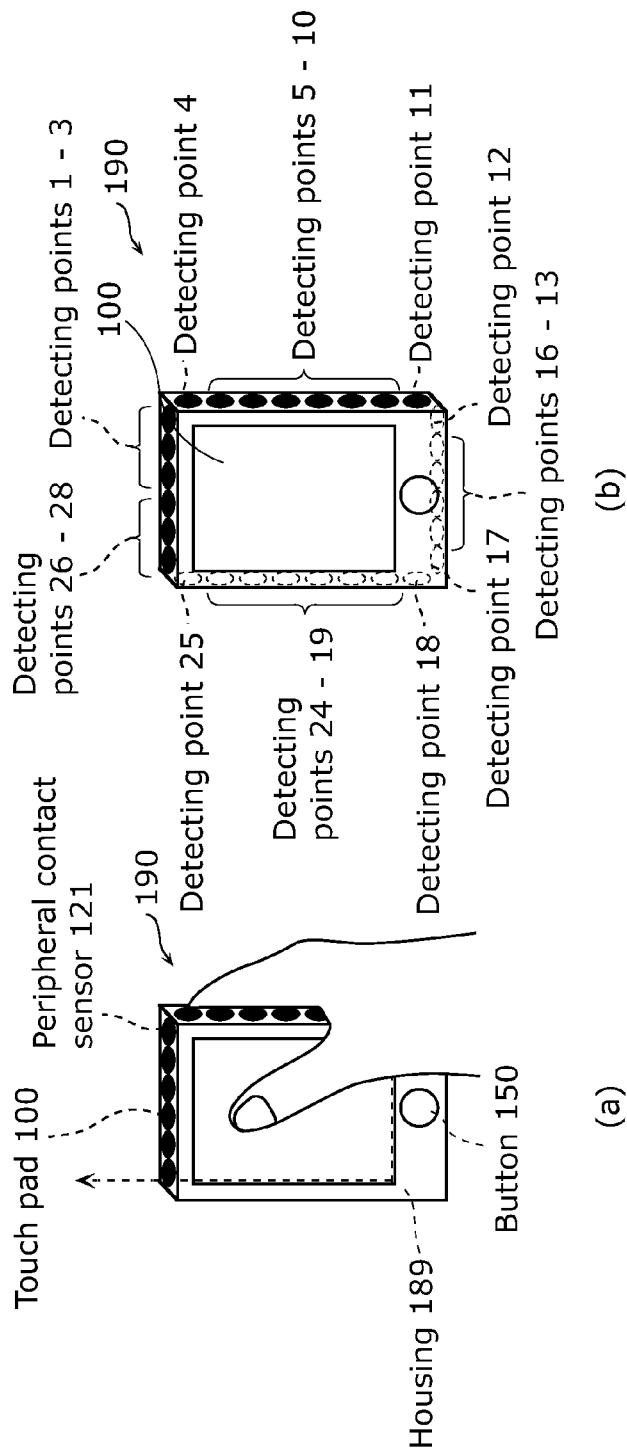
FIG. 39 is a diagram showing an exemplary appearance of the information input apparatus according to Embodiment 3 of the present invention.

FIG. 39 is a diagram showing an exemplary appearance of the information input apparatus 190 according to Embodiment 3 of the present invention.

As shown by (a) in FIG. 39, the information input apparatus 190 includes the housing 189, the capacitance touch pad 100, the operation determination button 150, and a peripheral contact sensor 121 which detects a holding hand of the operator.

The information input apparatus 190 according to this embodiment differs from the information input apparatus 190 according to Embodiment 1 in that the information input apparatus 190 detects, using the peripheral contact sensor 121, a type of holding hand which indicates whether the information input apparatus 190 is held with the right hand, the left hand, or the both hands of the operator, and performs touch operation recognition according to the holding hand.

As shown by (b) in FIG. 39, the peripheral contact sensor 121 is a sensor which has detecting points unidimensionally arranged on the outer edge of the housing 189 of the information input apparatus 190, and detects, for each detecting point, contact of the hand of the operator.

As shown by (a) in FIG. 39, when the operator holds, with the right hand, the housing 189 of the information input apparatus 190, exemplary output data of the peripheral contact sensor 121 are as shown by (c) in FIG. 39. Here, an output of each detecting point is expressed binary, that is, ON=1 or OFF=0.

Like in Embodiment 1, assuming that the information input apparatus 190 recognizes touch operations including a pointing operation for moving a cursor displayed on a screen, a vertical slide operation for tracing the touch pad 100 linearly in a vertical direction, a horizontal slide operation for tracing the touch pad 100 linearly in a horizontal direction, and a rotation operation for tracing the touch pad 100 in a circular trajectory, the following describes the information input apparatus 190.

Figure 40:
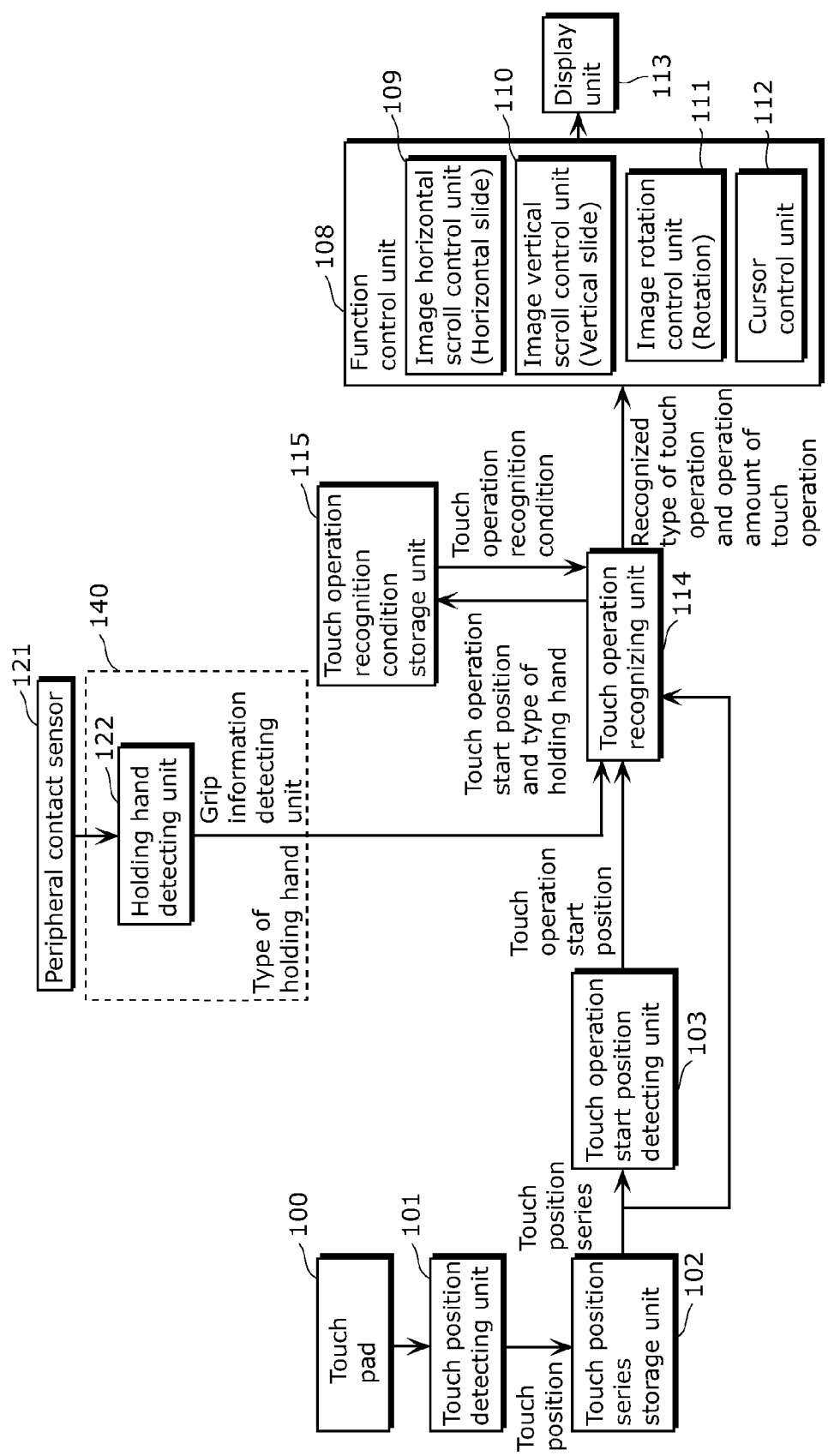
FIG. 40 is a block diagram showing a configuration of the information input apparatus according to Embodiment 3 of the present invention.

FIG. 40 is a diagram showing a configuration example of the information input apparatus 190 according to this embodiment.

The information input apparatus 190 according to this embodiment differs from the information input apparatus 190 according to Embodiment 1 (FIG. 3) in that a holding hand detecting unit 122 of a grip information detecting unit 140 detects a type of holding hand (right hand/left hand/both hands) based on a contact position of the hand around the information input apparatus 190 which is outputted by the peripheral contact sensor 121, and in that the touch operation recognition condition storage unit 115 stores touch operation recognition conditions in association with a touch operation start position and types of holding hand, and the touch operation recognizing unit 114 obtains, from the touch operation recognition condition storage unit 115, touch operation recognition conditions, using the touch operation start position detected by the touch operation start position detecting unit 103 and the type of holding hand detected by the holding hand detecting unit 122.

In other words, the information input apparatus 190 further includes the grip information detecting unit 140 which detects grip information about the operator relative to the information input apparatus 190.

Moreover, the touch operation recognition condition storage unit 115 stores touch operation recognition conditions in association with grip information and a touch operation start position.

The touch operation recognizing unit 114 recognizes a touch operation by using the touch operation recognition conditions associated with the grip information and the touch operation start position, to determine a type of touch operation performed by the operator.

It is to be noted that the grip information is, for example, at least one of a type of holding hand used by the operator holding the information input apparatus 190, a grip position at which the operator grips the information input apparatus 190, a direction angle of the information input apparatus 190 with respect to a hand used by the operator gripping the information input apparatus 190, and a length of a finger used by the operator for a touch operation.

More specifically, the information input apparatus 190 further includes a peripheral contact sensor which is provided to at least part of the housing of the information input apparatus 190 and detects, for the information input apparatus 190, a contact position of at least one of the hand and the finger of the operator.

The grip information detecting unit 140 detects, as grip information, a type of holding hand used by the operator holding the information input apparatus 190, using the contact position detected by the peripheral contact sensor.

The touch operation recognition condition storage unit 115 stores detected types of holding hand in association with respective touch operation recognition conditions.

The touch operation recognizing unit 114 determines a type of touch operation using the touch operation recognition conditions obtained from the touch operation recognition condition storage unit 115.

The following mainly describes in detail the touch operation recognition condition storage unit 115, the touch operation recognizing unit 114, the peripheral contact sensor 121, and the holding hand detecting unit 122 in this embodiment.

FIG. 40 is a diagram showing a configuration of the information input apparatus 190 according to this embodiment. It is to be noted that the same numeral signs are assigned to the same elements as in Embodiment 1, and descriptions thereof are omitted.

The grip information detecting unit 140 detects grip information about the operator relative to the information input apparatus 190.

In more detail, the grip information detecting unit 140 includes the holding hand detecting unit 122.

The holding hand detecting unit 122 detects, using the outputs of the peripheral contact sensor 121, whether the operator holds the housing 189 of the information input apparatus 190 with the right hand, the left hand, or the both hands. For instance, when at least one of the detecting points 4 to 11 of the peripheral contact sensor 121 indicates ON and all of the detecting points 18 to 25 of the same indicate OFF, it is determined that the holding hand is the right hand ((a) in FIG. 41).

Figure 41:
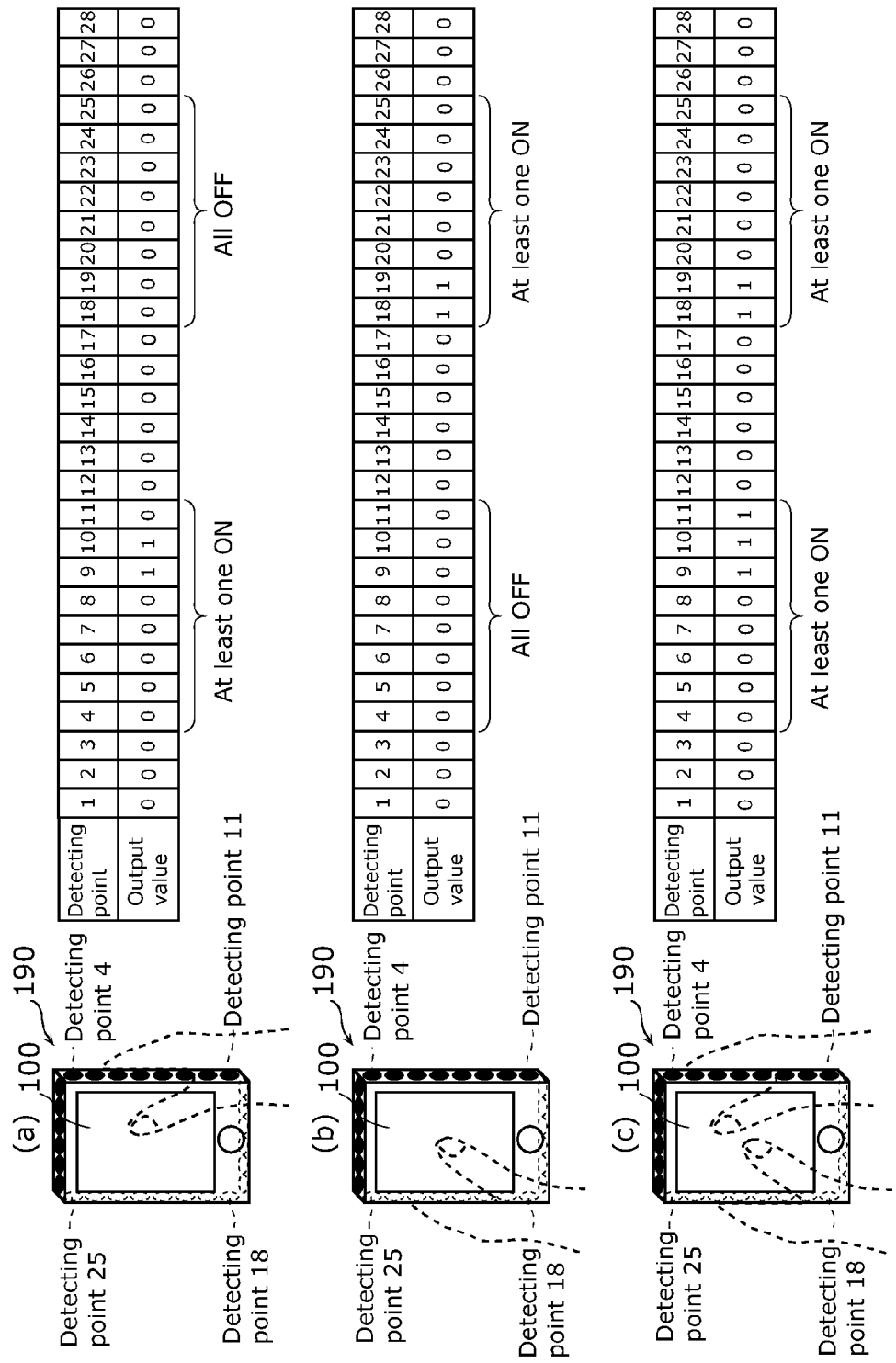
FIG. 41 is a diagram showing types of holding hand according to Embodiment 3 of the present invention.

Similarly, when at lease one of the detecting points 18 to 25 indicates ON and all of the detecting points 4 to 11 indicate OFF, it is determined that the holding hand is the left hand ((b) in FIG. 41), and when at least one of the detecting points 4 to 11 and at least one of the detecting points 18 to 25 indicate ON, it is determined that the holding hand is the both hands ((c) in FIG. 41). Then, the type of holding hand indicating the right hand, the left hand, or the both hands is outputted.

The touch operation recognition condition storage unit 115 stores, for each subregion set on the touch pad 100, a touch movement distance threshold value, a touch movement direction threshold value, and a touch rotation angle threshold value that are obtained from a touch position series, as recognition conditions for recognizing a touch operation.

The touch operation recognition condition storage unit 115 further stores, for each subregion, right hand threshold values, left hand threshold values, and both hands threshold values.

Furthermore, examples of threshold values stored for each type of holding hand (right hand/left hand/both hands) include a vertical slide recognition threshold value, a horizontal slide recognition threshold value, and a rotation recognition threshold value.

FIG. 42 shows an exemplary structure of data stored in the touch operation recognition condition storage unit 115. It is to be noted that subregions assumed in FIG. 42 are the same as the subregions of Embodiment 1 which are shown by FIG. 6.

As in Embodiment 1, the vertical slide operation recognition threshold values are the movement distance threshold value Lvs to be compared with the distance Lsn between the touch operation start position (xs, ys) and the last touch position (xn, yn) in the touch position series, and the movement direction threshold value Dvs to be compared with the movement direction $D(i-1) \cdot i$ of the two consecutive positions ($x(i-1)$, $y(i-1)$) and ($xi$, $yi$) in the touch position series [i=s+any one of 1 to n].

These threshold values are stored for each of the 36 subregions (1-1) to (6-6) and each of types of holding hand respectively indicating the right hand, the left hand, and the both hands.

As in Embodiment 1, the horizontal slide operation recognition threshold values are the movement distance threshold value Lhs to be compared with the distance Lsn between the touch operation start position (xs, ys) and the last touch position (xn, yn) in the touch position series, and the movement direction threshold value Dhs to be compared with the movement direction $D(i-1) \cdot i$ of the two consecutive positions ($x(i-1)$, $y(i-1)$) and ($xi$, $yi$) in the touch position series [i=s+any one of 1 to n]. These threshold values are stored for each of the 36 subregions (1-1) to (6-6) and each of types of holding hand respectively indicating the right hand, the left hand, and the both hands.

As in Embodiment 1, the rotation operation recognition threshold values are (i) the movement distance threshold value Lr to be compared with the distance Lsn between the touch operation start position (xs, ys) and the last touch position (xn, yn) in the touch position series, (ii) the movement direction difference threshold value dDr to be compared with the difference $dD(i-2) \cdot i$ between the movement direction $D(i-2) \cdot (i-1)$ from ($x(i-2)$, $y(i-2)$) to ($x(i-1)$, $y(i-1)$) and the movement direction $D(i-1) \cdot i$ from ($x(i-1)$, $y(i-1)$) to ($xi$, $yi$), among the three consecutive positions ($x(i-2)$, $y(i-2)$), ($x(i-1)$, $y(i-1)$), and ($xi$, $yi$) [i=s+any one of 2 to n], and (iii) the rotation angle threshold Rr to be compared with the rotation angle Rsn between the touch operation start position (xs, ys) and the last touch position (xn, yn) in the touch position series.

These threshold values are stored for each of the 36 subregions (1-1) to (6-6) and each of types of holding hand respectively indicating the right hand, the left hand, and the both hands.

(R) (m-n): (threshold value 1, threshold value 2, . . . ) shown by FIG. 42 indicates a threshold value associated with a subregion (m-n) when the holding hand is the right hand. Likewise, (L) (m-n): (threshold value 1, threshold value 2, . . . ) indicates a threshold value associated with a subregion (m-n) when the holding hand is the left hand, and (LR) (m-n): (threshold value 1, threshold value 2, . . . ) indicates a threshold value associated with a subregion (m-n) when the holding hand is the both hands.

As in Embodiment 1, conditional expressions for use in comparison with the threshold values shown by FIG. 42 are common conditional expressions regardless of the subregions and the types of holding hand. It is to be noted that not only the threshold values but also the conditional expressions may differ for each subregion or each type of holding hand.

The touch operation recognizing unit 114 obtains the touch operation start position (xs, ys) and the type of holding hand from the touch operation start position detecting unit 103 and the holding hand detecting unit 122, respectively, and reads and obtains, from the touch operation recognition condition storage unit 115, recognition threshold values and conditional expressions corresponding to the type of holding hand among right hand/left hand/both hands recognition threshold values and recognition conditions corresponding to a subregion (M-N) including (xs, ys).

Processing in which a touch feature amount is calculated based on the touch position series and the touch feature amount is compared with the obtained recognition threshold values using the obtained conditional expression is the same as in Embodiment 1, and a description thereof is omitted.

Figure 43A:
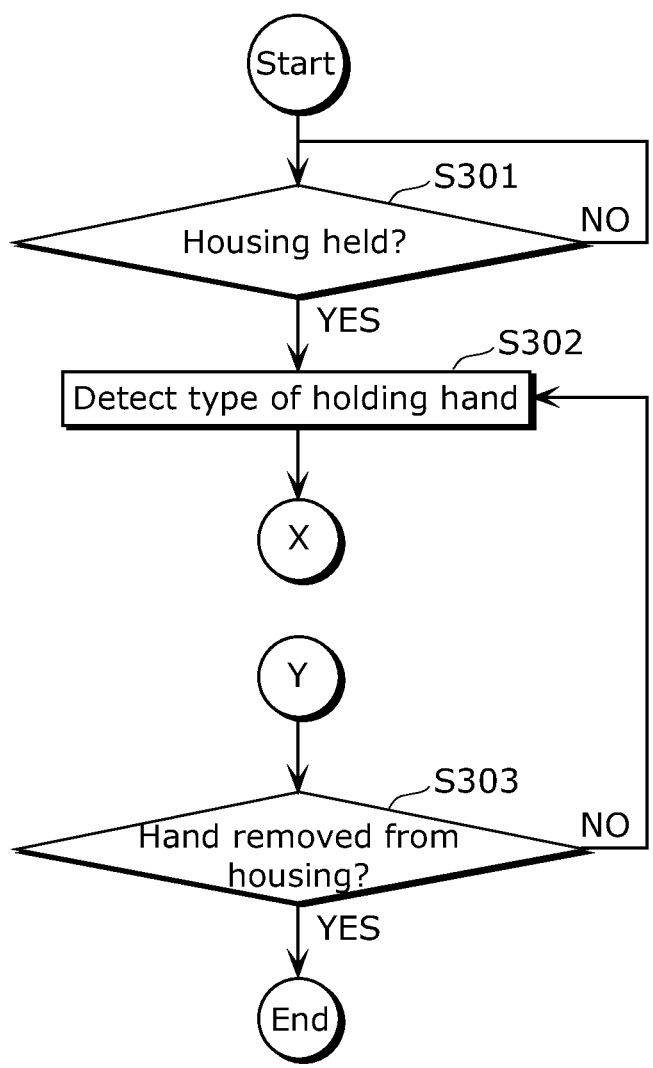
FIG. 43A is a first flow chart illustrating a processing flow of the information input apparatus according to Embodiment 3 of the present invention.

Each of FIGS. 43A and 43B is a flow chart showing a processing flow from when the operator holds the housing 189 of the information input apparatus 190, touches the touch pad 100 with the finger, and performs a touch operation to when the operator removes the hand from the housing 189, according to this embodiment. The following describes S301 to S304 added to the flow chart (FIG. 21) described in Embodiment 1, with reference to FIGS. 43A and 43B.

It is determined whether or not the operator holds the housing 189, depending on whether or not outputs are received from the peripheral contact sensor 121 (S301 in FIG. 43A). When the peripheral contact sensor 121 starts to send the outputs, the holding hand detecting unit 122 detects whether the holding hand is the right hand, the left hand, or the both hands (S302). The touch operation recognizing unit 114 obtains, from the touch operation recognition condition storage unit 115, conditional expressions and recognition threshold values as recognition conditions, using the detected type of holding hand and the touch operation start position (S304 in FIG. 43B). The process is repeated by detecting and updating a type of holding hand until the operator removes the hand from the housing 189 (S303).

It is to be noted that the touch operation recognition condition storage unit 115 included in the information input apparatus 190 according to this embodiment stores, for each subregion set on the touchpad 100, the conditional expressions and the recognition threshold values for recognizing the touch operations, and the right hand threshold values, the left hand threshold values, and the both hands threshold values as the threshold values for each subregion.

However, the touch operation recognition condition storage unit 115 may store, for each subregion, only the right hand threshold values (or the left hand threshold values), and the touch operation recognizing unit 114 may generate the left hand threshold values (or the right hand threshold values) and the both hands threshold values from the right hand threshold values (or the left hand threshold values).

Figure 44:
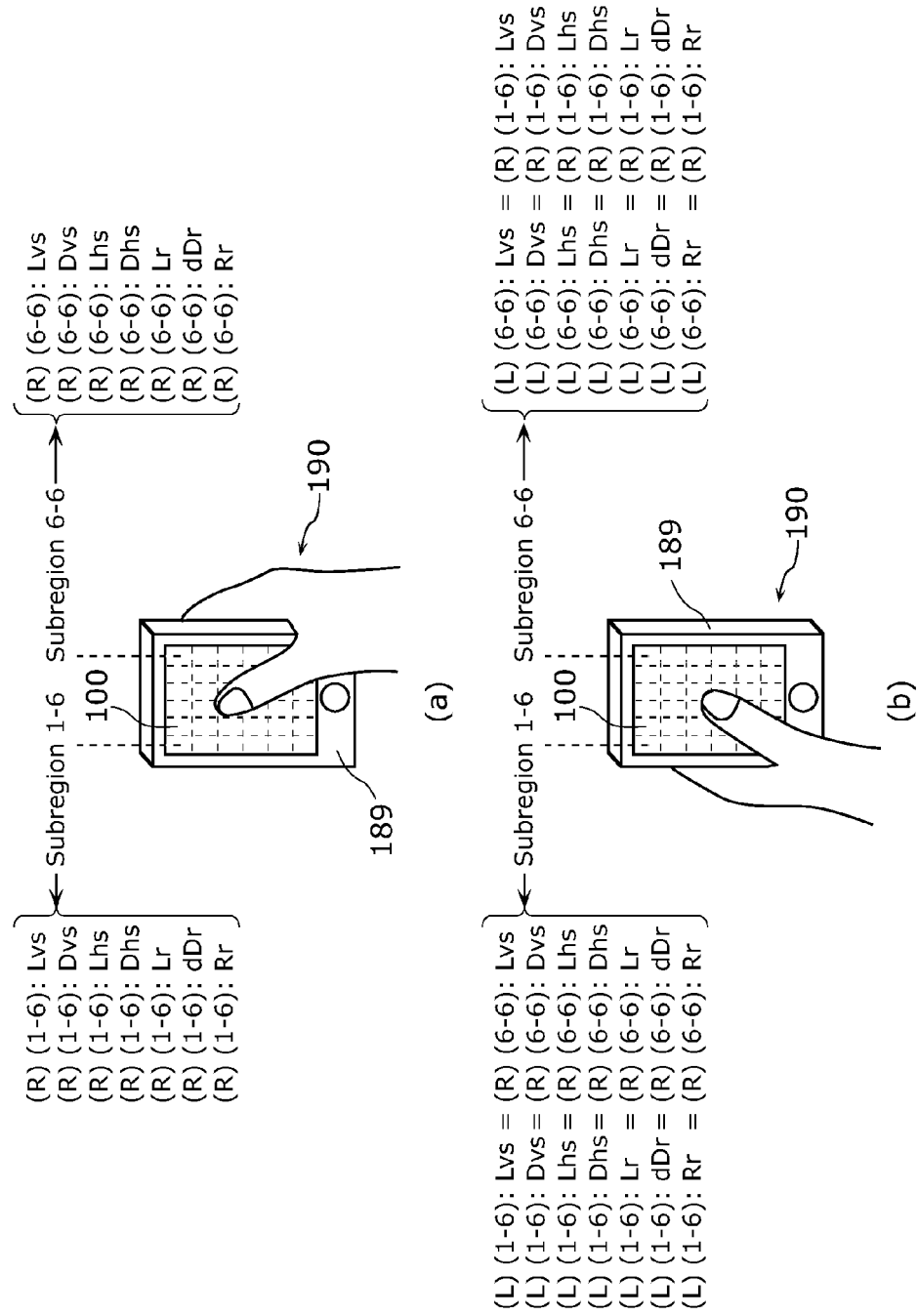
FIG. 44 is a diagram showing a method of determining a threshold value for recognition according to Embodiment 3 of the present invention.
Figure 46:
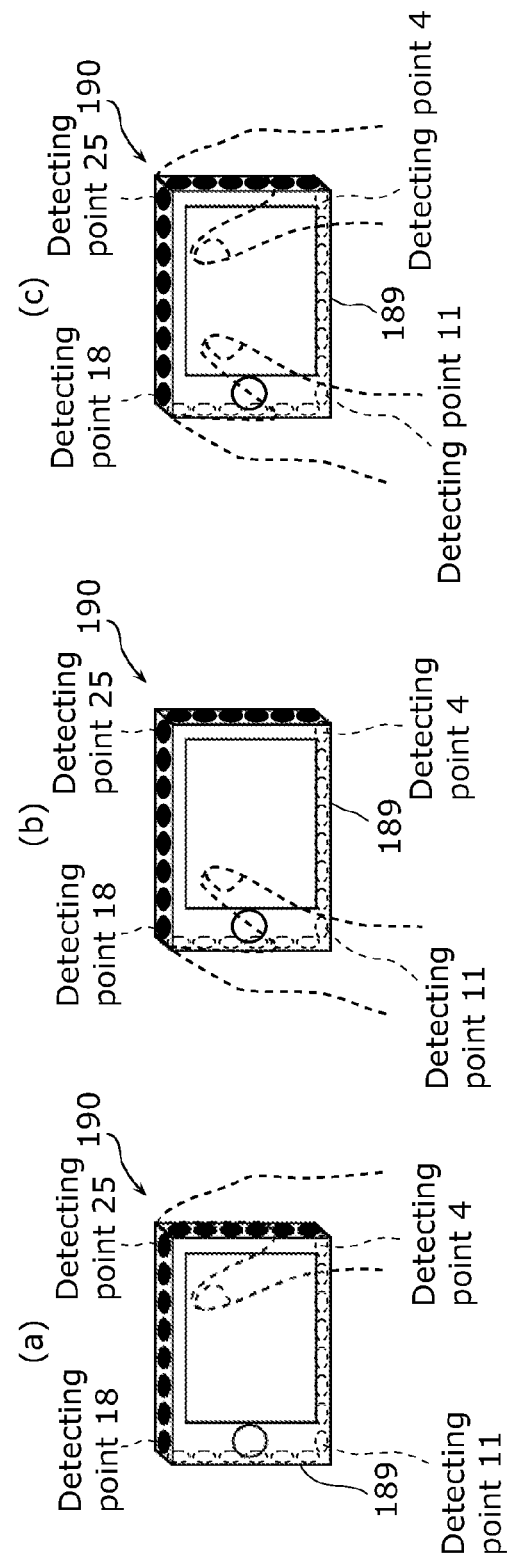
FIG. 46 is a diagram showing types of holding hand according to Embodiment 3 of the present invention.

For instance, as shown by FIG. 44, when the holding hand is the right hand, right hand threshold values (R) (1-6): Lvs, (R) (1-6): Dvs, (R) (1-6): Lhs, (R) (1-6): Dhs, (R) (1-6): Lr, (R) (1-6): dDr, and (R) (1-6): Rr are used as threshold values of the subregion (1-6), and likewise the right hand threshold values (R) (6-6): Lvs, (R) (6-6): Dvs, (R) (6-6): Lhs, (R) (6-6): Dhs, (R) (6-6): Lr, (R) (6-6): dDr, and (R) (6-6): Rr are used as threshold values of the subregion (6-6) ((a) in FIG. 44).

When the holding hand is the left hand, the right hand threshold values are horizontally reversed to be used as left hand threshold values. For example, (R) (1-6): Lvs, (R) (1-6): Dvs, (R) (1-6): Lhs, (R) (1-6): Dhs, (R) (1-6): Lr, (R) (1-6): dDr, and (R) (1-6): Rr are used as left hand threshold values of the subregion (1-6), and likewise the threshold values (R) (6-6): Lvs, (R) (6-6): Dvs, (R) (6-6): Lhs, (R) (6-6): Dhs, (R) (6-6): Lr, (R) (6-6): dDr, and (R) (6-6): Rr are used as left hand threshold values of the subregion (6-6) ((b) in FIG. 44).

Similarly, when the holding hand is the left hand, the right hand threshold values of the subregions (5-6), (4-6), (3-6), and (2-6) are respectively used as the left hand threshold values of the subregions (2-6), (3-6), (4-6), and (5-6). The same may apply to the subregions (1-1) to (6-1), (1-2) to (6-2), (1-3) to (6-3), (1-4) to (6-4), and (1-5) to (6-5).

Moreover, as shown by FIG. 45, both hands threshold values may be generated using the right hand threshold values. For instance, as shown by (a) in FIG. 45, the right hand threshold values (R) (2-6), (R) (4-6), and (R) (6-6) are extracted from the right hand threshold values stored for the subregions, and the right hand threshold values of the subregions (6-6), (4-6), (2-6), (2-6), and (4-6) are respectively used as both hands threshold values of the subregions (1-6), (2-6), (3-6), (4-6), and (5-6).

Such a configuration produces an advantageous effect that a memory area to be used is reduced, because the touch operation recognition condition storage unit 115 stores, for each subregion, only the right hand threshold values (or the left hand threshold values).

It is to be noted that although, as shown by FIG. 41, the information input apparatus 190 that is rectangular parallelepiped determines the type of holding hand (the right hand, the left hand, or the both hands) at the time when the information input apparatus 190 is held vertically (with the finger touching a long side of the information input apparatus 190) in this embodiment, the way of holding the information input apparatus 190 is not limited to this. The information input apparatus 190 may determine the right hand, the left hand, or the both hands as the type of holding hand at the time when the information input apparatus 190 is held horizontally (with the hand touching the long side of the information input apparatus 190).

In this way, in the case where the information input apparatus 190 is held vertically when the information input apparatus 190 is operated with the right hand or the left hand, and the information input apparatus 190 is held horizontally when the information input apparatus 190 is operated with the both hands, it is possible to determine the type of holding hand indicating the right hand, the left hand, or the both hands.

According to the above configuration, it is possible to provide the information input apparatus 190 which (i) allows the input of the gesture operations even when the operation is started at any position on the touch pad 100, (ii) facilitates the recognition of the specific gesture operation more than that of other gesture operations according to the type of holding hand with which the operator holds the information input apparatus 190, and (iii) enables the operator to perform natural and quick input.

(Embodiment 4)

Figure 47:
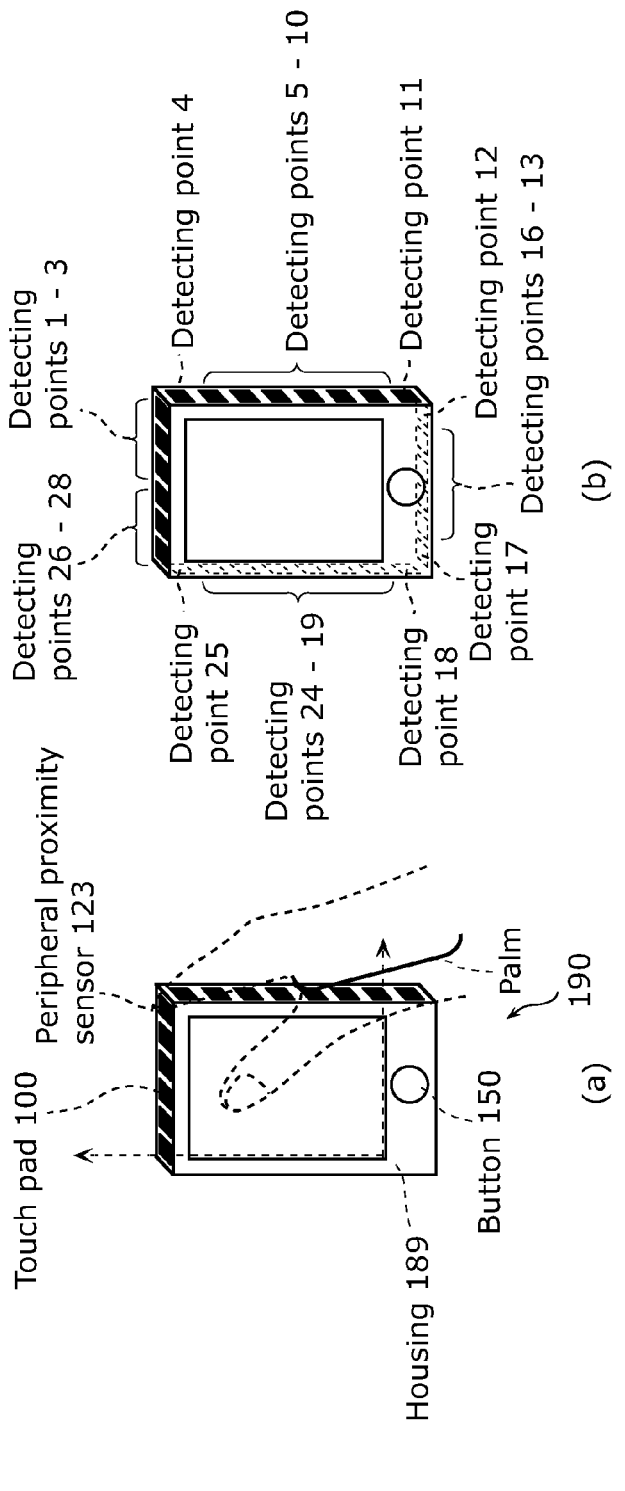
FIG. 47 is a diagram showing an exemplary appearance of the information input apparatus according to Embodiment 4 of the present invention.

FIG. 47 is a diagram showing an exemplary appearance of the information input apparatus 190 according to Embodiment 4 of the present invention.

The information input apparatus 190 includes the housing 189, the capacitance touch pad 100, the operation determination button 150, and a peripheral contact sensor 123 which detects a distance between the peripheral contact sensor 123 and the hand of the operator.

The peripheral contact sensor 123 is a sensor which has detecting points unidimensionally arranged on the outer edge of the housing 189 of the information input apparatus 190, and detects, for each detecting point, a distance between the detecting point and the hand of the operator.

When, as shown by (a) in FIG. 47, the operator holds, with the right hand, the housing 189 of the information input apparatus 190 and the right hand palm slantingly contacts with respect to the right lateral of the housing 189, examples of output data of the peripheral proximity sensor 123 are as shown by (c) in FIG. 47.

An output of each detecting point indicates a distance between the detecting point and the hand (a distance between the detecting point and a portion of the hand on the detecting point in a direction perpendicular to the surface on which the peripheral proximity sensor 123 is provided). When the detecting point detects the contact of the finger, the detecting point outputs 0, and when the detecting point does not detect the contact of the hand, the detecting point outputs −1.

The information input apparatus 190 according to this embodiment differs from the information apparatus 190 according to Embodiment 3 in (i) detecting, by using the peripheral proximity sensor 123, a grip position indicating at which position the information input apparatus 190 is held, a tilt (direction angle) of a holding hand relative to the information input apparatus 190, and a length of the finger used for operating the touch pad 100 (finger length) and (ii) performing touch operation recognition according to the grip position, the direction angle, and the finger length.

In other words, the information input apparatus 190 further includes the peripheral proximity sensor which is provided to at least part of the housing of the information input apparatus 190 and detects a proximity state of at least one of the hand or the finger of the operator relative to the information input apparatus 190.

Moreover, the touch operation recognition condition storage unit 115 stores touch operation recognition conditions in association with each of the subregions defined on the operation surface of the touch sensor.

The grip information detecting unit 140 detects, using the proximity state detected by the peripheral proximity sensor, at least one of the grip position at which the operator is gripping the information input apparatus 190, the direction angle at which the operator is gripping the information input apparatus 190 with the hand, and the length of the finger used by the operator for a touch operation.

The touch operation recognizing unit 114 calculates a difference between a predetermined reference grip state and the at least one of the detected grip position, direction angle, and length of the finger, and adjusts a touch operation start position so that the difference is reduced.

Moreover, the touch operation recognizing unit 114 recognizes a touch operation by using the touch operation recognition conditions stored in association with, among the subregions, a subregion including the adjusted touch operation start position.

Furthermore, the touch operation recognizing unit 114 calculates a difference between detected grip information and a reference grip state determined in association with detected type of holding hand and type of grip information, adjusts a touch position so that the difference is reduced, determines the touch operation performed by the operator, based on the adjusted touch position, and outputs an operation amount indicating a magnitude of the touch operation.

It is to be noted that possible examples of the reference grip state include a reference position, a reference angle, and a reference finger length.

As shown by (a) in FIG. 49 to be described later, the reference position is a reference position, on the housing 189, of the upper end of the hand, the finger, or the like used for gripping the information input apparatus 190.

As shown by (a) in FIG. 52 to be described later, the reference angle is a reference angle between a gripped lateral of the housing 189 and the palm of the holding hand.

The reference finger length is a reference finger length of the finger used by the operator of the information input apparatus 190 for operating the touch pad 100.

The following describes in more detail the above process. It is to be noted that, like in Embodiment 1, assuming that the information input apparatus 190 recognizes touch operations including a pointing operation for moving a cursor displayed on a screen, a vertical slide operation for tracing the touch pad 100 linearly in a vertical direction, a horizontal slide operation for tracing the touch pad 100 linearly in a horizontal direction, and a rotation operation for tracing the touch pad 100 in a circular trajectory, the following describes the information input apparatus 190.

Figure 48:
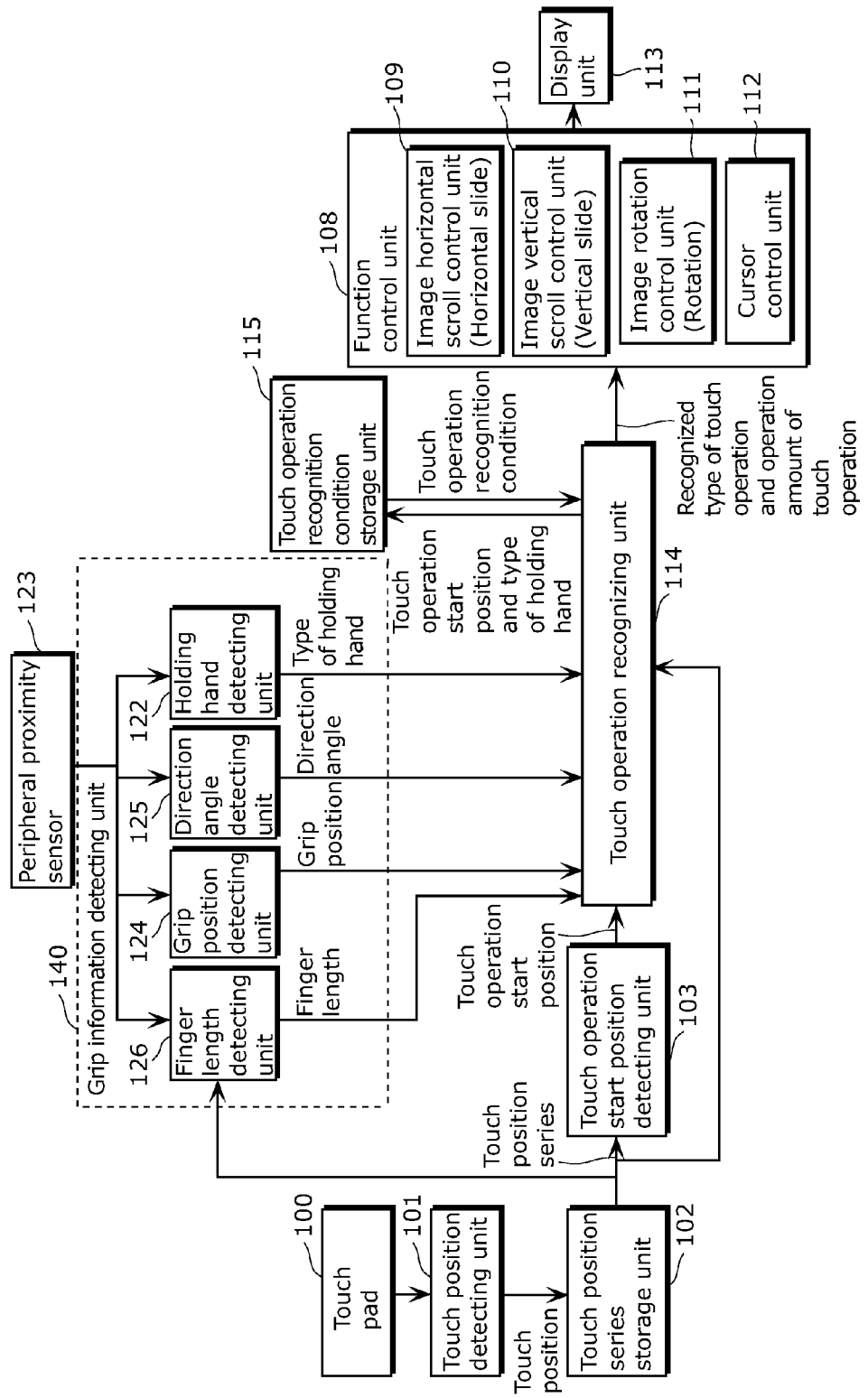
FIG. 48 is a block diagram showing a configuration of the information input apparatus according to Embodiment 4 of the present invention.

FIG. 48 is a diagram showing a configuration example of the information input apparatus 190 according to this embodiment. The information input apparatus 190 according to this embodiment differs from the information input apparatus 190 (FIG. 40) according to Embodiment 3 in that the grip information detecting unit 140 further includes a grip position detecting unit 124, a direction angle detecting unit 125, and a finger length detecting unit 126.

In more detail, based on a contact position of the hand at the periphery of the information input apparatus 190 which is outputted by the peripheral proximity sensor 123, the grip position detecting unit 124 detects a grip position of the holding hand relative to the housing 189, the direction angle detecting unit 125 detects a tilt of the holding hand (a direction angle) with respect to the housing 189, and the finger length detecting unit 126 detects a length of the finger used for operating the touch pad 100.

Moreover, the information input apparatus 190 according to this embodiment differs from the information input apparatus 190 according to Embodiment 3 in that the touch operation recognizing unit 114 obtains, from the touch operation recognition condition storage unit 115, touch operation recognition conditions, based on the touch operation start position detected by the touch operation start position detecting unit 103, the grip position detected by the grip position detecting unit 124, the direction angle detected by the direction angle detecting unit 125, and the length of the finger detected by the finger length detecting unit 126.

This embodiment mainly describes the grip position detecting unit 124, the direction angle detecting unit 125, the finger length detecting unit 126, and the touch operation recognizing unit 114. The same reference signs are assigned to the same elements as in Embodiment 3, and descriptions thereof are omitted.

The following describes, among the blocks shown by FIG. 48, functions different from the functions in Embodiment 3.

The grip position detecting unit 124 detects a position at which the operator holds the housing 189 of the information input apparatus 190, using outputs of the peripheral proximity sensor 123.

Figure 49:
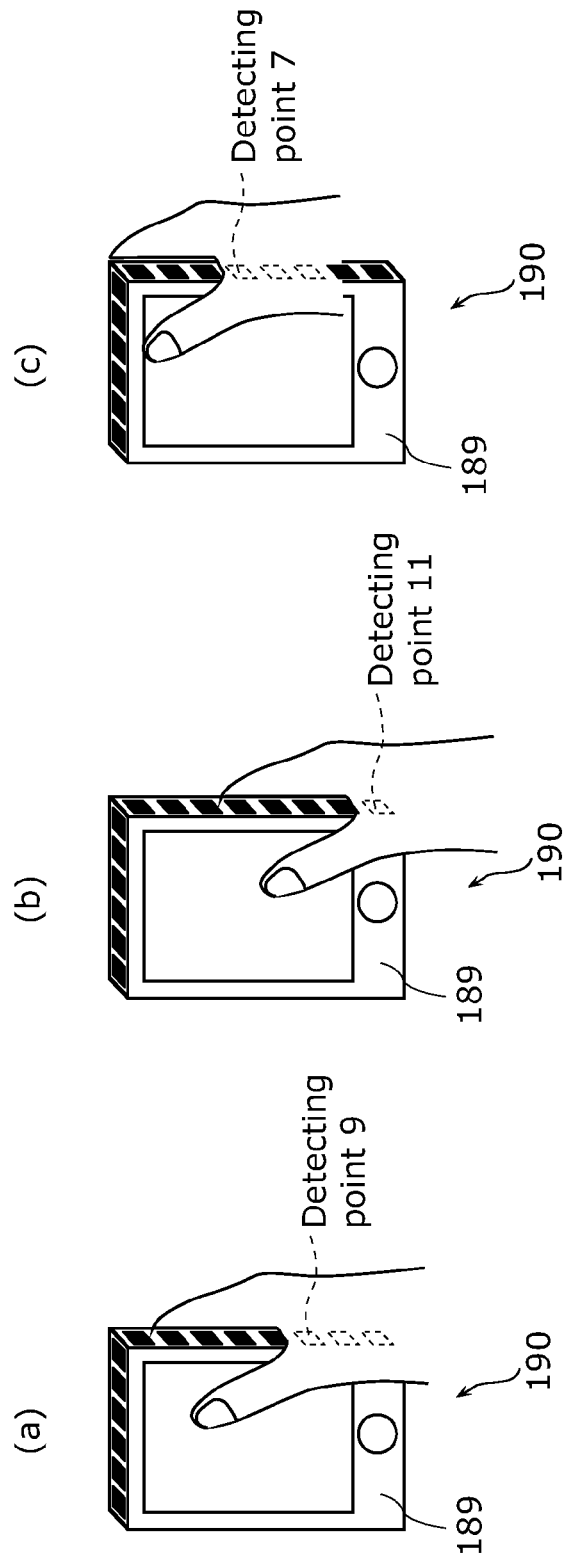
FIG. 49 is a diagram showing examples of grip positions of a holding hand according to Embodiment 4 of the present invention.
Figure 50:
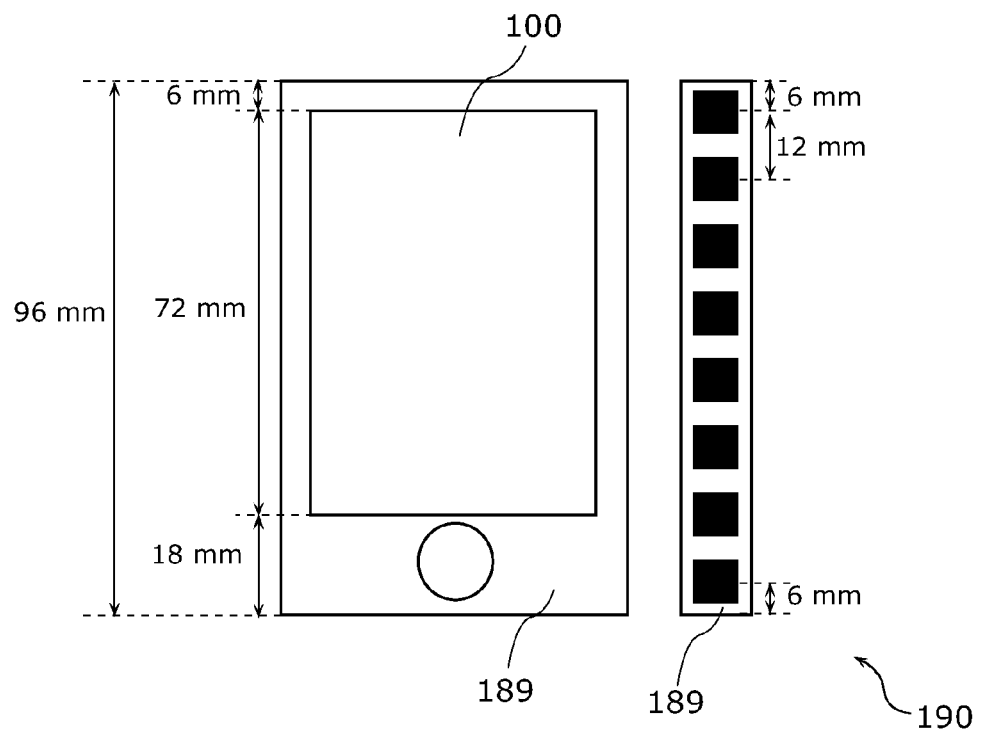
FIG. 50 is a diagram showing an exemplary arrangement of a touch pad and a peripheral proximity sensor according to Embodiment 4 of the present invention.

For instance, assuming that a detecting point 9 that is the top detecting point among the detecting points of the peripheral proximity sensor 123 each of which detected a distance between the detecting point and the hand is a reference position of the holding hand ((a) in FIG. 49), it is possible to obtain a position of the holding hand in a long side direction of the housing 189 based on placement spacing of the detecting points shown by FIG. 50.

As shown by (b) in FIG. 49, when a top detecting point which detected a distance between the top detecting point and the hand is a detecting point 11, the operator grips the information input apparatus 190 at a position below the reference position of the holding hand by 24 mm.

Moreover, as shown by (c) in FIG. 49, when a top detecting point which detected a distance between the top detecting point and the hand is a detecting point 7, the operator grips the information input apparatus 190 at a position above the reference position of the holding hand by 24 mm.

The touch operation recognizing unit 114 adjusts the touch operation start position using the grip position of the holding hand detected by the grip position detecting unit 124 (i.e., a displacement from the reference position), and obtains, from the touch operation recognition condition storage unit 115, the touch operation recognition conditions based on the adjusted touch operation start position.

Figure 51:
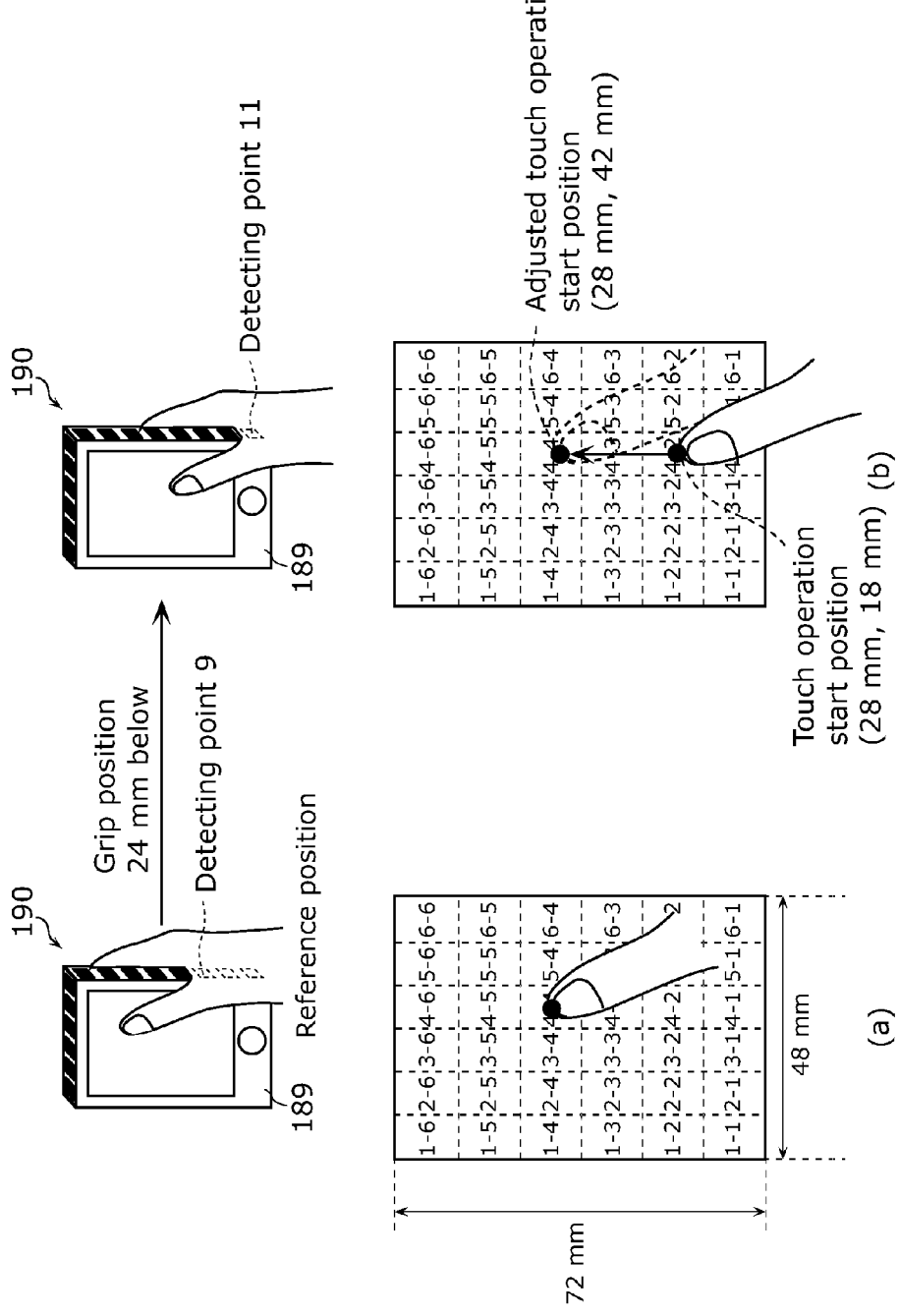
FIG. 51 is a diagram illustrating a method of adjusting a touch operation start position based on a grip position according to Embodiment 4 of the present invention.

For example, when the operator holds the information input apparatus 190 at a position below the reference position of the holding hand by 24 mm and a touch operation start position has coordinates (28 mm, 18 mm), although recognition conditions corresponding to a subregion (4-2) including the coordinates (28 mm, 18 mm) should be obtained, as shown by (b) in FIG. 51, the touch operation start position is adjusted upward by 24 mm so as to have coordinates (28 mm, 42 mm), and recognition conditions corresponding to a subregion (4-4) including the coordinates (28 mm, 42 mm) are obtained.

By including such a grip position detecting unit 124, the information input apparatus 190 is capable of regarding that the position of the holding hand of the operator is fixed to the reference position. To put it differently, even when the operator displaces the hand used for holding the housing 189, the information input apparatus 190 allows the operator to perform a touch operation, without causing the operator to change the manner of holding the housing 189 or changing the association between the subregions and the recognition conditions stored in the touch operation recognition condition storage unit 115.

The direction angle detecting unit 125 detects the tilt (direction angle) of the holding hand of the operator with respect to the housing 189 of the information input apparatus 190, using the outputs of the peripheral proximity sensor 123.

Figure 52:
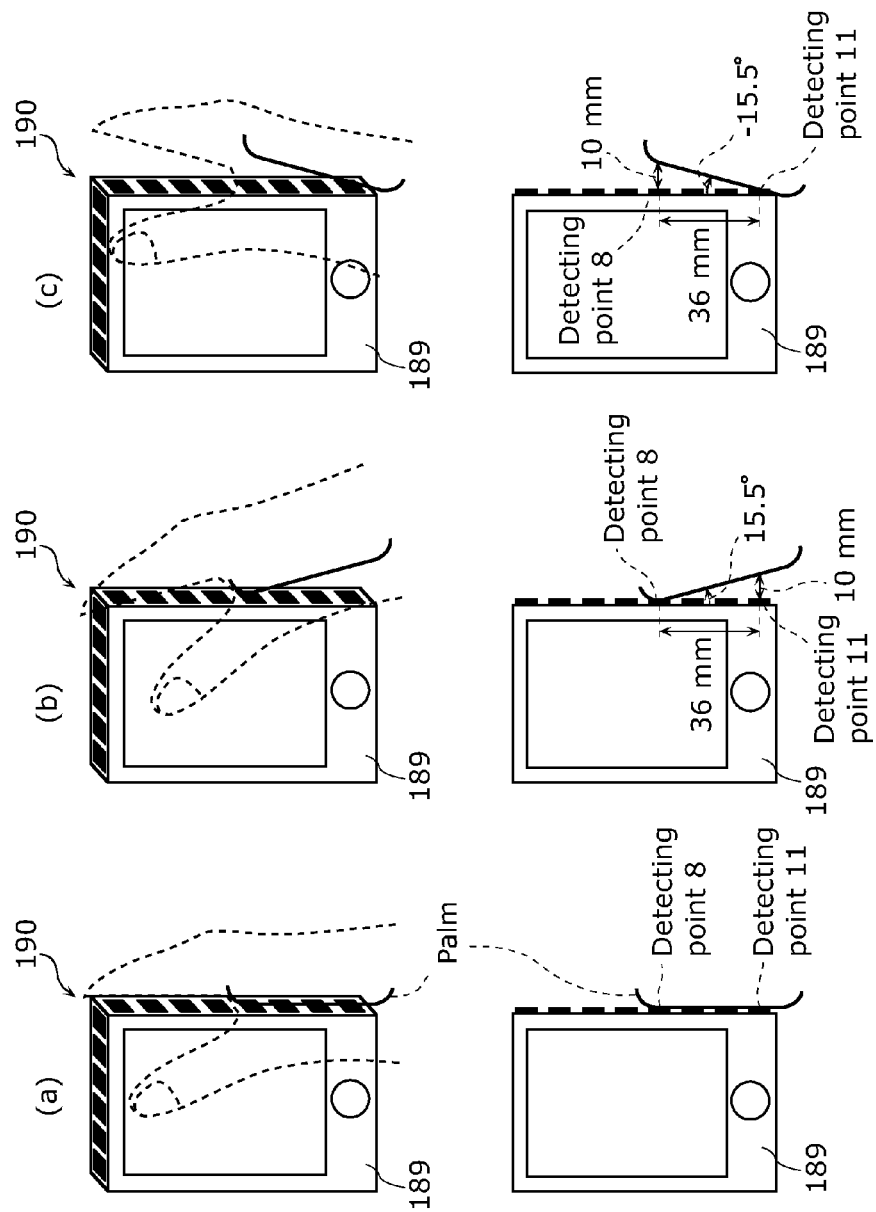
FIG. 52 is a diagram showing examples of direction angles of a holding hand according to Embodiment 4 of the present invention.

For instance, assuming that a case is the reference angle of the holding hand where the palm of the holding hand contacts the detecting points 8 to 11 of the peripheral proximity sensor 123 (output values of the detecting points 8 to 11 indicate 0 mm) ((a) in FIG. 52), it is possible to calculate a tilt (direction angle) of the holding hand by using the distances between the detecting points and the hand outputted by the peripheral proximity sensor 123 and the placement spacing of the detecting points (FIG. 50).

As shown by (b) in FIG. 52, when, among the detecting points which detected the hand, the detecting point 8 is the top detecting point and has an output value of 0 mm (contacted with the palm) and the detecting point 11 is the bottom detecting point and has an output value of 10 mm, the holding hand is tilted at +15.5° (arc tangent of 36 mm/10 mm) with respect to the reference angle.

Moreover, as shown by (c) in FIG. 52, when, among the detecting points which detected the hand, the detecting point 8 is the top detecting point and has an output value of 10 mm and the detecting point 11 is the bottom detecting point and has an output value of 0 mm (contacted with the palm), the holding hand is tilted at −15.5° (arc tangent of 36 mm/−10 mm) with respect to the reference angle.

The touch operation recognizing unit 114 adjusts the touch operation start position using the direction angle of the holding hand detected by the direction angle detecting unit 125, and obtains, from the touch operation recognition condition storage unit 115, operation recognition conditions based on the adjusted touch operation start position.

Figure 53:
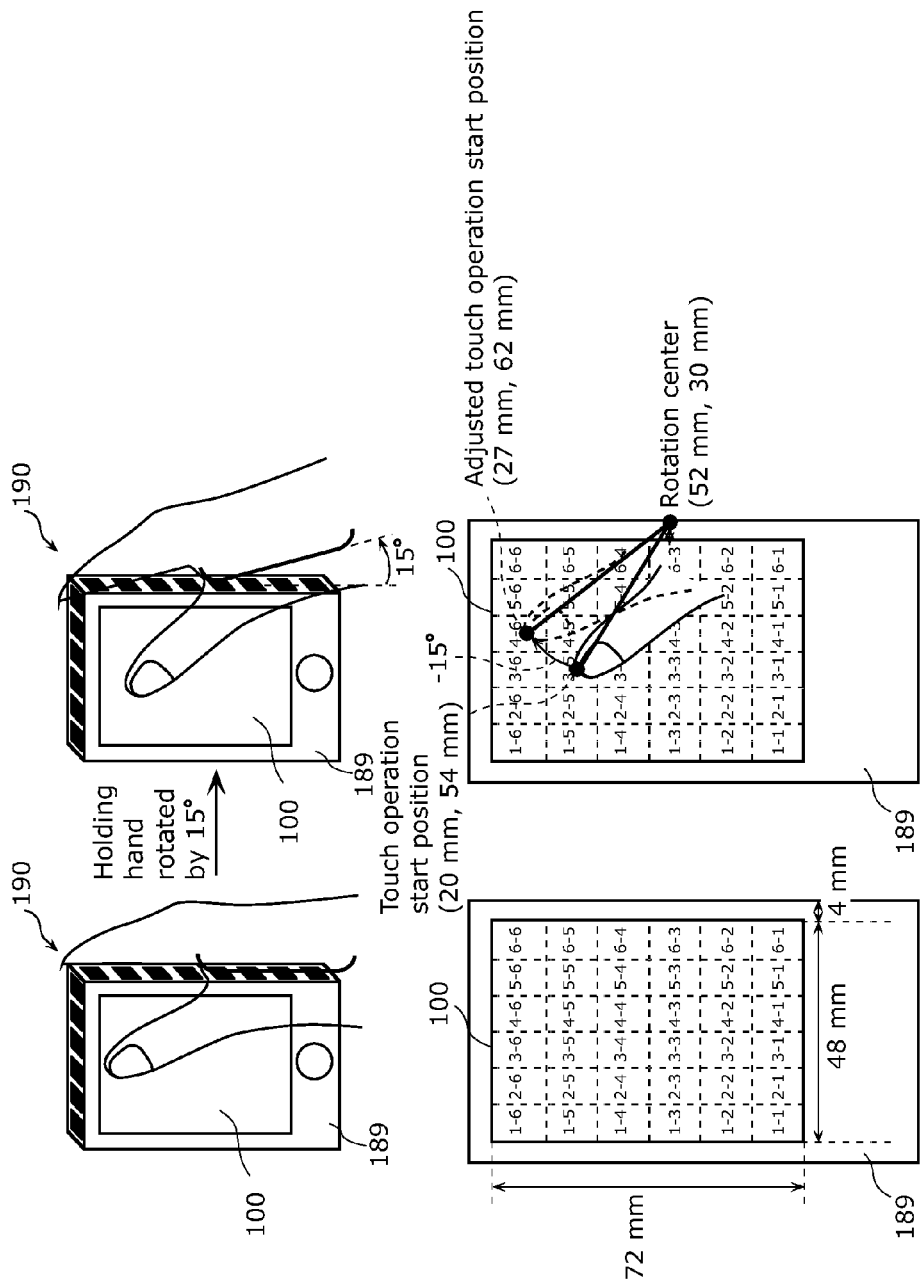
FIG. 53 is a diagram illustrating a method of adjusting a touch operation start position based on a direction angle according to Embodiment 4 of the present invention.

For example, when the operator holds the information input apparatus 190 at a tilt of +15° with respect to the reference angle of the holding hand and a touch operation start position has coordinates (20 mm, 54 mm), although recognition conditions corresponding to the subregion (3-5) including the coordinates (20 mm, 54 mm) should be obtained, as shown by FIG. 53, the touch operation start position is adjusted rotationally by −15° with respect to a center having coordinates (52 mm, 30 mm) of a detecting point closest to the hand (the contacted detecting point 8 in the case of FIG. 53), so as to have coordinates (27 mm, 63 mm), and recognition conditions corresponding to the subregion (4-6) including the coordinates (27 mm, 63 mm) are obtained.

By including such a direction angle detecting unit 125, the information input apparatus 190 is capable of regarding that the tilt of the holding hand of the operator is fixed at the reference angle. To put it differently, even when the operator displaces the hand used for holding the housing 189 by rotating the hand, the information input apparatus 190 allows the operator to perform a touch operation, without causing the operator to change the manner of holding the housing 189 or changing the association between the subregions and the recognition conditions stored in the touch operation recognition condition storage unit 115.

The finger length detecting unit 126 estimates the length of the finger in contact with the touch pad 100, using touch positions obtained from the touch position series storage unit 102 and the outputs of the peripheral proximity sensor 123. First, the finger length detecting unit 126 calculates, as a position of the base of the hand, coordinates, of the top detecting point among the detecting points of the peripheral proximity sensor 123 which detected contact with the finger, on the touch pad 100.

Figure 54:
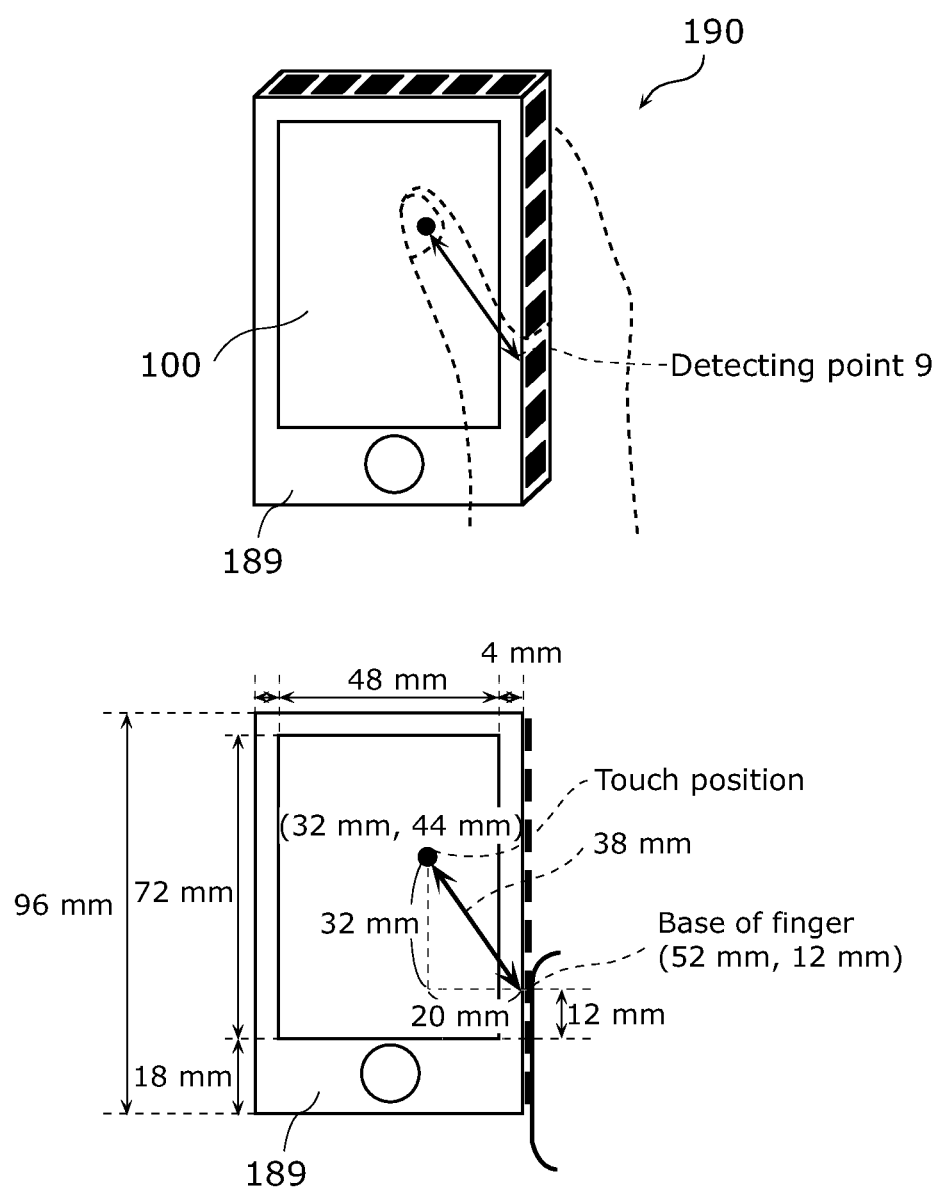
FIG. 54 is a diagram showing an example of a finger length of a holding hand according to Embodiment 4 of the present invention.

In an example shown by FIG. 54, the detecting point 9 is assumed to be the base of the finger, and coordinates (52 mm, 12 mm) are obtained. Then, assuming that coordinates of a touch position are (32 mm, 44 mm), a distance from the base of the finger (52 mm, 12 mm) to the touch position (32 mm, 44 mm) is calculated as 38 mm.

Furthermore, the finger length detecting unit 126 continuously calculates the distance from the base of the finger to the touch position during a period from when the operator holds the housing 189 of the information input apparatus 190 (at least one of the detecting points of the peripheral proximity sensor 123 detects the hand) to when the operator removes the finger from the housing 189 (none of the detecting points of the peripheral proximity sensor 123 detects the hand), and outputs an average value of the distances as the length of the finger.

The touch operation recognizing unit 114 adjusts the touch operation start position using the length of the finger detected by the finger length detecting unit 126, and obtains, from the touch operation recognition condition storage unit 115, operation recognition conditions based on the adjusted touch operation start position.

For instance, when the reference finger length is set to 48 mm, the detected length of the finger is 33 mm, and a touch operation start position has coordinates (28 mm, 54 mm), although recognition conditions corresponding to the subregion (4-5) including the coordinates (28 mm, 54 mm) should be obtained, as shown by FIG. 55, the touch operation start position is adjusted by being multiplied by 1.45 (48 mm/33 mm) with respect to coordinates (52 mm, 30 mm) of a detecting point closest to the hand (the contacted detecting point 8 in the case of FIG. 55), so as to have coordinates (20 mm, 66 mm), and recognition conditions corresponding to the subregion (3-6) including the coordinates (20 mm, 66 mm) are obtained.

By including such a finger length detecting unit 126, the information input apparatus 190 is capable of regarding that the length of the finger of the operator is fixed to the reference finger length. To put it differently, even when a length of a finger of an operator using the information input apparatus 190 differs from operator to operator, the information input apparatus 190 allows the operator to perform a touch operation, without causing the operator to change the manner of holding the housing 189 or changing the association between the subregions and the recognition conditions stored in the touch operation recognition condition storage unit 115.

Processing in which a touch feature amount is calculated based on the touch position series and the touch feature amount is compared with the obtained recognition threshold values using the obtained conditional expression is the same as in Embodiment 1, and a description thereof is omitted.

Figure 56A:
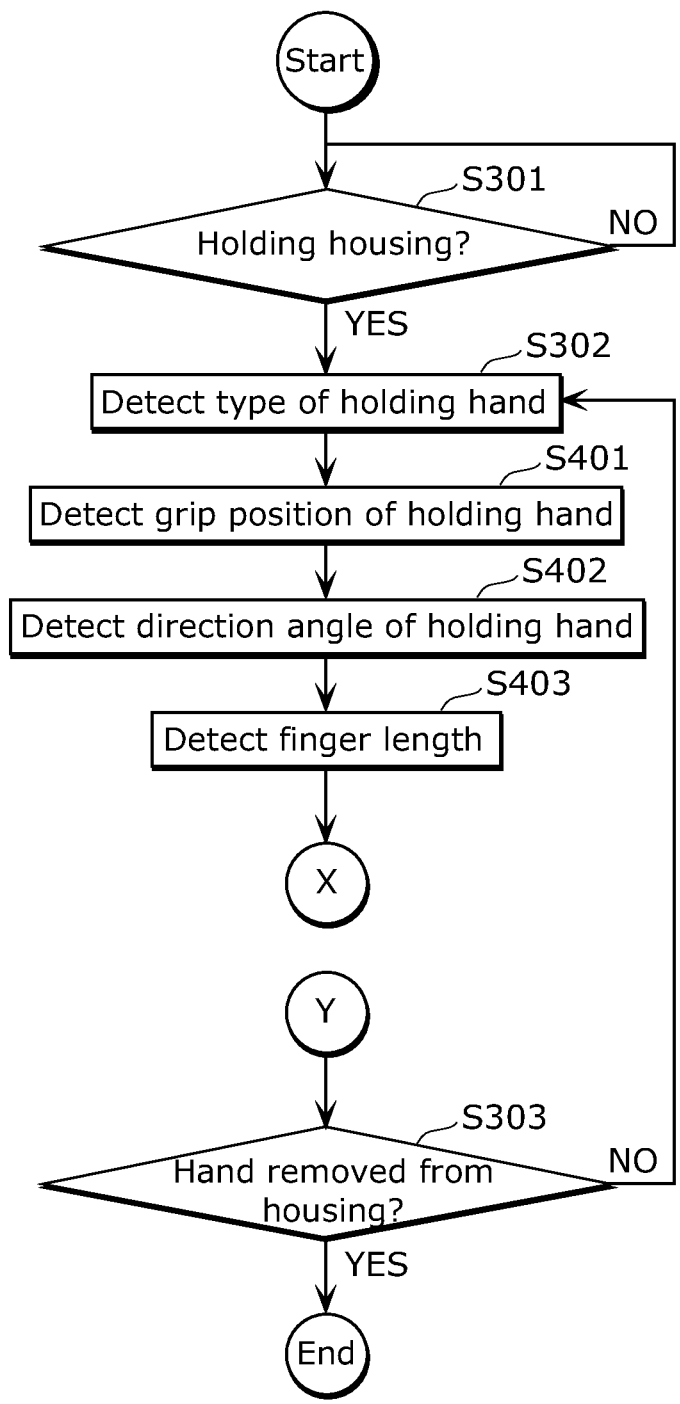
FIG. 56A is a first flow chart illustrating a processing flow of the information input apparatus according to Embodiment 4 of the present invention.

Each of FIGS. 56A and 56B is a flow chart showing a processing flow from when the operator holds the housing 189 of the information input apparatus 190, touches the touch pad 100 with the finger, and performs a touch operation to when the operator removes the hand from the housing 189, according to this embodiment. The following describes S403 to S405 added to the flow chart (FIG. 43) described in Embodiment 3.

The grip information detecting unit 140 determines whether or not the operator holds the housing 189, based on whether or not the grip information detecting unit 140 obtains outputs from the peripheral proximity sensor 123.

Moreover, when the peripheral proximity sensor 123 starts to send the outputs, the holding hand detecting unit 122 detects whether the holding hand is the right hand, the left hand, or the both hands. Subsequently, the grip position detecting unit 124 detects a grip position of the holding hand using a distance between the periphery of the housing and the hand outputted by the peripheral proximity sensor 123 (S401 in FIG. 56A), the direction angle detecting unit 125 detects a tilt (direction angle) of the holding with respect to the housing 189 (S402), and the finger length detecting unit 126 detects a length of the finger used for a touch operation (S403).

Furthermore, after the touch operation start position detecting unit 103 detects a touch operation start position, the touch operation recognizing unit 114 adjusts the touch operation start position based on the grip position (S404 in FIG. 56B), the direction angle (S405), and the length of the finger (S406).

Moreover, the touch operation recognizing unit 114 obtains, from the touch operation recognition condition storage unit 115, touch operation recognition conditions corresponding to the adjusted touch operation start position.

It is to be noted that although the information input apparatus 190 is configured to use the peripheral proximity sensor 123 in this embodiment, the information input apparatus 190 may be configured to use the peripheral contact sensor 121 in the same manner as Embodiment 3 when a grip position and a length of the holding hand are detected.

According to the configuration described in this embodiment, it is possible to provide the information input apparatus 190 which (i) allows the input of the gesture operations even when the operation is started at any position on the touch pad 100, (ii) facilitates the recognition of the specific gesture operation more than that of other gesture operations according to the grip position, the tilt, and the length of the finger of the holding hand used by the operator holding the information input apparatus 190, and (iii) enables the operator to perform natural and quick input.

As a result, the operator does not need to be aware of the way of holding the housing 189 during operation or change the manner of holding the housing 189, which enhances the convenience.

It is to be noted that the touch operation recognizing unit 114 adjusts the touch operation start position based on the type or position of the holding hand, the direction angle, and the length of the finger in this embodiment.

However, the touch operation recognizing unit 114 may adjust not only the touch operation start position but also a touch position confirmed after recognizing a touch operation, based on the type or position of the holding hand, the direction angle, and the length of the finger.

Figure 57:
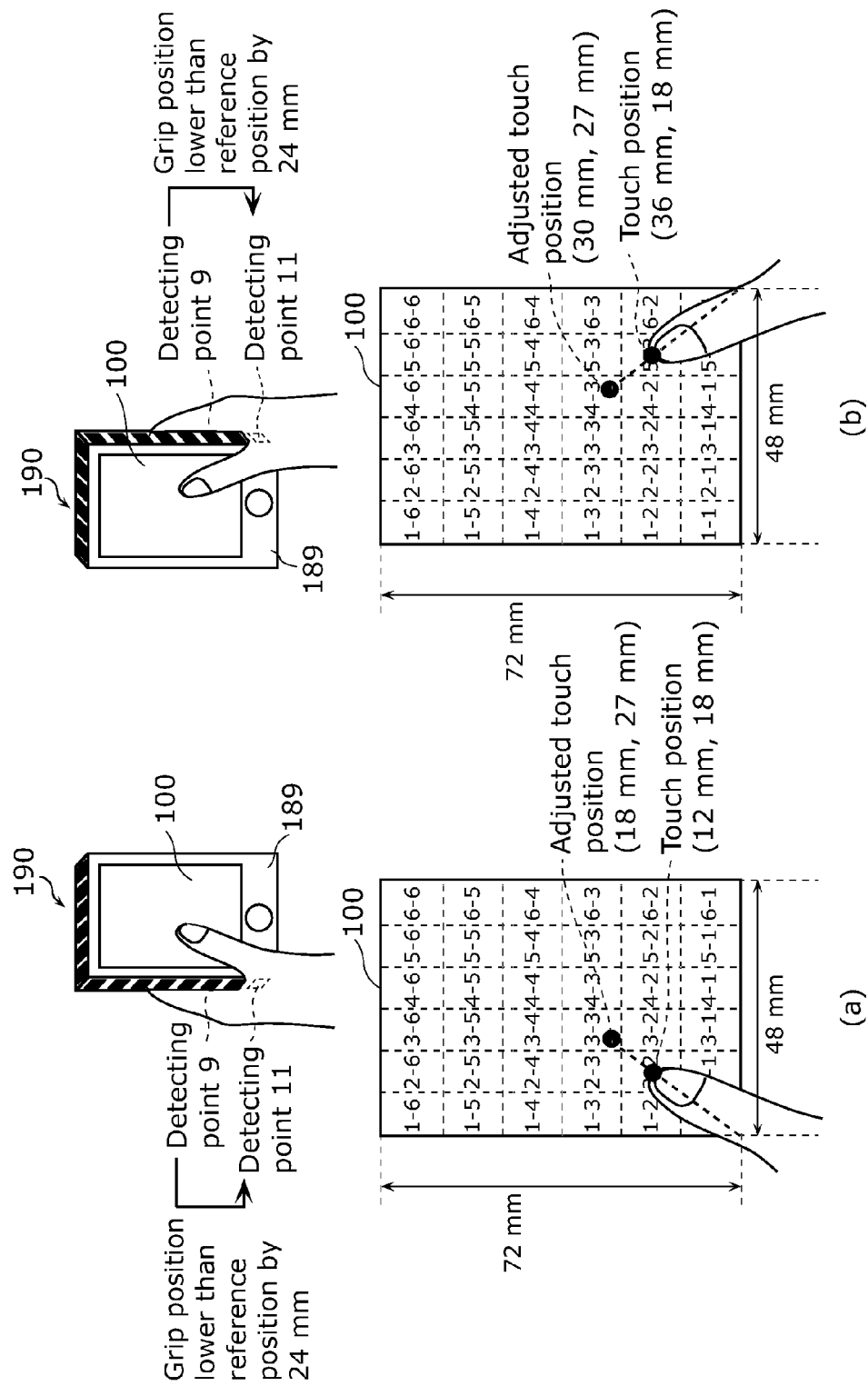
FIG. 57 is a diagram illustrating a method of adjusting a touch position according to Embodiment 4 of the present invention.

For example, as shown by (a) in FIG. 57, when the operator grips the information input apparatus 190 with the left hand at a position below the reference position of the holding hand by 24 mm, the touch operation recognizing unit 114 multiplies coordinates of a touch position by 1.5 (72 mm/2)/24 mm). Assuming the coordinates of the touch position are (12 mm, 18 mm), the touch operation recognizing unit 114 adjusts the coordinates to (18 mm, 27 mm) by multiplying the coordinates by 1.5.

Similarly, as shown by (b) in FIG. 56, when the operator grips the information input apparatus 190 with the right hand at a position below the reference position of the holding hand by 24 mm, assuming that coordinates of a touch position are (36 mm, 18 mm), the touch operation recognizing unit 114 adjusts the coordinates to (30 mm, 27 mm) so that a distance between the touch position and the right bottom corner of the touch sensor is multiplied by 1.5 (72 mm/2)/24 mm).

With such a configuration, even when the operator grips a lower part of the information input apparatus 190 with the left hand (or the right hand) and the finger of the operator does not reach a right upper part (or a left upper part) of the information input apparatus 190, the information input apparatus 190 allows the operator to perform an input operation at a position in the right upper part (or the left upper part) without causing the operator to change the manner of holding the information input apparatus 190.

This is effective to a case where especially when a cursor position is controlled according to a touch position of the pointing operation ((a) in FIG. 2), a moving range of a cursor is limited since there is an area on the touch pad 100 where the finger of the operator does not reach, and the information input apparatus 190 allows the operator to move the cursor extensively without causing the operator to change the manner of holding the information input apparatus 190, which enhances the convenience of the operator.

(Embodiment 5)

As in Embodiment 1, the information input apparatus 190 according to Embodiment 5 of the present invention includes the housing 189, the capacitance touch pad 100, and the operation determination button 150.

Moreover, as in Embodiment 1, the information input apparatus 190 recognizes touch operations including a pointing operation for moving a cursor displayed on a screen, a vertical slide operation for tracing the touch pad 100 linearly in a vertical direction, a horizontal slide operation for tracing the touch pad 100 linearly in a horizontal direction, and a rotation operation for tracing the touch pad 100 in a circular trajectory.

Figure 58:
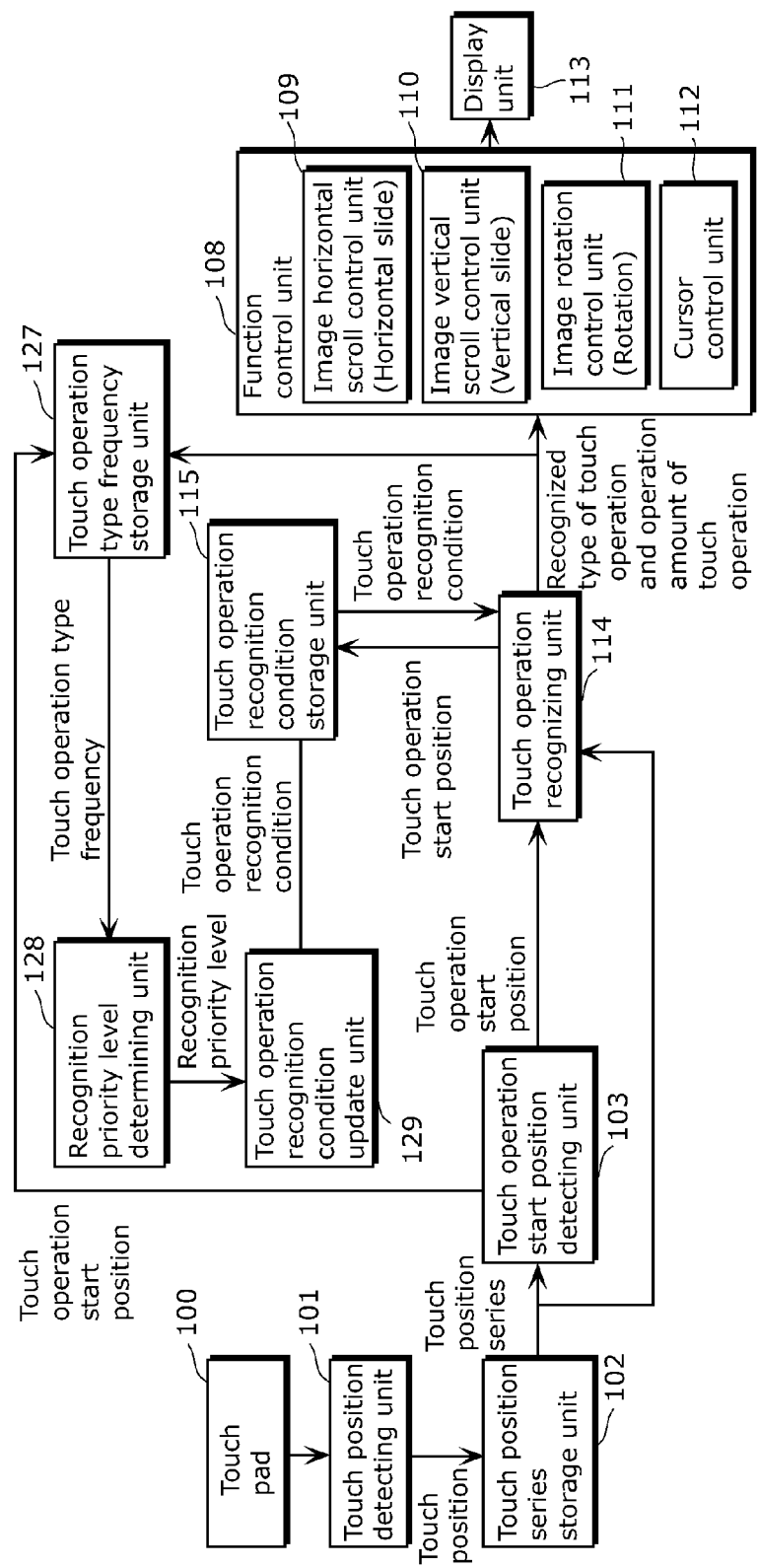
FIG. 58 is a block diagram showing a configuration of the information input apparatus according to Embodiment 5 of the present invention.

FIG. 58 is a diagram showing a configuration example of the information input apparatus 190 according to this embodiment.

The information input apparatus 190 according to this embodiment differs from the information input apparatus 190 according to Embodiment 1 (FIG. 3) in that a touch operation type frequency storage unit 127 obtains and stores a touch operation type frequency that is a result of recognizing a touch operation, a recognition priority level determining unit 128 determines a priority level for recognizing a touch operation, based on the touch operation type frequency, and a touch operation recognition condition update unit 129 updates touch operation recognition conditions using the recognition priority level.

In other words, the information input apparatus 190 includes: the recognition priority level determining unit 128 which determines, in association with each of subregions, a recognition priority level indicating a degree of recognition of each of types of touch operation; and the touch operation recognition condition update unit 129 which updates touch operation recognition conditions associated with, among the subregions, a third subregion, according to a recognition priority level determined in association with the third subregion.

The touch operation recognition condition update unit 129 updates threshold values included in touch operation recognition conditions so that a type of touch operation having a higher recognition priority level is recognized more easily.

More specifically, the information input apparatus 190 includes the touch operation type frequency storage unit 127 which stores a type frequency that is a frequency for each of types of touch operation recognized by the touch operation recognizing unit 114, in association with each of the subregions.

Furthermore, the recognition priority level determining unit 128 determines a recognition priority level so that a recognition priority level of a type of touch operation having a higher type frequency obtained from the touch operation type frequency storage unit 127 becomes higher.

The following describes in more detail the above units. It is to be noted that this embodiment describes mainly the touch operation type frequency storage unit 127, the recognition priority level determining unit 128, and the touch operation recognition condition update unit 129, and that the same numeral signs are assigned to the same elements as in Embodiment 1, and descriptions thereof are omitted.

First, the following describes, among the blocks shown by FIG. 58, functions different from the functions in Embodiment 1.

The touch operation type frequency storage unit 127 obtains, from the touch operation recognizing unit 114, a type of touch operation that is a recognition result, and obtains, from the touch operation start position detecting unit 103, a touch operation used for recognizing a touch operation that is a recognition result.

Then, the touch operation type frequency storage unit 127 stores, as a frequency, the number of touch operations inputted for each subregion, in association with a subregion including the obtained touch operation start position and the obtained type of touch operation. FIG. 59 shows a structure of data stored in the touch operation type frequency storage unit 127.

It is to be noted that the subregions described in this embodiment are the same as those described in Embodiment 1.

The recognition priority level determining unit 128 obtains, from the touch operation type frequency storage unit 127, a touch operation type frequency for each subregion, and determines a priority level of the touch operation for each subregion.

For instance, as shown by FIG. 59, an obtained frequency for the subregion (1-1) shows that a vertical slide operation, a horizontal slide operation, a rotation operation, and a pointing operation are inputted 6 times, 4 times, 8 times, and 2 times, respectively, and that these types of touch operation are inputted 20 times in total.

The recognition priority level determining unit 128 calculates ratios of the vertical slide operation, the horizontal slide operation, the rotation operation, and the pointing operation to the number of operations of all types of touch operation as 30%, 20%, 40%, and 10%, respectively. Each of the ratios is used as a recognition priority level of a corresponding one of the touch operations.

In other words, in the above example, the priority levels of the respective touch operations are as follows: the vertical slide operation: 30, the horizontal slide operation: 20, the rotation operation: 40, and the pointing operation: 10 (FIG. 60).

The touch operation recognition condition update unit 129 creates and outputs touch operation recognition conditions using the recognition priority levels determined for each subregion by the recognition priority level determining unit 128, and updates the touch operation recognition conditions stored in the touch operation recognition condition storage unit 115.

Specifically, the touch operation recognition condition update unit 129 generates threshold values for recognizing the vertical slide operation, the horizontal slide operation, and the rotation operation which are similar to those shown by FIG. 6. The following describes a method of calculating a threshold value.

First, the degrees of ease of input of the vertical slide operation, the horizontal slide operation, and the rotation operation shown by FIGS. 16 to 20 of Embodiment 1 are used.

FIG. 61 shows degrees of ease of input used in this embodiment, based on the degrees of ease of input described in Embodiment 1.

First, to handle the vertical slide operation and the horizontal slide operation collectively, a threshold value resulting from the combination of the movement direction threshold value Dvs of the vertical slide operation and the movement direction threshold value Dhs of the horizontal slide operation is introduced as Ds.

Here, Ds=Dvs+Dhs

Because there is no movement direction included in both the movement direction of the vertical slide operation and the movement direction of the horizontal slide operation, based on ranges set as $10°≤Dvs≤80°$, $10°≤Dhs≤80°$, and $20°≤Dvs+Dhs≤90°$, a degree of ease of input of both the vertical slide operation and the horizontal slide operation can be expressed as Ds×8.

A degree of ease of input of the rotation operation is the same as the one in Embodiment 1.

Next, a degree of ease of input of the pointing operation is added. As in Embodiment 1, recognition conditions are not provided for the pointing operation, and the pointing operation is confirmed when a gesture operation does not correspond to any one of the vertical slide operation, the horizontal slide operation, and the rotation operation.

However, there are no recognition conditions for recognizing the pointing operation, and thus it is impossible to determine, based on the recognition conditions, a size of a possible angular range of a movement direction or a movement direction difference.

In response, calculated is an outside of an angular range of a movement direction of the vertical slide operation or the horizontal slide operation, or an outside of an angular range of a movement direction difference of the rotation operation.

Specifically, as shown by FIG. 61, a range resulting from subtracting, from ominidirection 360°, an expected value of the angular range of the movement direction of the slide operation or an expected value of the angular range of a movement direction differences of the rotation operation is a possible range of the movement direction or the movement direction difference of the pointing operation, and the degree of ease of input of the pointing operation is expressed as 1080°−Ds×8×Ps−dDr×6×Pr. (Here, a ratio of a frequency of the slide operation is Ps, a ratio of a frequency of the rotation operation is Pr, and Ps and Pr are handled as an occurrence probability.)

Then, the touch operation recognition condition update unit 129 calculates respective threshold values of the movement direction and the movement direction difference by converting the degrees of ease of input into values according to the recognition priority levels. Specifically, the calculation is made based on an assumption that a ratio of a recognition priority level=a ratio of a degree of ease of input.

For instance, the recognition priority levels of the subregion (1-1) shown by FIG. 60 are converted as (30+20):40:

10=Ds×8:dDr×6:(1080°−Ds×8×(30+20)/100−dDr×6×10/100), and the touch operation recognition condition update unit 129 obtains Ds=132° and dDr=141° by solving the equation. However, to satisfy Ds=Dvs+Dhs 90°, Ds is set to 90°.

The touch operation recognition condition update unit 129 obtains Dvs=54° and Dhs=36° by diving Ds by a ratio between the recognition priority levels of the vertical slide operation and the horizontal slide operation.

Subsequently, the touch operation recognition condition update unit 129 determines movement distance threshold values.

The touch operation recognition condition update unit 129 calculates, using the minimum value of 5 mm in the threshold value range, 5 mm≤Lvs, Lhs, Lr≤40 mm, described in Embodiment 1, a difference between the minimum value and the maximum value of 40 mm in the same, and a difference between a predetermined value (100) and each of recognition priority levels, the movement distance threshold values in the following manner.

For instance, differences between the predetermined value (100) and the recognition priority levels of the vertical slide operation, the horizontal slide operation, and the rotation operation are expressed as 70%:80%:60% for the subregion (1-1) shown by FIG. 60, and thus movement distance threshold values are respectively calculated as Lvs=5+(40−5)×70%=29.5 mm, Lhs=5+(40−5)×80%=33 mm, and Lr=5+(40−5)×60%=26 mm.

Likewise, because the range is 30°≤Rr≤360°, a rotation angle threshold value for the rotation operation is calculated using the above ratio as Rr=30+(360−30)×60%=228°.

The following describes other examples of calculating recognition threshold values from operation type frequencies.

FIGS. 59 and 60 show operation type frequencies and operation recognition priority levels for the subregion (1-2). The touch operation recognition condition update unit 129 solves, using the priority levels, 30:40:=Ds×8:dDr×6:(1080°−Ds×8×30/100−dDr×6×40/100), to obtain Ds=74° and dDr=132°.

It is to be noted that the recognition priority level of the vertical slide operation is 0. In this case, Dvs is set to the minimum value in the threshold value range (10°≤Dvs≤80°). Thus, Dvs=10° and Dhs=64° are obtained.

Differences between the predetermined value (100) and the recognition priority levels of the vertical slide operation, the horizontal slide operation, and the rotation operation are expressed as 100%:70%:60% for the subregion (1-2) shown by FIG. 60, and thus the touch operation recognition condition update unit 129 calculates movement distance threshold values as Lvs=5+(40−5)×100%=40 mm, Lhs=5+(40−5)×70%=29.5 mm, and Lr=5+(40−5)×60%=26 mm, respectively.

Similarly, a rotation angle threshold value for the rotation operation is calculated as Rr=30+(360−30)×60%=228°.

FIGS. 59 and 60 show operation type frequencies and operation recognition priority levels for the subregion (1-3). The touch operation recognition condition update unit 129 solves, using the priority levels, (25+25):25:25:=Ds×8:dDr×6:(1080°−Ds×8×(25+25)/100−dDr×6×25/100), to obtain Ds=120° and dDr=80°. Because Ds is beyond the range (20°≤Dvs+Dhs≤90°), Ds is set to the maximum value, that is, Ds=90°.

The touch operation recognition condition update unit 129 obtains Dvs=45° and Dhs=45° by diving Ds by a ratio between the recognition priority levels of the vertical slide operation and the horizontal slide operation.

Differences between the predetermined value (100) and the recognition priority levels of the vertical slide operation, the horizontal slide operation, and the rotation operation are expressed as 75%:75%:75% for the subregion (1-3) shown by FIG. 60, and thus the touch operation recognition condition update unit 129 calculates movement distance threshold values as Lvs=5+(40−5)×75%=31.3 mm, Lhs=5+(40−5)×75%=31.3 mm, and Lr=5+(40−5)×75%=31.3 mm, respectively.

Similarly, a rotation angle threshold value for the rotation operation is calculated as Rr=30+(360−30)×75%=277.5°.

FIGS. 59 and 60 show operation type frequencies and operation recognition priority levels for the subregion (1-4).

The touch operation recognition condition update unit 129 solves, using the priority levels, 50:20:30=Ds×8: dDr×6:(1080°−Ds×8×50/100−dDr×6×20/100), to obtain Ds=114° and dDr=61°.

Here, the recognition priority level of the horizontal slide operation is 0. In this case, Dhs is set to the minimum value in the threshold value range (10°≤Dhs≤80°), that is, Dhs=10°. Moreover, because Ds is beyond the range (20°≤Dvs+Dhs≤90°), Ds is set to the maximum value, that is Ds=90°. Therefore, Dvs=80°.

Differences between the predetermined value (100) and the recognition priority levels of the vertical slide operation, the horizontal slide operation, and the rotation operation are expressed as 50%:100%:80% for the subregion (1-4) shown by FIG. 60, and thus the touch operation recognition condition update unit 129 calculates movement distance threshold values as Lvs=5+(40−5)×50%=22.5 mm, Lhs=5+(40−5)×100%=40 mm, and Lr=5+(40−5)×80%=33 mm, respectively.

Similarly, a rotation angle threshold value for the rotation operation is calculated as Rr=30+(360−30)×80%=294°.

FIGS. 59 and 60 show operation type frequencies and operation recognition priority levels for the subregion (1-5). Here, the recognition priority level of the pointing operation is 0. In this case, the touch operation recognition condition update unit 129 sets Ds to 90°, that is, the maximum value in the range (20°≤Dvs+Dhs≤90°).

The touch operation recognition condition update unit 129 obtains Dvs=56° and Dhs=34° by diving Ds by a ratio between the recognition priority levels of the vertical slide operation and the horizontal slide operation. Furthermore, the touch operation recognition condition update unit 129 solves, using a ratio between the priority levels, (50+30):20:=Ds×8:dDr×6, to obtain dDr=30°.

Differences between the predetermined value (100) and the recognition priority levels of the vertical slide operation, the horizontal slide operation, and the rotation operation are expressed as 50%:70%:80% for the subregion (1-5) shown by FIG. 60, and thus the touch operation recognition condition update unit 129 calculates movement distance threshold values as Lvs=5+(40−5)×50%=22.5 mm, Lhs=5+(40−5)×70%=29.5 mm, and Lr=5+(40−5)×80%=33 mm, respectively.

Similarly, a rotation angle threshold value for the rotation operation is calculated as Rr=30+(360−30)×80%=294°.

FIGS. 59 and 60 show operation type frequencies and operation recognition priority levels for the subregion (1-6). Here, the recognition priority levels of the vertical slide operation, the horizontal slide operation, and the rotation operation are 0.

In this case, Dvs and Dhs are set to 10°, that is, the minimum value in the respective ranges (10°≤Dvs≤80° and 10°≤Dhs≤80°), and dDr is set to 10°, that is the minimum value in the range (10°≤dDr≤180°), thereby obtaining Dvs=10°, Dhs=10°, and dDr=10°.

Differences between the predetermined value (100) and the recognition priority levels of the vertical slide operation, the horizontal slide operation, and the rotation operation are expressed as 100%:100%:100% for the subregion (1-6) shown by FIG. 60, and thus the touch operation recognition condition update unit 129 calculates movement distance threshold values as Lvs=5+(40−5)×100%=40 mm, Lhs=5+(40−5)×100%=40 mm, and Lr=5+(40−5)×100%=40 mm, respectively.

Similarly, a rotation angle threshold value for the rotation operation is calculated as Rr=30+(360−30)×100%=360°.

FIGS. 59 and 60 show operation type frequencies and operation recognition priority levels for the subregion (2-1).

Here, the recognition priority level of the rotation operation is 0. In this case, the touch operation recognition condition update unit 129 sets dDr to 10°, that is, the minimum value in the range (10°≤dDr≤180°), to obtain dDr=10°.

Furthermore, the sum of the priority levels of the vertical slide operation and the horizontal slide operation is 100. In this case, the touch operation recognition condition update unit 129 sets Ds to 90°, that is, the maximum value in the range (20°≤Dvs+Dhs≤90°). The touch operation recognition condition update unit 129 obtains Dvs=15° and Dhs=75° by diving Ds by a ratio between the recognition priority levels of the vertical slide operation and the horizontal slide operation.

Differences between the predetermined value (100) and the recognition priority levels of the vertical slide operation, the horizontal slide operation, and the rotation operation are expressed as 83%:17%:100% for the subregion (2-1) shown by FIG. 60, and thus the touch operation recognition condition update unit 129 calculates movement distance threshold values as Lvs=5+(40−5)×83%=34.1 mm, Lhs=5+(40−5)×17%=11 mm, and Lr=5+(40−5)×100%=40 mm, respectively.

Similarly, a rotation angle threshold value for the rotation operation is calculated as Rr=30+(360−30)×100%=360°.

FIGS. 59 and 60 show operation type frequencies and operation recognition priority levels for the subregion (2-2).

Here, the recognition priority levels of the vertical slide operation and the horizontal slide operation are 0. In this case, the touch operation recognition condition update unit 129 sets Dvs and Dhs to 10°, that is, the minimum value in the respective ranges (10°≤Dvs≤80° and 10°≤Dhs≤80°), to obtain Dvs=10° and Dhs=10°.

Moreover, the recognition priority level of the rotation operation is 100. In this case, the touch operation recognition condition update unit 129 sets dDr to 90°, that is, the maximum value in the range (20°≤Dvs+Dhs≤90°), to obtain dDr=90°.

Differences between the predetermined value (100) and the recognition priority levels of the vertical slide operation, the horizontal slide operation, and the rotation operation are expressed as 100%:100%:0% for the subregion (2-2) shown by FIG. 60, and thus the touch operation recognition condition update unit 129 calculates movement distance threshold values as Lvs=5+(40−5)×100%=40 mm, Lhs=5+(40−5)×100%=40 mm, and Lr=5+(40−5)×0%=5 mm, respectively.

Similarly, a rotation angle threshold value for the rotation operation is calculated as Rr=30+(360−30)×0%=30°.

FIGS. 59 and 60 show operation type frequencies and operation recognition priority levels for the subregion (2-3).

Here, the recognition priority level of the rotation operation is 0. In this case, the touch operation recognition condition update unit 129 sets dDr to 10°, that is, the minimum value in the range (10°≤dDr≤180°), to obtain dDr=10°.

Furthermore, the touch operation recognition condition update unit 129 solves, using a ratio between the priority levels, (30+30): 40=Ds×8: (1080°−Ds×8×(30+30)/100), to obtain Ds=106°.

Here, because Ds is beyond the range (20°≤Dvs+Dhs≤90°), Ds is set to the maximum value, that is, Ds=90°. Furthermore, Dvs=45 and Dhs=45 are obtained by dividing Ds a ratio between the recognition priority levels of the vertical slide operation and the horizontal slide operation.

Differences between the predetermined value (100) and the recognition priority levels of the vertical slide operation, the horizontal slide operation, and the rotation operation are expressed as 70%:70%:100% for the subregion (2-3) shown by FIG. 60, and thus the touch operation recognition condition update unit 129 calculates movement distance threshold values as Lvs=5+(40−5)×70%=29.5 mm, Lhs=5+(40−5)×70%=29.5 mm, and Lr=5+(40−5)×100%=40 mm, respectively.

Similarly, a rotation angle threshold value for the rotation operation is calculated as Rr=30+(360−30)×100%=360°.

FIGS. 59 and 60 show operation type frequencies and operation recognition priority levels for the subregion (2-4).

Here, the recognition priority levels of the vertical slide operation and the horizontal slide operation are 0. In this case, the touch operation recognition condition update unit 129 sets Dvs and Dhs to 10°, that is, the minimum value in the respective ranges (10°≤Dvs≤80° and 10°≤Dhs≤80°), to obtain Dvs=10° and Dhs=10°. Moreover, the touch operation recognition condition update unit 129 solves, using a ratio between the priority levels, 30:70=dDr×6: (1080°−dDr×6×70/100), to obtain dDr=68°.

Differences between the predetermined value (100) and the recognition priority levels of the vertical slide operation, the horizontal slide operation, and the rotation operation are expressed as 100%:100%:70% for the subregion (2-4) shown by FIG. 60, and thus the touch operation recognition condition update unit 129 calculates movement distance threshold values as Lvs=5+(40−5)×100%=40 mm, Lhs=5+(40−5)×100%=40 mm, and Lr=5+(40−5)×70%=29.5 mm, respectively.

Similarly, a rotation angle threshold value for the rotation operation is calculated as Rr=30+(360−30)×70%=261°.

FIG. 62 is a flow chart showing a processing flow from when a touch operation is recognized after the touch pad 100 detects a touch position of the finger of the operator to when screen display is performed, according to this embodiment. The following describes S501 to S505 added to the flow chart (FIG. 21) described in Embodiment 1.

After recognition is confirmed by the touch operation recognizing unit 114, the touch operation type frequency storage unit 127 obtains a type of touch operation that is the recognition result, obtains a frequency by counting, for each subregion, the number of confirmed operations, and stores the frequency (S501).

Next, the recognition priority level determining unit 128 calculates, for each subregion, a ratio of the number of operations of each type of touch operation to the number of operations of all the types of touch operation, and uses the ratios as recognition priority levels of each subregion (S502).

Moreover, as explained above, the touch operation recognition condition update unit 129 generates threshold values that are recognition conditions, using the recognition priority levels calculated for each subregion.

The touch operation recognition condition storage unit 115 stores the generated threshold values into the corresponding threshold values of the subregions (S503). Subsequently, when the touch position detecting unit 101 detects that the operator has removed the finger from the touch pad 100 (S121), the touch operation ends.

Then, the processing for the next touch operation is started again (S101), and when touch operation recognition conditions are obtained from the touch operation recognition condition storage unit 115, touch operation recognition conditions generated and updated based on previous touch operation type frequencies are obtained (S109).

It is to be noted that although the recognition priority levels of the touch operations are determined using the touch operation type frequencies obtained by the touch operation type frequency storage unit 127 in this embodiment, the operator may directly instruct or input the recognition priority levels to the information input apparatus 190.

Figure 63:
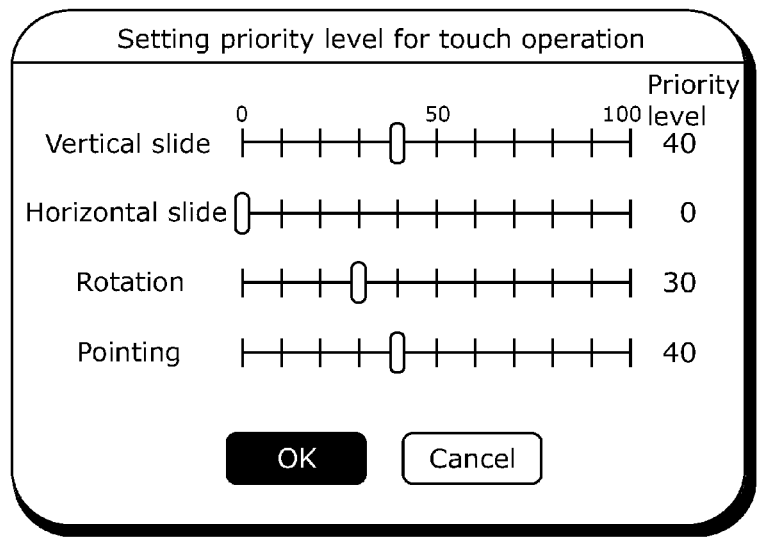
FIG. 63 is a diagram showing an exemplary GUI on which recognition priority levels are inputted to the information input apparatus according to Embodiment 5 of the present invention.

For example, it is conceivable that the operator directly inputs the recognition priority levels to the information input apparatus 190, using a GUI as shown by FIG. 63. This enables the touch operation recognition condition update unit 129 to generate and update the touch operation recognition conditions using the recognition priority levels inputted by the operator until a predetermined number of touch operation recognition results is collected, and to, when the predetermined number of the touch operation recognition results is obtained, determine, through the method described in this embodiment, recognition priority levels based on touch operation type frequencies, and generate or update the touch operation recognition conditions.

According to the configuration described in this embodiment, the information input apparatus is capable of not only inputting the gesture operations even when the operation is started at any position on the touch pad 100, but also automatically facilitating, for each subregion corresponding to the touch operation start position, the input of the touch operation having the higher input frequency more than another touch operation according to an operation tendency or usage of the operator. This allows quick input of commonly-used operations in a short time, which increases the convenience.

It is to be noted that although the touch pad 100 is used as the touch sensor in Embodiments 1 to 5, any sensor other than the touch pad 100 which is capable of detecting a touch position may be used. Moreover, the touch pad 100 used as the touch sensor may be any one of a resistive touch pad, a surface acoustic wave touch pad, an infrared touch pad, an electromagnetic induction touch sensor, and so on, in addition to the capacitance touch pad.

Figure 64:
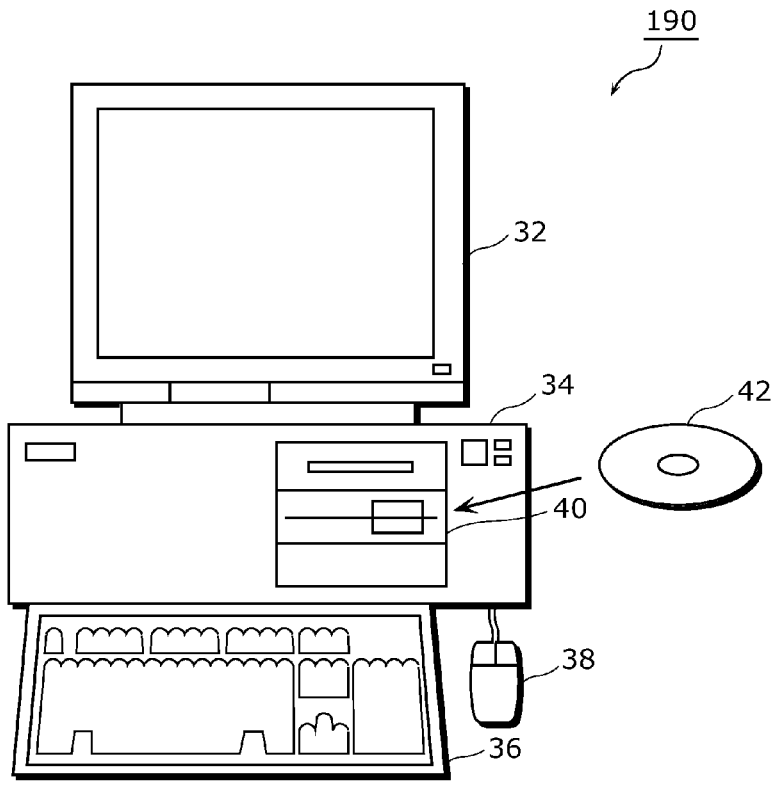
FIG. 64 is an external view showing an exemplary computer system achieved by the information input apparatus according to respective Embodiments 1 to 5 of the present invention.

It is to be noted that the information input apparatus 190 described each of Embodiments 1 to 5 can be realized by a computer. As shown by FIG. 64, the information input apparatus 190 includes: a computer 34; a keyboard 36 and a mouse 38 for instructing the computer 34; a display 32 for displaying information such as computational results of the computer 34; a CD-ROM (Compact Disc-Read Only Memory) device 40 for reading programs to be executed by the computer 34; and a communication modem (not shown).

The programs that are processes performed by the information input apparatus 190 are recorded on a CD-ROM 42, a computer-readable recording medium, and are read by the CD-ROM device 40. Alternatively, the programs are read by the communication modem via a computer network 26.

Figure 65:
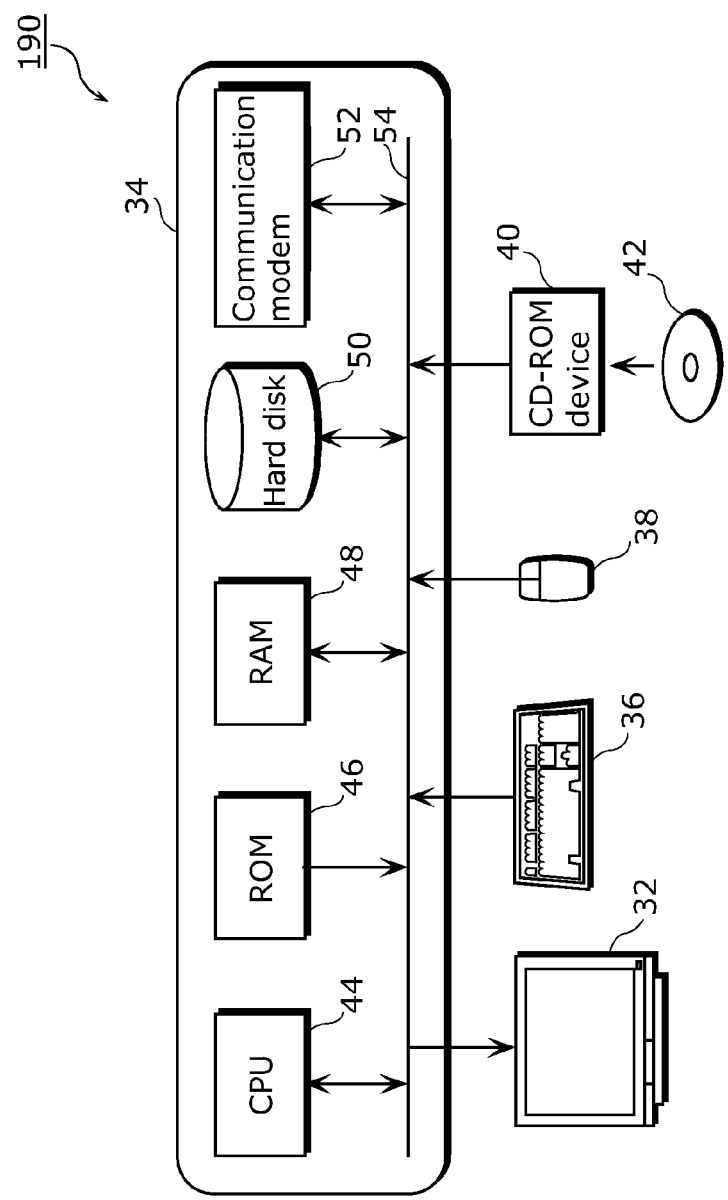
FIG. 65 is a block diagram showing a hardware configuration of the computer system achieved by the information input apparatus according to respective Embodiments 1 to 5 of the present invention.

FIG. 65 is a block diagram showing a hardware configuration of a computer system which realizes the information input apparatus 190. The computer 34 includes a CPU (Central Processing Unit) 44, a ROM (Read Only Memory) 46, a RAM (Random Access Memory) 48, a hard disk 50, a communication modem 52, and a bus 54.

The CPU 44 executes programs read via the CD-ROM device 40 or the communication modem 52. The ROM 46 stores programs or data necessary for operations of the computer 34. The RAM 48 stores data such as parameters at the time of program execution. The hard disk 50 stores the programs, the data, and so on. The communication modem 52 communicates via the computer network 26 with other computers. The bus 54 connects the CPU 44, the ROM 46, the RAM 48, the hard disk 50, the communication modem 52, the display 32, the keyboard 36, the mouse 38, and the CD-ROM device 40 to each other.

Moreover, part or all of the components included in each of the above apparatuses may be included in one system LSI (Large Scale Integration). The system LSI is a super-multifunctional LSI manufactured by integrating components on one chip and is, specifically, a computer system including a micro processing unit, a ROM, a RAM, and so on. A computer program is stored in the RAM. The micro processing unit operates according to the computer program, so that the system LSI fulfills its function.

Furthermore, part or all of the components included in each of the above apparatuses may be included in an IC card removable from each of the apparatuses or in a stand alone module. The IC card or the module is the computer system including the micro processing unit, the ROM, the RAM, and so on. The IC card or the module may include the super-multifunctional LSI. The micro processing unit operates according to the computer program, so that the IC card or the module fulfills its function. The IC card or the module may have tamper-resistance.

Moreover, the present invention may be any of the above methods. Furthermore, the present invention may be a computer program which causes a computer to execute these methods, and a digital signal which is composed of the computer program.

Moreover, in the present invention, the computer program or the digital signal may be recorded on a computer-readable recording medium such as a flexible disk, a hard disk, a CD-ROM, an MO, a DVD, a DVD-ROM, a DVD-RAM, a BD (Blu-ray Disc™), a USB memory, a memory card such as a SD card, and a semiconductor memory. In addition, the digital signal may be recorded on these recording media.

Furthermore, in the present invention, the computer program or the digital signal may be transmitted via an electronic communication line, a wireless or wired communication line, a network represented by the Internet, data broadcasting, and the like.

Moreover, the present invention may be a computer system including a micro processing unit and a memory. The memory may store the above computer program, and the micro processing unit may operate according to the computer program.

Furthermore, the present invention may execute the computer program or the digital signal in another independent computer system by recording the computer program or the digital signal on the recording medium and transmitting the recorded computer program or digital signal or by transmitting the computer program or the digital signal via the network and the like.

The above embodiments and the above modifications may be combined with each other.

It should be considered that the embodiments disclosed herein are exemplary in all respects and not restrictive at all. It is intended that the scope of the present invention is indicated by not the above description of the embodiments but claims, and that any change that has equivalent meaning as and fall within the claims are included.

INDUSTRIAL APPLICABILITY

The information input apparatus according to the present invention includes the touch sensor, allows the input of the types of touch operation, and is useful as a remote control of household electrical appliances, an input interface of information technology devices, and so on.

REFERENCE SIGNS LIST

32 Display
34 Computer
36 Keyboard
38 Mouse
40 CD-ROM device
42 CD-ROM
44 CPU
46 ROM
48 RAM
50 Hard disk
52 Communication modem
54 Bus
100 Touch pad
101 Touch position detecting unit
102 Touch position series storage unit
103 Touch operation start position detecting unit
104 Gesture operation type narrowing unit
105 Gesture operation type storage unit
106 Touch operation recognizing unit (PTL 1)
107 Touch operation recognition condition storage unit (PTL 1)
108 Function control unit
109 Image horizontal scroll control unit
110 Image vertical scroll control unit
111 Image rotation control unit
112 Cursor control unit
113 Display unit
114 Touch operation recognizing unit (the present invention)
115 Touch operation recognition condition storage unit (the present invention)
116 Touch feature amount calculation unit
117 Touch operation determining unit
118 Gesture operation end determination condition storage unit
119 Gesture operation end determining unit
120 Gesture end position obtaining unit
121 Peripheral contact sensor
122 Holding hand detecting unit
123 Peripheral proximity sensor
124 Grip position detecting unit
125 Direction angle detecting unit
126 Finger length detecting unit
127 Touch operation type frequency storage unit
128 Recognition priority level determining unit
129 Touch operation recognition condition update unit
140 Grip information detecting unit
189 Housing
150 Button
190 Information input apparatus
200 Display apparatus

The invention claimed is:
1. An information input apparatus comprising:
a touch sensor which is a sensor for inputting information;
a touch information detecting unit configured to detect touch information that is information resulting from an operator contacting the touch sensor with a finger;
a touch operation start position detecting unit configured to detect, using the touch information, a touch operation start position that is a start position of a touch operation performed by the operator;
a touch operation recognition condition storage unit configured to store a plurality of touch operation recognition conditions each for recognizing one of types of touch operation, in association with each of touch operation start positions;
a touch operation recognizing unit configured to recognize the touch operation, using the touch operation recognition conditions stored in association with the touch operation start position detected by the touch operation start position detecting unit, to determine a type of the touch operation; and
a grip information detecting unit configured to detect grip information about the operator relative to the information input apparatus,
wherein the touch operation recognizing unit is configured to:
recognize a first touch operation that is one of the types of touch operation at a first touch operation start position among the touch operation start positions, using a first touch operation recognition condition among the touch operation recognition conditions; and
recognize the first touch operation at a second touch operation start position among the touch operation start positions, using a second touch operation recognition condition among the touch operation recognition conditions, the second touch operation start position being different from the first touch operation start position, and the second touch operation recognition condition being different from the first touch operation recognition condition,
wherein the grip information includes at least one of a type of holding hand with which the operator holds the information input apparatus, a grip position on the information input apparatus gripped by the operator, a direction angle of the information input apparatus relative to a gripping hand of the operator, and a length of the finger used for a touch operation by the operator.
2. The information input apparatus according to claim 1,
wherein the touch operation recognizing unit is configured to output, as a result of the recognition, the type of the touch operation and an operation amount indicating a magnitude of the touch operation, and
the type of the recognized touch operation indicates either a pointing operation for inputting a position designated by the operator or any one of gesture operations of types each for instructing execution of a predetermined specific process.
3. The information input apparatus according to claim 2,
wherein when the touch operation recognizing unit outputs the type of the gesture operation as the recognition result, the touch operation recognizing unit is configured to determine whether or not the gesture operation of the outputted type has been inputted, and when the touch operation recognizing unit determines that the gesture operation has been inputted, the touch operation recognizing unit is configured to output, as a gesture operation end position, at least one of (1) a touch position that is a position which is on an operation surface of the touch sensor being contacted by the operator and is detected when the determination is made and (2) a touch position that is a position which is on the operation surface of the touch sensor being contacted by the operator and is detected immediately before the determination, and
the touch operation start position detecting unit is configured to detect the outputted gesture operation end position as the touch operation start position.

4. The information input apparatus according to claim 2, further comprising
   a touch information series storage unit configured to store the touch information for a predetermined certain period of time,
   wherein the touch operation recognizing unit includes:
   a touch feature amount calculation unit configured to calculate, as a touch feature amount, at least one of a touch operation time, a touch movement distance, a touch movement speed, a touch movement acceleration, and a touch movement direction, using the touch information stored in the touch information series storage unit; and
   a touch operation determining unit configured to determine the type of touch operation using the touch feature amount, based on the touch operation recognition conditions stored in the touch operation recognition condition storage unit in association with each of the touch operation start positions.

5. The information input apparatus according to claim 4,
   wherein the touch operation recognition condition storage unit is configured to store the touch operation recognition conditions in association with each of a plurality of subregions specified on an operation surface of the touch sensor, and
   the touch operation determining unit is configured to determine whether or not the touch feature amount satisfies a touch operation recognition condition, and to determine, when the touch operation determining unit determines that the touch feature amount fails to satisfy the touch operation recognition condition, that the type of the touch operation does not indicate a first touch operation that is a touch operation of one of the types, the touch operation recognition condition being one of the touch operation recognition conditions stored in association with, among the subregions, a subregion including the touch operation start position and being for recognizing the first touch operation.

6. The information input apparatus according to claim 5, further comprising
   a gesture operation end determination condition storage unit,
   wherein the touch operation recognizing unit further includes a gesture operation end determining unit and a gesture end position obtaining unit,
   the gesture operation end determination condition storage unit is configured to store a plurality of gesture operation end determination conditions that are conditions each for determining whether or not one of the gesture operations of the types has been ended, in association with each of the subregions,
   the gesture operation end determining unit is configured to determine whether or not the touch feature amount satisfies a gesture operation end determination condition, the gesture operation end determination condition being one of the gesture operation end determination conditions stored in association with, among the subregions, the subregion including the touch operation start position and being for determining whether or not the gesture operation of the type determined by the touch operation determining unit has ended,
   the gesture end position obtaining unit is configured to output, when a result of the determination shows that the touch feature amount satisfies the gesture operation end determination condition, at least one of a touch position detected when the gesture operation end determination condition is satisfied and a touch position detected prior to the satisfaction of the gesture operation end determination condition, as a gesture operation end position, and
   the touch operation start position detecting unit is configured to detect the outputted gesture operation end position as the touch operation start position.

7. The information input apparatus according to claim 5, further comprising:
   a recognition priority level determining unit configured to determine a recognition priority level indicating a degree of recognition for each of the types of touch operation, in association with each of the subregions; and
   a touch operation recognition condition update unit configured to update, according to the recognition priority level determined in association with, among the subregions, a third subregion, the touch operation recognition conditions stored in association with the third subregion,
   wherein the touch operation recognition condition update unit is configured to update a threshold value included in the touch operation recognition conditions so that a type of touch operation having a higher recognition priority level is recognized more easily.

8. The information input apparatus according to claim 7, further comprising
   a touch operation type frequency storage unit configured to store a type frequency that is a frequency for each of the types of touch operation recognized by the touch operation recognizing unit, in association with each of the subregions,
   wherein the recognition priority level determining unit is configured to determine the recognition priority level so that a touch operation of a type having a higher type frequency has a higher recognition priority level.

9. The information input apparatus according to claim 2,
   wherein the touch sensor is a capacitance touch sensor, and
   the touch information includes a touch position and a capacitance value indicating a touch strength that is a strength of a touch operation at a time of contacting.

10. The information input apparatus according to claim 1,
    wherein the touch operation start position detecting unit is configured to detect, as the touch operation start position, a touch position at which the operator first contacts the touch sensor with the finger.

11. The information input apparatus according to claim 1,
    wherein the touch operation recognition condition storage unit is configured to store the touch operation recognition conditions in association with the grip information and each of the touch operation start positions, and
    the touch operation recognizing unit is configured to recognize the touch operation, using the touch operation recognition conditions stored in association with the grip information and each of the touch operation start positions, to determine the type of the touch operation.

12. The information input apparatus according to claim 11, further comprising
    a peripheral contact sensor which is provided to at least part of a housing of the information input apparatus and detects a contact position of at least one of the hand and the finger of the operator relative to the information input apparatus,
    wherein the grip information detecting unit is configured to detect the type of holding hand included in the grip information, using the contact position detected by the peripheral contact sensor,
    the touch operation recognition condition storage unit is configured to store the touch operation recognition conditions in association with each of types of holding hand and each of the touch operation start positions, and the touch operation recognizing unit is configured to determine the type of the touch operation, using the touch operation recognition conditions obtained from the touch operation recognition condition storage unit.

13. The information input apparatus according to claim 11, further comprising a peripheral proximity sensor which is provided to at least part of a housing of the information input apparatus and detects a proximity state of at least one of the hand and the finger of the operator relative to the information input apparatus, wherein the touch operation recognition condition storage unit is configured to store the touch operation recognition conditions in association with each of the subregions specified on an operation surface of the touch sensor, the grip information detecting unit is configured to detect at least one of the grip position, the direction angle, and the length of the finger, using the proximity state detected by the peripheral proximity sensor, and the touch operation recognizing unit is configured to calculate a difference between a predetermined reference grip state and the at least one of the detected grip position, direction angle, and length of the finger, adjust the touch operation start position so that the difference becomes smaller, and recognize the touch operation, using the touch operation recognition conditions stored in association with, among the subregions, a subregion including the adjusted touch operation start position.

14. The information input apparatus according to claim 13, wherein the touch operation recognizing unit is configured to calculate the difference between the predetermined reference grip state and the at least one of the detected grip position, direction angle, and length of the finger, adjust the touch position so that the difference becomes smaller, determine the type of the touch operation, using the adjusted touch position, and output an operation amount indicating a magnitude of the touch operation.

15. An information input method using a touch sensor of an information input apparatus, the information input method comprising:

detecting touch information that is information resulting from an operator contacting the touch sensor with a finger;

detecting, using the touch information, a touch operation start position that is a start position of a touch operation performed by the operator;

recognizing the touch operation, using touch operation recognition conditions stored in association with the touch operation start position detected in the detecting of a touch operation start position, to determine a type of the touch operation among types of touch operation; and detecting grip information about the operator relative to the information input apparatus, wherein in the recognizing:

a first touch operation that is one of the types of touch operation at a first touch operation start position among the touch operation start positions is recognized by using a first touch operation recognition condition among the touch operation recognition conditions; and the first touch operation at a second touch operation start position among the touch operation start positions is recognized by using a second touch operation recognition condition among the touch operation recognition conditions, the second touch operation start position being different from the first touch operation start position, and the second touch operation recognition condition being different from the first touch operation recognition condition, wherein the grip information includes at least one of a type of holding hand with which the operator holds the information input apparatus, a grip position on the information input apparatus gripped by the operator, a direction angle of the information input apparatus relative to a gripping hand of the operator, and a length of the finger used for a touch operation by the operator.

16. A non-transitory computer-readable recording medium for use in a computer, the recording medium having a computer program recorded thereon for causing the computer to execute the information input method according to claim 15.

17. An integrated circuit for inputting information using a touch sensor of an information input apparatus, the integrated circuit comprising:

a touch information detecting unit configured to detect touch information that is information resulting from an operator contacting the touch sensor with a finger;

a touch operation start position detecting unit configured to detect, using the touch information, a touch operation start position that is a start position of a touch operation performed by the operator;

a touch operation recognition condition storage unit configured to store a plurality of touch operation recognition conditions each for recognizing one of types of touch operation, in association with each of touch operation start positions;

a touch operation recognizing unit configured to recognize the touch operation, using the touch operation recognition conditions stored in association with the touch operation start position detected by the touch operation start position detecting unit, to determine a type of the touch operation; and a grip information detecting unit configured to detect grip information about the operator relative to the information input apparatus, wherein the touch operation recognizing unit is configured to:

recognize a first touch operation that is one of the types of touch operation at a first touch operation start position among the touch operation start positions, using a first touch operation recognition condition among the touch operation recognition conditions; and recognize the first touch operation at a second touch operation start position among the touch operation start positions, using a second touch operation recognition condition among the touch operation recognition conditions, the second touch operation start position being different from the first touch operation start position, and the second touch operation recognition condition being different from the first touch operation recognition condition, and wherein the grip information includes at least one of a type of holding hand with which the operator holds the information input apparatus, a grip position on the information input apparatus gripped by the operator, a direction angle of the information input apparatus relative to a gripping hand of the operator, and a length of the finger used for a touch operation by the operator.

* * * * *